Oct. 24, 1967 R. R. SEEBER ET AL 3,349,375

ASSOCIATIVE LOGIC FOR HIGHLY PARALLEL COMPUTER AND DATA PROCESSING SYSTEMS

Filed Nov. 7, 1963 21 Sheets-Sheet 1

INVENTORS
ROBERT R. SEEBER
ARWIN B. LINDQUIST

BY [signature]
ATTORNEY

Oct. 24, 1967 R. R. SEEBER ET AL 3,349,375

ASSOCIATIVE LOGIC FOR HIGHLY PARALLEL COMPUTER AND DATA PROCESSING SYSTEMS

Filed Nov. 7, 1963 21 Sheets-Sheet 4

TREE REPRESENTATION OF $Y = |6 - \sqrt{K}|$

FIG. 4A

| LINE | PROBLEM NO. | STATUS | TAG | DATA OR CODE | AND ITEM |
|---|---|---|---|---|---|
| 1 | 3 | I | Y1 | ABS | |
| 2 | 3 | I | Y110101 | — | |
| 3 | 3 | PC | Y1101111 | 2 | |
| 4 | 3 | I | Y11 | — | |
| 5 | 3 | PC | Y101 | 6 | |
| 6 | 3 | I | Y111 | IF | X |
| 7 | 3 | I | Y1101 | — | |
| 8 | 3 | I | Y1111 | — | |
| 9 | 3 | I | Y 11001 | D | X |
| 10 | 3 | I,B | Y 11011 | — | |
| 11 | 3 | I | Y 11101 | D | T |
| 12 | 3 | I | Y 11111 | ABS | |
| 13 | 3 | I | Y 110111 | * | |
| 14 | 3 | I | Y 111111 | L | Y11011 |
| 15 | 3 | I | Y 1101001 | * | |
| 16 | 3 | I | Y 1101011 | D | K |
| 17 | 3 | I | Y 11010001 | D | X |
| 18 | 3 | I | Y 11010011 | D | X |
| 19 | 3 | I | Y 1101101 | D | X |
| 20 | 3 | R,C | Y 11101 | 0.2 | |
| 21 | 3 | R,C | Y 1101011 | 66 | |
| 22 | 3 | R,C | Y 11001 | 10 | |

FIG. 4B

| LINE | PROBLEM NO. | STATUS | TAG | DATA OR CODE AND ITEM |
|---|---|---|---|---|
| 23 | 3 | R, C | Y 11010001 | 10 |
| 24 | 3 | R, C | Y 11010011 | 10 |
| 25 | 3 | R, C | Y 1101101 | 10 |
| 26 | 3 | R, T | Y 11101 | 0.2 |
| 27 | 3 | T | Y 1101011 | 66 |
| 28 | 3 | R, T | Y 11001 | 10 |
| 29 | 3 | R, T | Y 11010001 | 10 |
| 30 | 3 | R, T | Y 110101 | 34 |
| 31 | 3 | R, T | Y 111111 | 1.7 |
| 32 | 3 | R, T | Y 1101 | 8.3 |
| 33 | 3 | R, T | Y 11101 | 0.2 |
| 34 | 3 | R, T | Y 11001 | 8.3 |
| 35 | 3 | R, T | Y 11010001 | 8.3 |
| 36 | 3 | R, T | Y 11010011 | 8.3 |
| 37 | 3 | R, T | Y 1101101 | 8.3 |
| 38 | 3 | R, T | Y 11101 | 0.2 |
| 39 | 3 | R, T | Y 1101011 | 66 |
| 40 | 3 | R, T | Y 11001 | 8.3 |
| 41 | 3 | R, T | Y 110101 | 2.89 |
| 42 | 3 | R, T | Y 111111 | 0.17 |
| 43 | 3 | R, T | Y 1101 | 8.13 |
| 44 | 3 | R, T | Y 11101 | 0.2 |

Oct. 24, 1967 R. R. SEEBER ET AL 3,349,375

ASSOCIATIVE LOGIC FOR HIGHLY PARALLEL COMPUTER AND DATA PROCESSING SYSTEMS

Filed Nov. 7, 1963 21 Sheets-Sheet 9

MEMORY OUTPUT MULTIPLEXER CONTROL LOGIC

FIG. 13 MEMORY ADDRESS GENERATOR

United States Patent Office 3,349,375

Patented Oct. 24, 1967

3,349,375

ASSOCIATIVE LOGIC FOR HIGHLY PARALLEL COMPUTER AND DATA PROCESSING SYSTEMS

Robert R. Seeber and Arwin B. Lindquist, Poughkeepsie, N.Y., assignors to International Business Machines Corporation, New York, N.Y., a corporation of New York Filed Nov. 7, 1963, Ser. No. 322,160
37 Claims. (Cl. 340—172.5)

This invention relates to computer and data processing systems. In particular, the invention relates to the application of associative logic to systems employing computers and data processing devices in parallel.

A computer or data processing system having a single computer module is subject to limitations which are obvious to those familiar with such systems. Even now some of the advantages of a highly parallel system using a single computer are well known. With a plurality of computers, operated one-by-one, and a plurality of memories, double or triple redundancy can supply extremely high reliability where such reliability is necessary. The loss of one computer will result in a reduction in the computing rate but no complete breakdown of the system will result. On the other hand, this attribute will result in graceful deterioration. Furthermore, modular enhancement is easily achieved by a user who wishes to solve his problems more rapidly merely by adding another computer module or two in parallel with his existing installation, if his problems are responsive to parallel treatment. Complex real-time problems of prime urgency will require a high degree of parallelism if they are to be solved. All of these advantages of parallel systems assume exceedingly flexible means of programming and system control.

Several proposals within the field of parallel computer organization have been advanced. Most of these have been in the direction of parallel programming, i.e., multiprogramming, where a single computer deals with several programs, hopefully to increase throughput.

Furthermore, multi-processing functions have been proposed, taking advantage of a small associative memory for memory address transformation. Parallel network systems with central control, which is not required with the present invention, have also been proposed for the solution of problems having a high degree of symmetry. The latter systems are designed with a plurality of computer modules capable of working synchronously on different parts of the problem. The programming for such systems appears reasonable, but the very stringent symmetry relationship limits the systems as to the type of problems that can be processed. Finally, it has been proposed to provide a system with distributed control for solving more general types of problems. These latter systems, however, appear to have very severe difficulties in programming.

The system herein is implemented by providing a plurality of computer or data processing modules adapted to operate in an autonomous fashion in conjunction with a plurality of associative memories which possess a high degree of autonomy in operation.

The use of associative memories for data and instructions, and associative logic to control the parallel computers offers an attractive solution to the programming difficulties usually encountered in conventional systems. The result is an organization that will permit a very high degree of parallelism both in processors and problems, with practicable programming.

It is, therefore, the broad objective of the invention to provide a practical computing system or data processing system which employs a plurality of computer modules capable of simultaneously operating on portions of the same or different problems.

It is another object of this invention to provide a computing system or a data processing system which is modular such that additional computer modules and/or additional associative memories can be easily added to the system to enhance the function of the system.

It is a further object of this invention to provide a computing system or a data processing system in which the failure of one computer module will not completely stop computation, but, in which the rate of throughput will be merely reduced, resulting in graceful deterioration.

It is still a further object of this invention to provide a computing system or a data processing system in which computer modules and/or memory modules can be added or removed without requiring substantial changes in the programs for problem solutions.

Another object of this invention resides in the provision of a computing system or a data processing system which can employ a plurality of computer modules without requiring a master computer to control the other computer modules.

Yet another object of this invention aims to provide a computing system or a data processing system which can employ a plurality of computer modules without requiring a monitor program to interrelate the operations of the several modules.

Further, it is another object of this invention to provide a computing system or a data processing system which can employ a plurality of computer or data processing modules, each of which is capable of autonomous operation.

It is another object of this invention to provide a computing system or a data processing system which is data activated.

Another object of this invention lies in the provison of a computing system or a data processing system which can employ a plurality of computer modules and in which computer modules autonomously seek work to be performed when they are at liberty.

It is a further object of this invention to provide a computing system or a data processing system operating in conjunction with associative memories.

It is still another object of this invention to provide a computing system or a data processing system controlled by a binary tree-structured program.

Another object of this invention is to provide for the implementation of a binary tree-structured computer program.

Further, it is another object of this invention to provide a computing system employing a programming language more closely related to the language used by a human being than has been possible in previous systems.

An important object of this invention involves the provision of a computing system or data processing system which can employ a plurality of memory modules to allow substantial overlapping of memory operations.

It is an object of this invention to provide a computing system in which a computer module may send a request to a memory module for certain information and then without waiting for an answer to that request may proceed to prepare another request going to a different memory module.

It is a further object of this invention to provide a computer in which a memory module upon receiving a request from a computer module for certain information will proceed to fulfill that request and autonomously return the required information to the computer module without further communication from the computer module.

It is an overriding objective of the invention to provide a highly parallel computer and data processing system which is controlled by associative logic whereby a plurality of computer modules and a plurality of connected memory modules may operate autonomously, i.e., without central programming or central control. According to the invention, a plurality of computer modules are connected to a plurality of memory modules by data transmission lines which are under autonomous control of the computer modules for the transmission of data requests addressed to a selected one of the several memories. At the same time, these lines are also under the autonomous control of the memory modules for the transmission of data to a selected one of the several computer modules. The system is predicated on the use of content address memories which permit the satisfaction of data requests merely upon the basis of data content, viz. without knowledge of the location of such data within the memories.

A highly parallel system such as the system herein, therefore, provides for the simultaneous solution of a number of different problems or for the simultaneous solution of different parts of the same problem in an autonomous manner and without central program control.

Further objectives, novel features, and advantages of the invention will became clear as the description thereof proceeds, in light of the drawings forming a part of the application.

In the drawings like reference numerals will indicate like parts, and in these drawings—

FIGURE 1 is a generalized block diagram of the overall organization of the system, showing a plurality of computer modules, a plurality of associative memories, and input and output devices together with their interconnecting cables;

FIGS. 2A and 2B when arranged, as shown in FIG. 2C, comprise a block diagram of the overall system; FIG. 2A showing the system block arrangement of associative memory modules and related equipment, and FIG. 2B showing the principal parts of a computer module and associated equipment;

Figure 5A:
Figure 5B:
Figure 6:
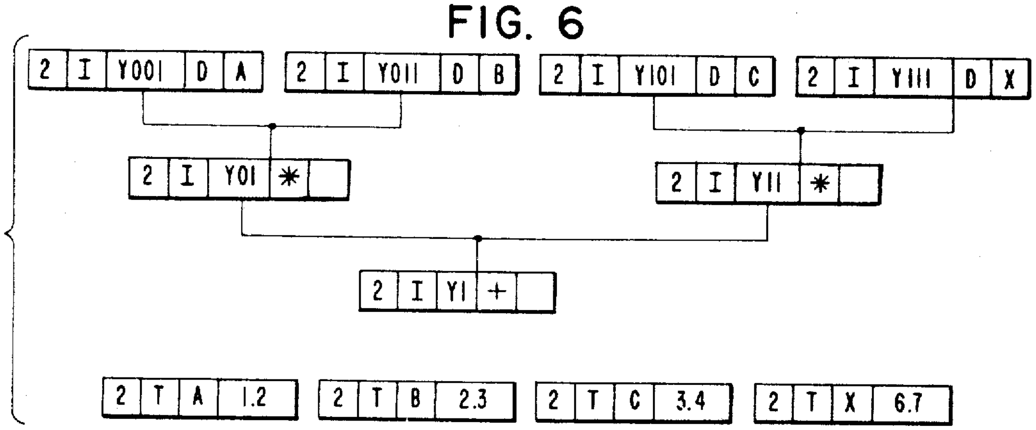
Figure 7:
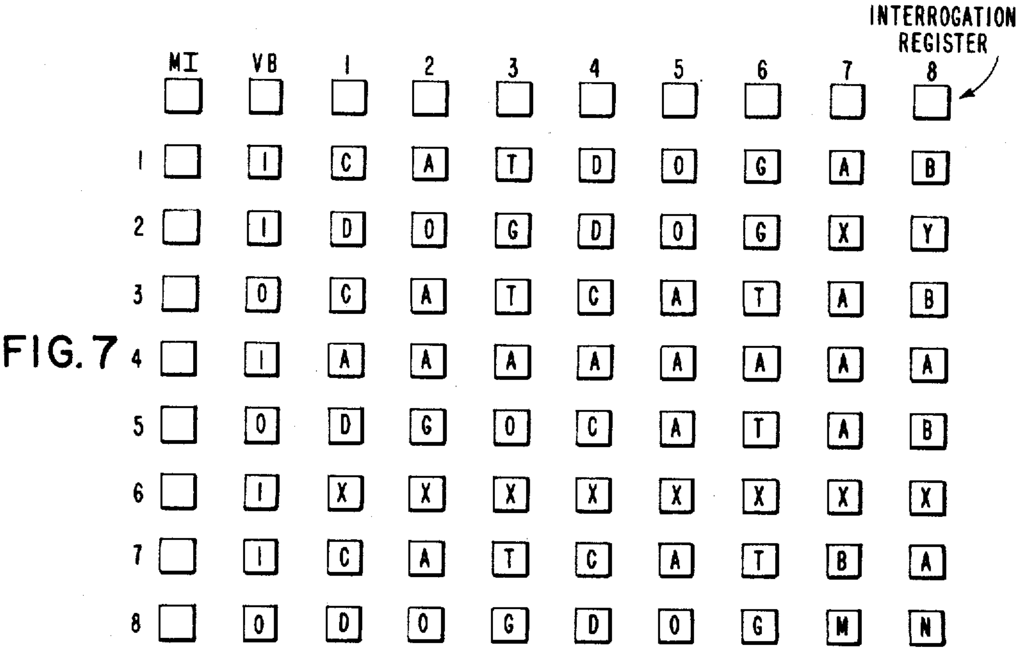
Figure 8:
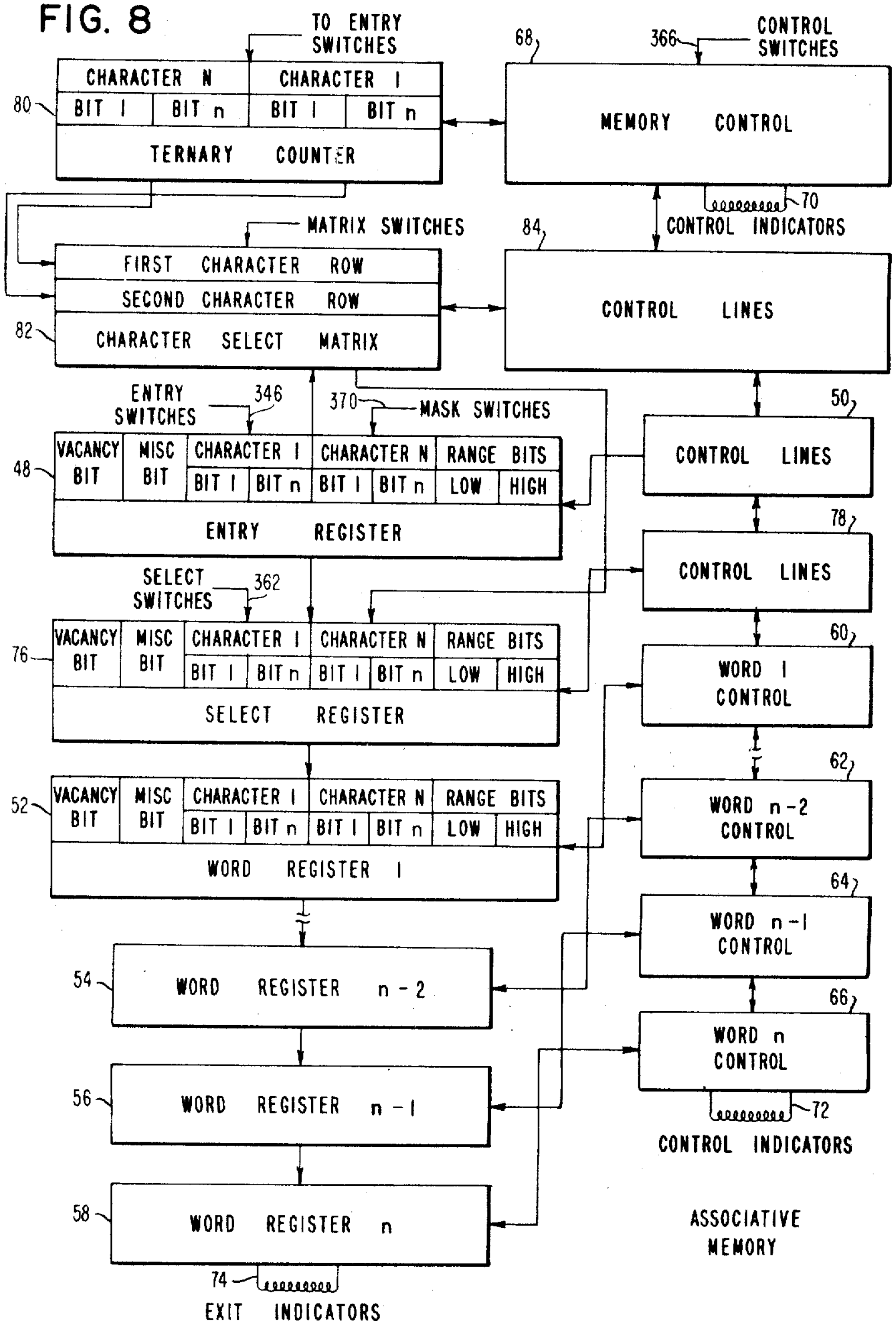
Figure 9A:
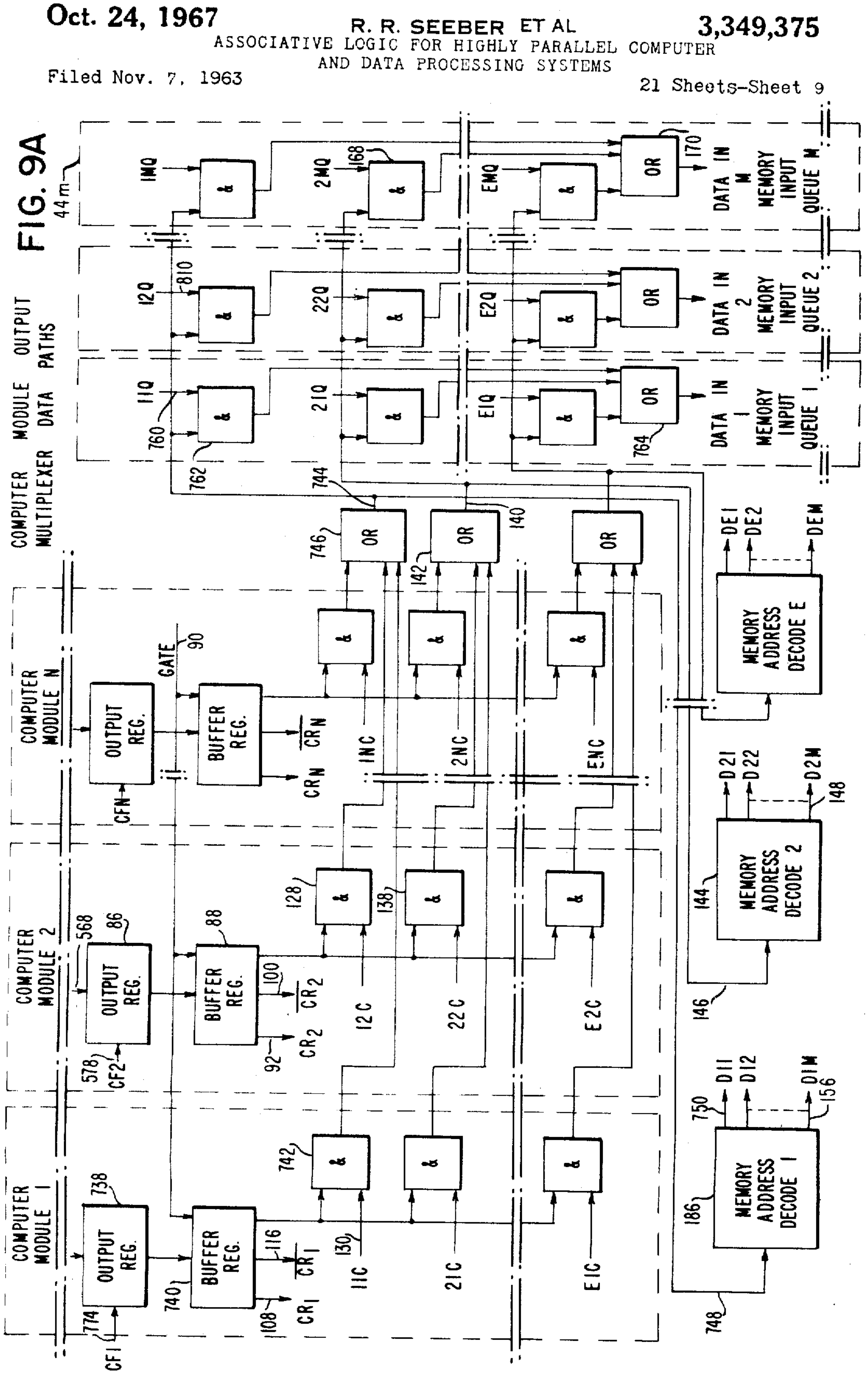
Figure 9B:
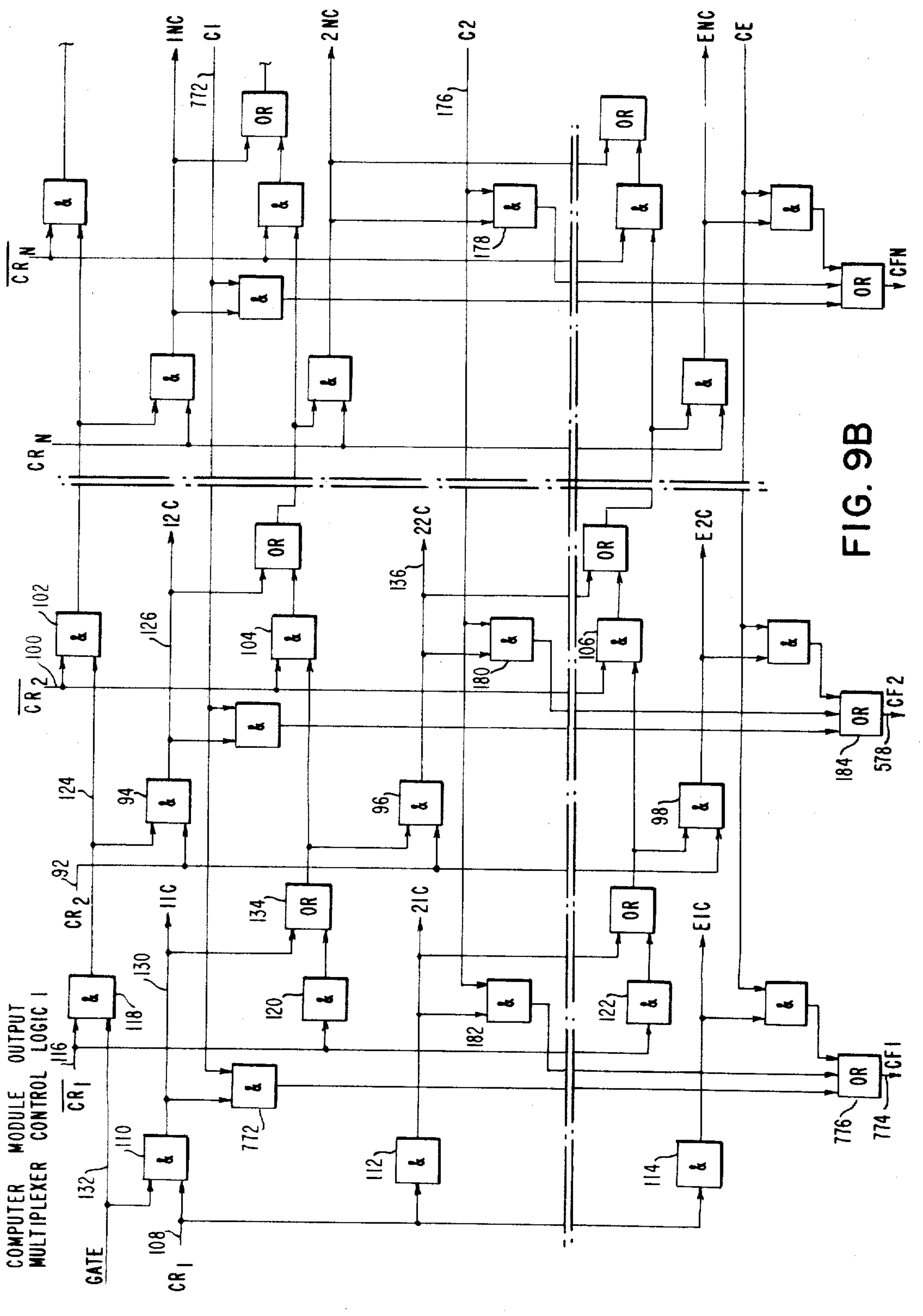
Figure 9C:
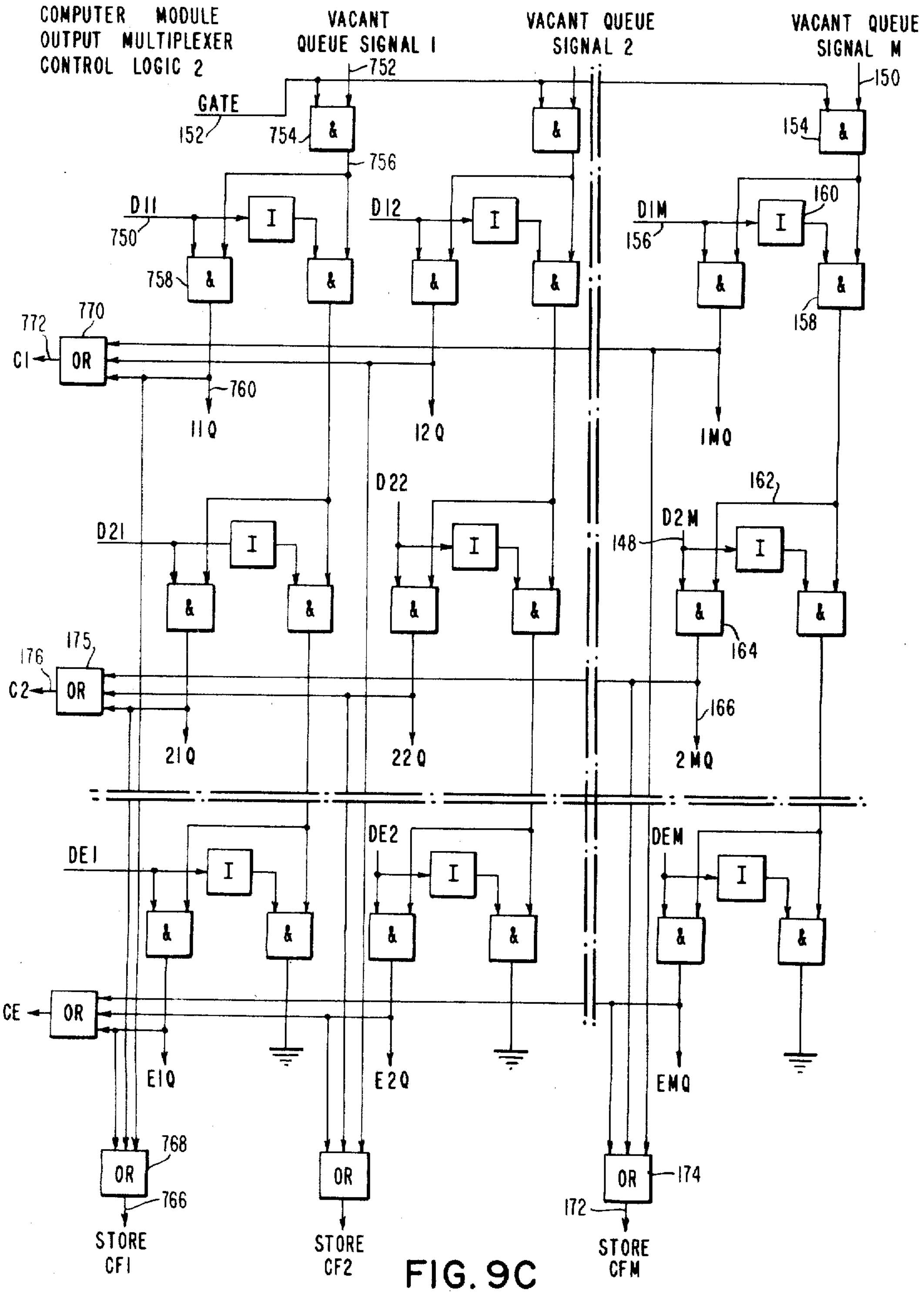
Figure 10A:
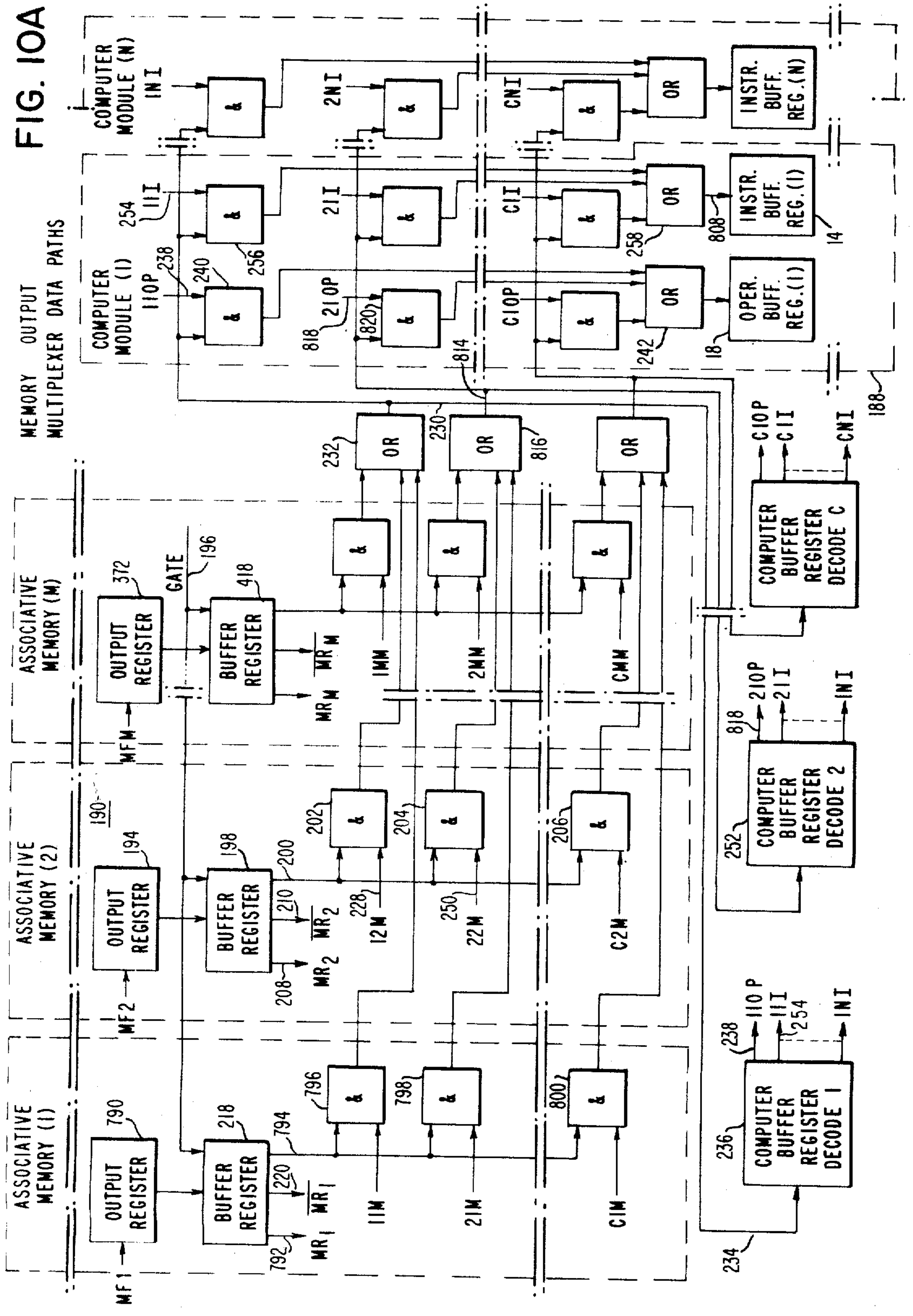
Figure 10B:
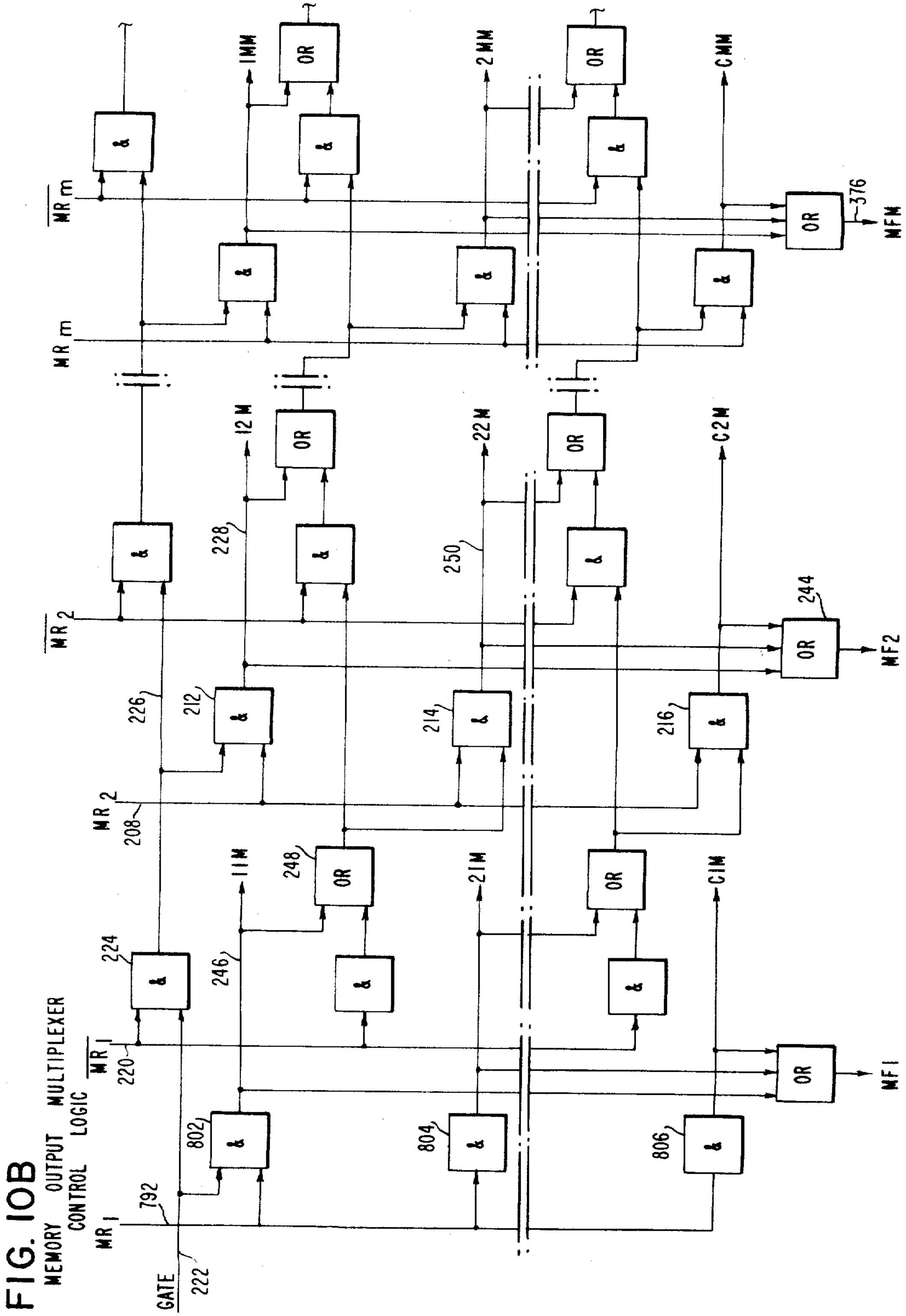
Figure 11:
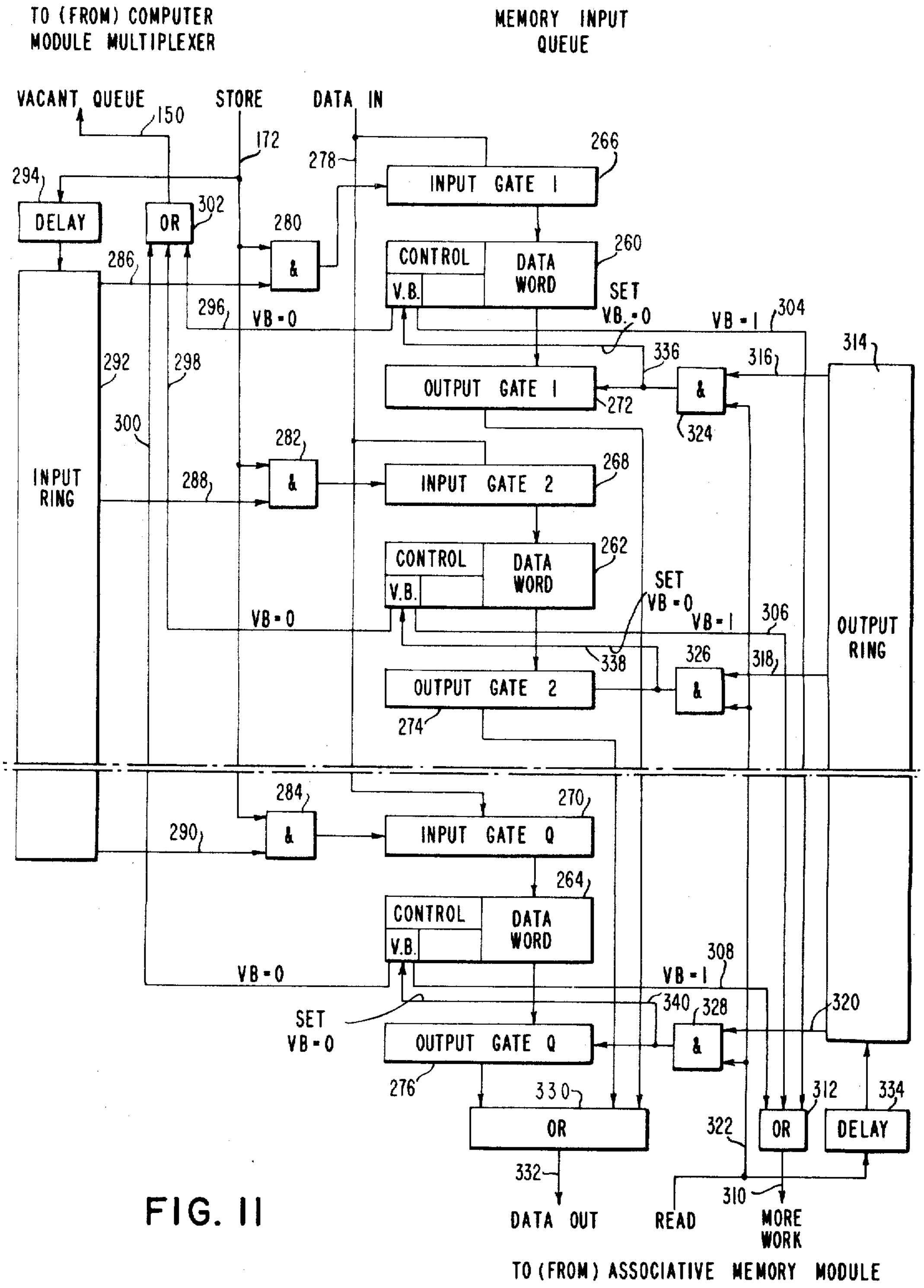
Figure 12:
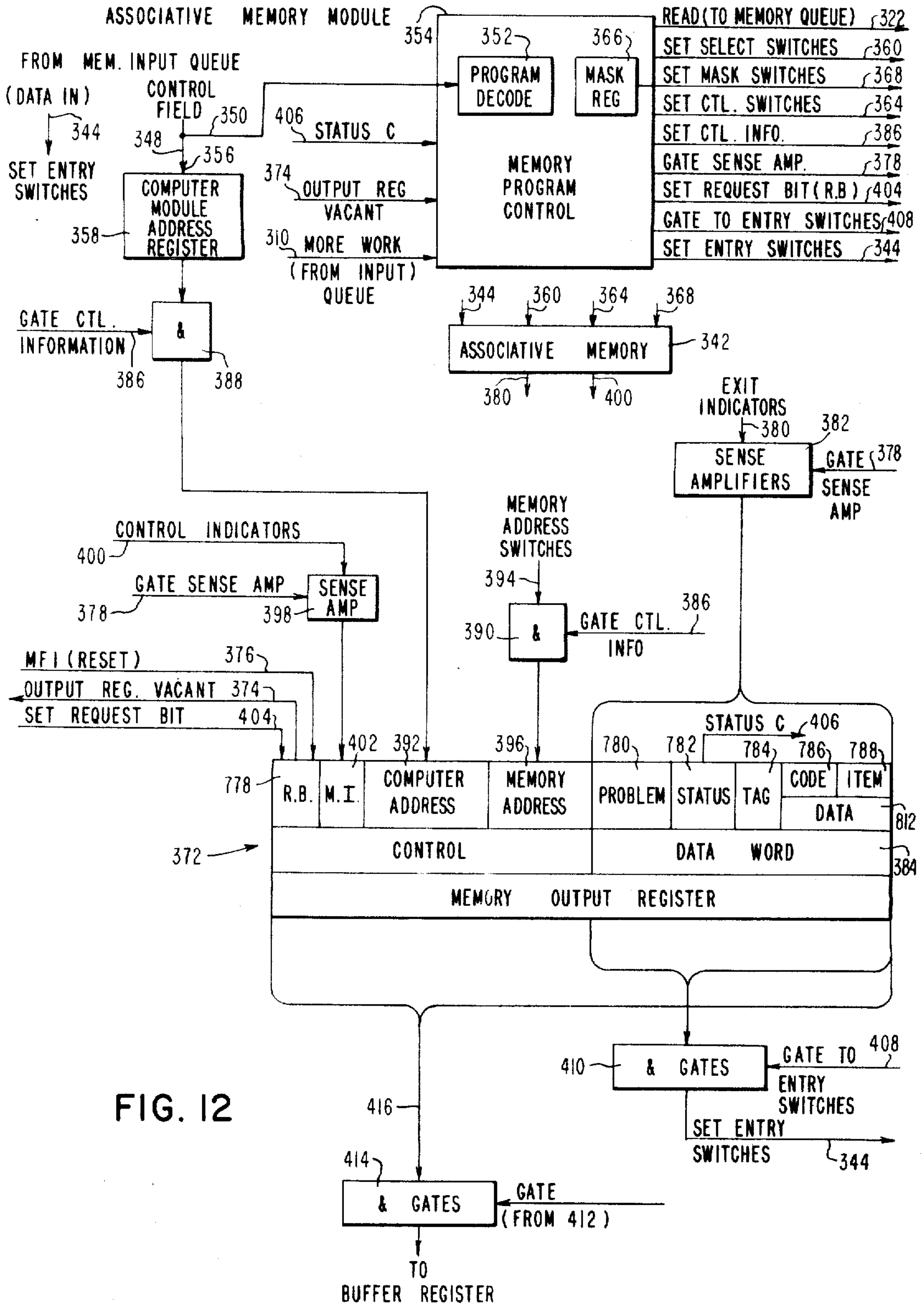
Figure 13:
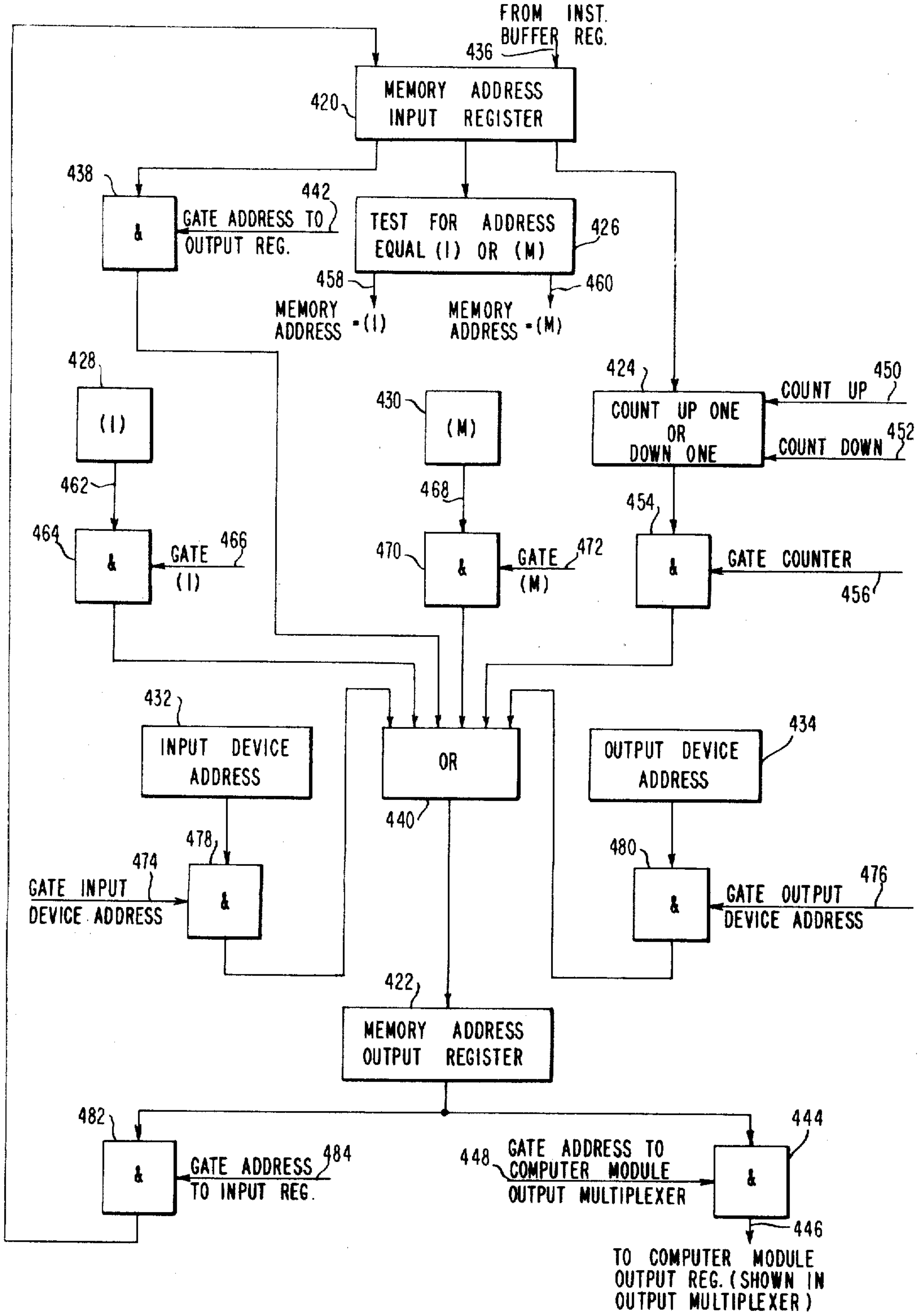
Figures 14, 15:
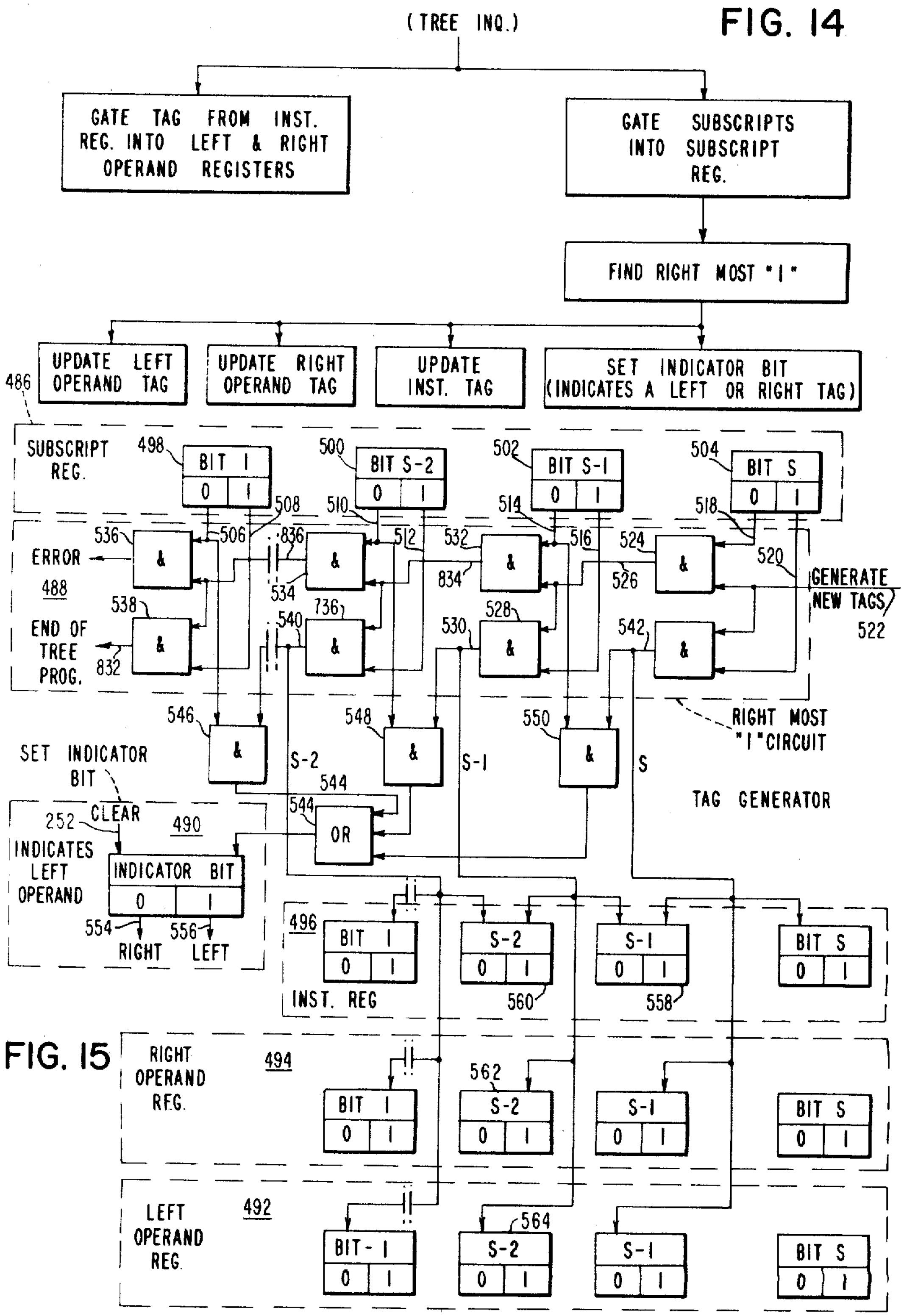
Figure 16:
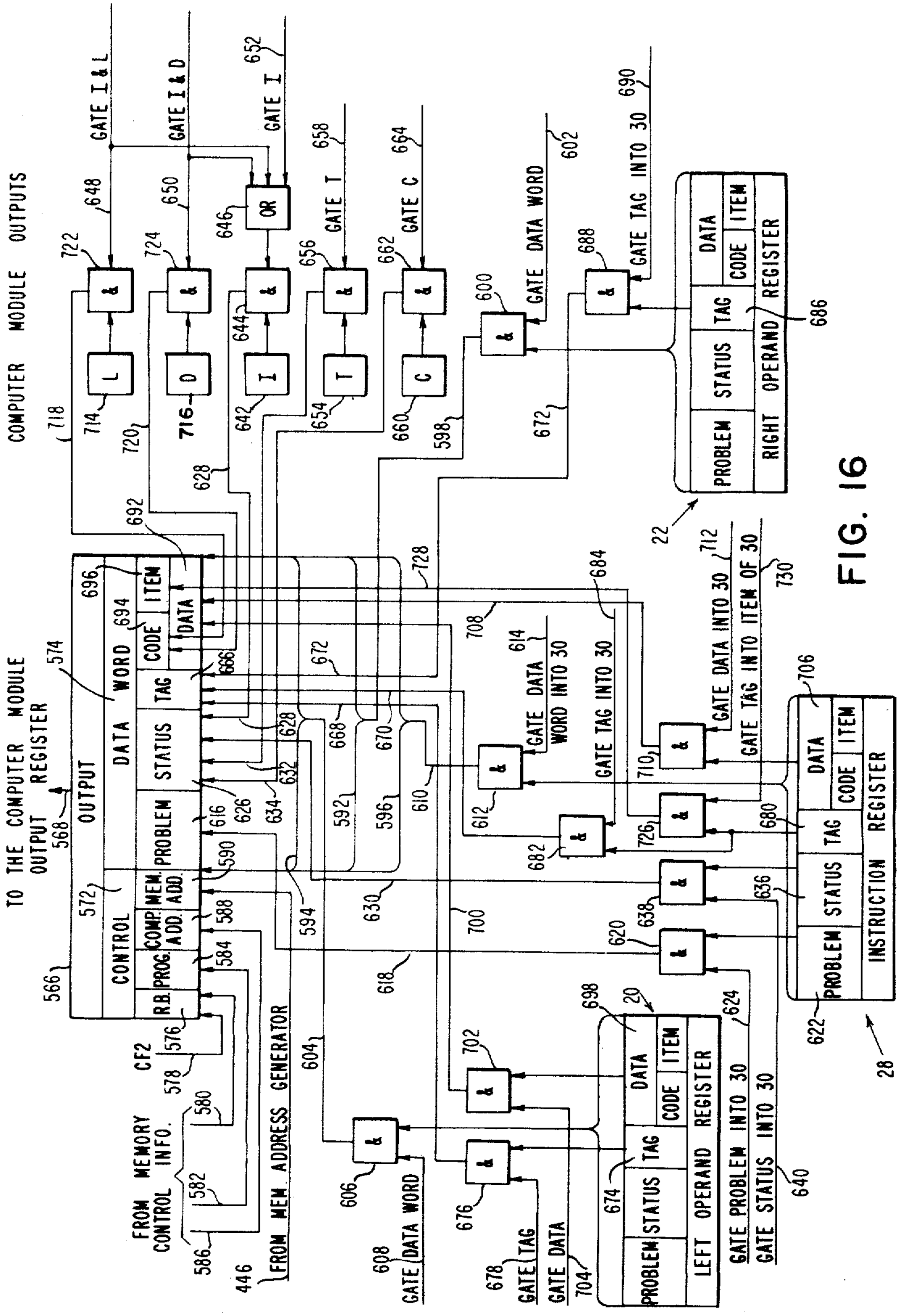
Figure 17A:
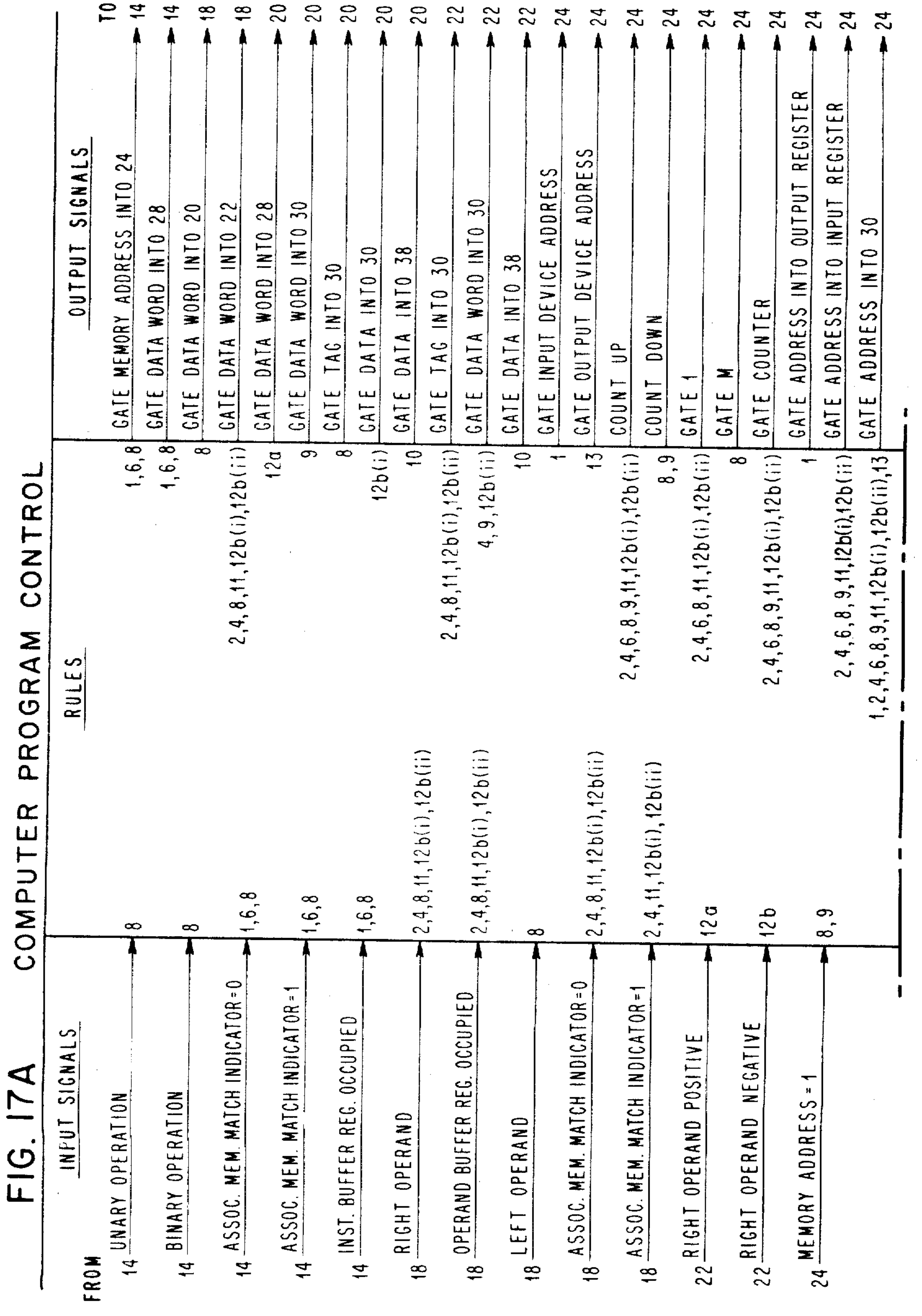
Figure 17B:
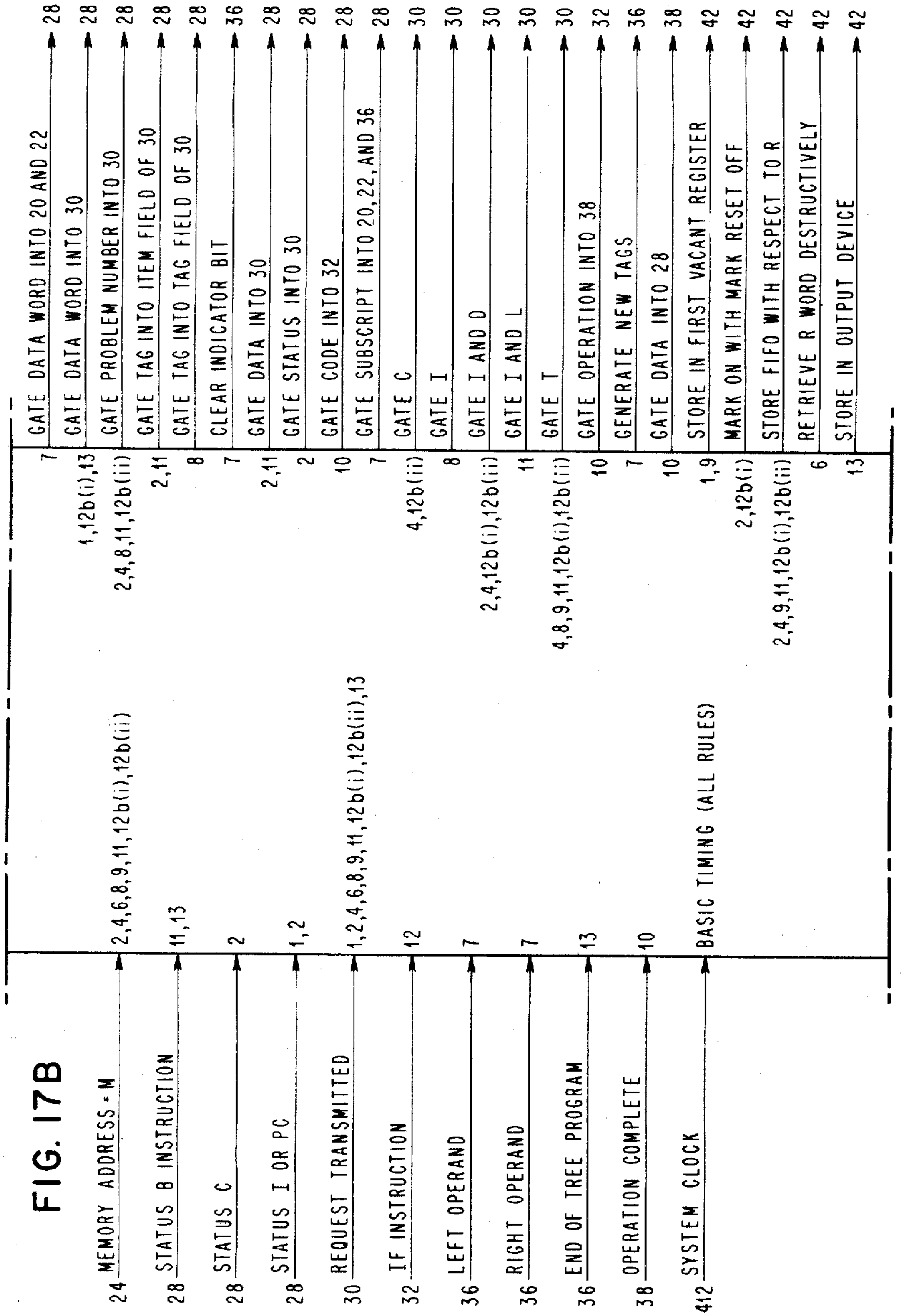
Figure 17C:
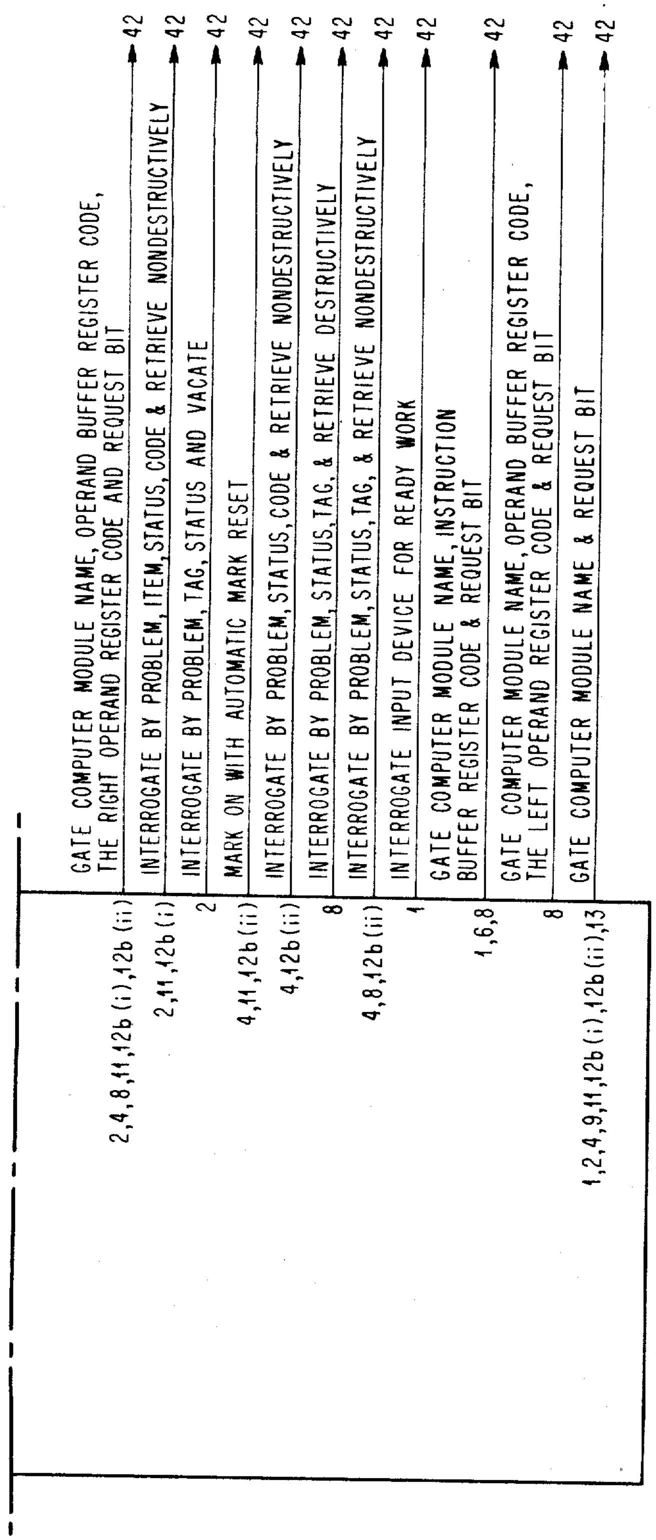
Figure 17D:
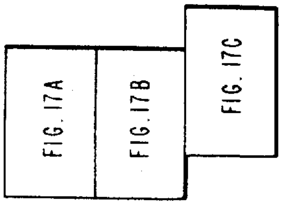

FIGS. 4A and 4B, when taken together, comprise a symbolic representation of words stored in a plurality of associative memories;

FIGS. 5A and 5B are diagrammatic representations of two word formats employed in the system;

FIG. 6 is a tree representation of the problem $Y=AB+CX$;

FIG. 7 is a diagrammatic representation of an associative memory on the basis of which the concept of content addressing can be explained;

FIG. 8 is a block diagram of an associative memory and attendant control circuits;

FIG. 9A is a block diagram of a computer module output multiplexer showing data paths therein;

FIG. 9B is a block diagram of control logic circuits associated with the computer module output multiplexer of FIG. 9A;

FIG. 9C is a block diagram of further control logic circuits associated with the computer module output multiplexer of FIG. 9A;

FIG. 10A is a block diagram of a memory output multiplexer, showing the data paths thereof;

FIG. 10B is a block diagram of the control logic circuits associated with the memory output multiplexer circuits of FIG. 10A;

FIG. 11 is a block diagram of a memory input queue, such as associated with each of the associative memory modules;

FIG. 12 is a block diagram of an associative memory module;

FIG. 13 is a block diagram of the circuits comprising a memory address generator unit;

FIG. 14 is a flow chart indicating the sequence of operations performed in a tag generator of FIG. 15;

FIG. 15 is a block diagram of a tag generator;

FIG. 16 is a block diagram of the circuits comprising the computer module outputs to the computer module output registers of FIG. 9A;

FIGS. 17A, 17B and 17C, when arranged as indicated in FIG. 17D, comprise a schematic representation of a computer program control unit showing input signals thereto at the left, and output signals therefrom at the right, both in association with the number identity of the operational rules involved in these particular signals; and FIG. 17D is a diagram showing the arrangement of FIGS. 17A, 17B and 17C to comprise a computer program control unit.

It should be pointed out at the outset that throughout the several figures a plurality of components ordinarily required for the simultaneous transmission of a plurality of information bits are represented by a single component, these components being shown as interconnected by a single line rather than the number of lines necessary for the transmission of a whole word. Throughout the specification, these components have been designated by the plural and when such designation is encountered it is to be remembered that the component referred to is representative of a plurality of identical components.

*General organization*

The associated logic parallel system herein, like most computing systems, consists of five functional parts, namely, input, output, memory, control and computing. However, herein the functional parts, such as multiple computers and memory modules, are autonomous to a large degree such that they function without any central control. The associative techniques used in controlling the functional parts of the system make it possible to dispense with central control. Further these multiple functions are designed using associative techniques to execute one or more problems in parallel. These functions may also be added or subtracted without making essential changes in the programs.

Figure 1:
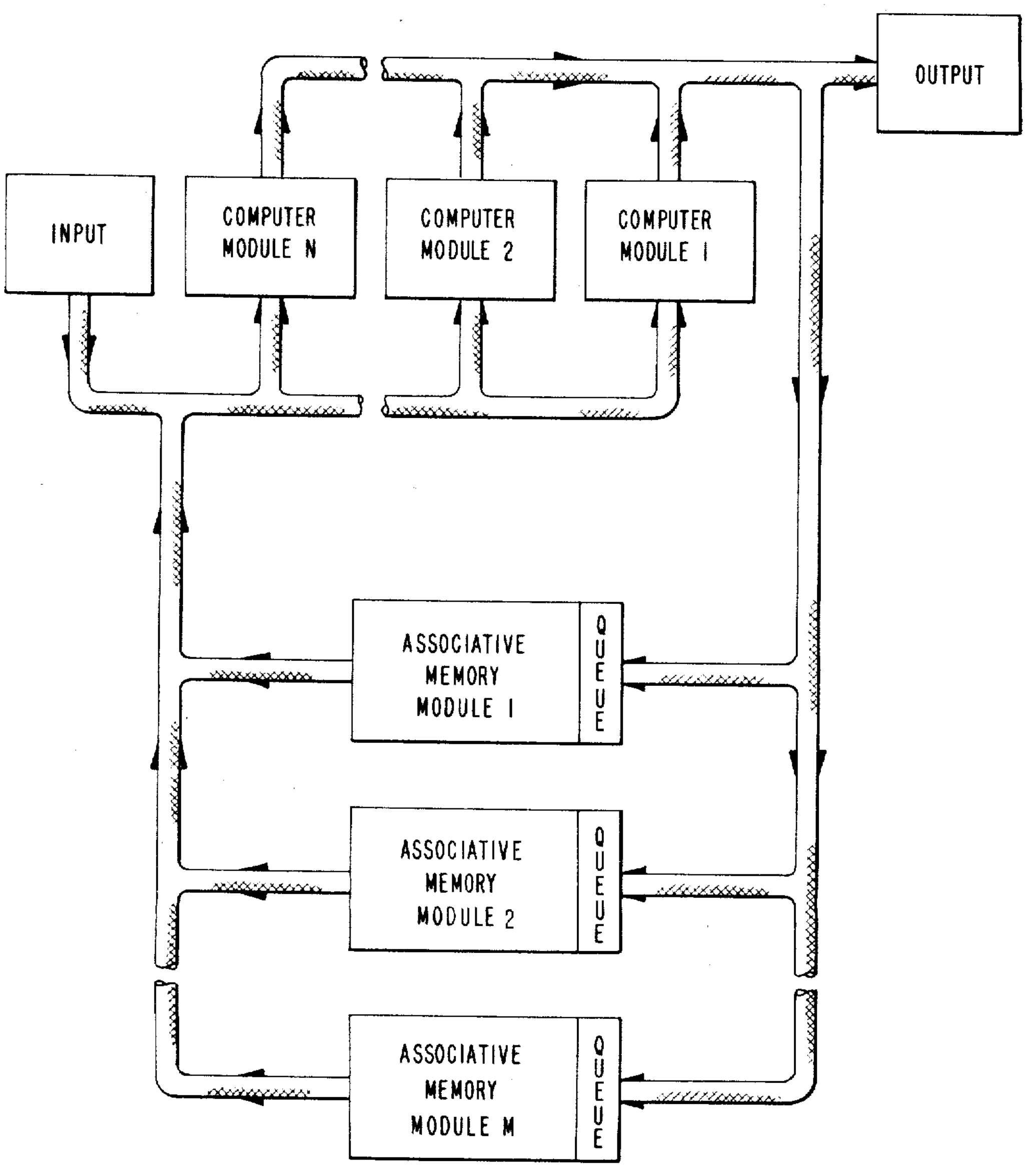

The block diagram of the system in FIG. 1 shows the general interconnections of the functional parts. The control and computing circuits of any one computer appear in FIG. 1 as one unit, called a computer module. The interconnections are designed so that the transfer of data among many functional parts of the system may be carried on simultaneously. The section of the system labeled "input" will simultaneously provide data from any number of input sources and store it in the storage units designated as associative memory modules. Such data may come from punch cards, magnetic tapes, discs, manually operated keys, sensors and the like. The section labeled "output" simultaneously takes information from several associative memory storage units via the computer modules. The output may also be in many forms, such as punched cards, magnetic tape, printed forms, indicator lights, etc. The associative memory modules accept, hold and distribute information. The block diagram of FIG.1 shows several such associative memory modules, each with an input queue. Each associative memory has the first-in, first-out (FIFO) functions, as well as many of the more usual associative features such as selective write, write into first vacant register, and the like. The details of a suitable associative memory are shown in our application for United States Letters Patent, Ser. No. 163,096, filed Dec. 29, 1961, for Associative Memory Ordered Retrieval, now Patent 3,253,264, issued May 24, 1966. The associative memories are designed to operate autonomously.

Each computer module can by itself decode the instructions that it receives, send its requests for data via the queues to a selected associative memory, operate on the data with the usual arithmetical and logical operations, compute tags for retrieving successor instructions and operands and thus avoid the use of the usual stored program.

Figures 2A, 2C:
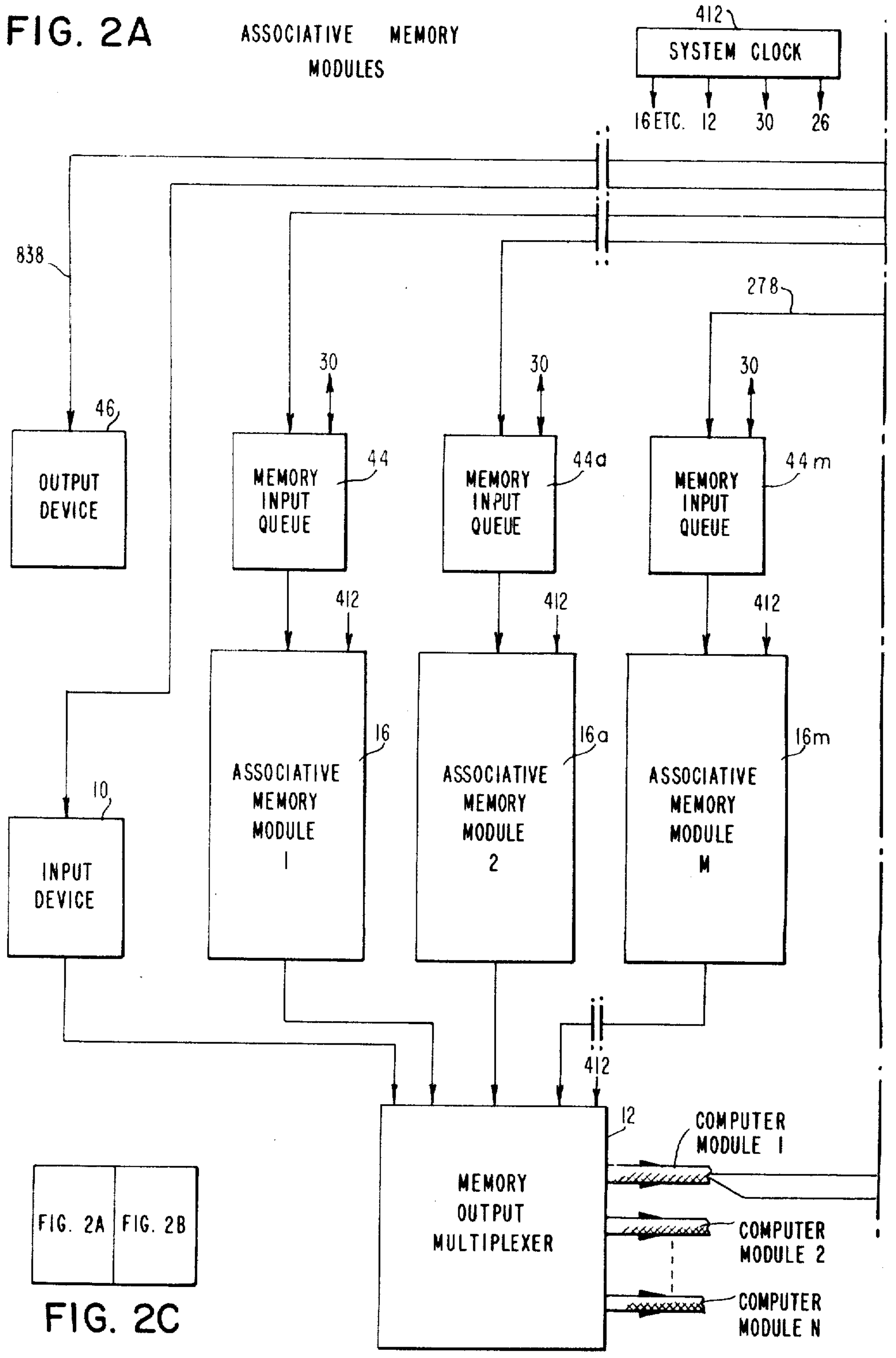
FIG. 2C is a diagram showing the arrangement of FIGS. 2A and 2B comprising the overall system.
Figure 2B:
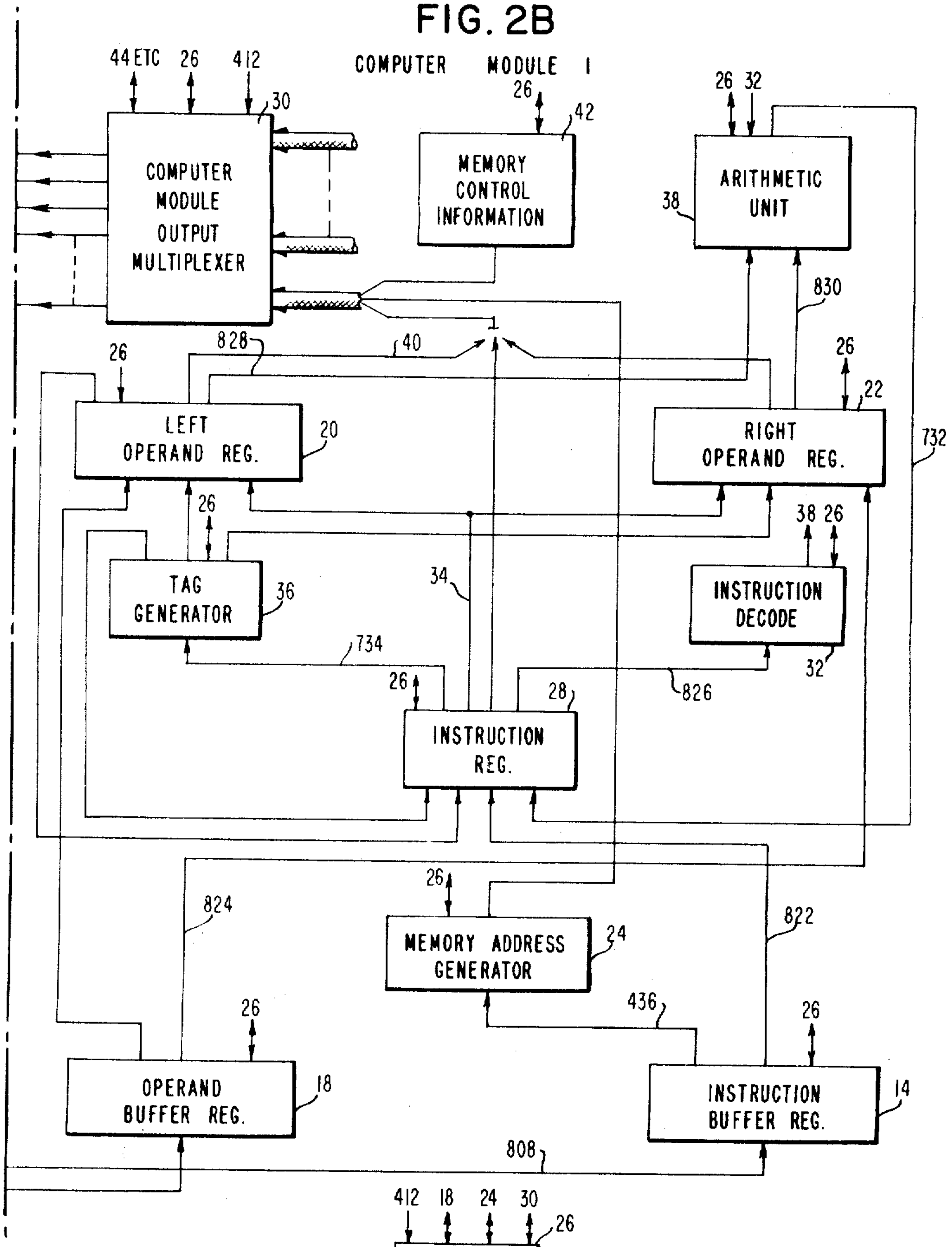
FIG. 2D is a generalized block diagram of a computer program control unit.

A more detailed representation of the system organization is shown in FIGS. 2A and 2B. In these figures certain components of FIG. 1 have been broken down into functional units which will facilitate a preliminary understanding of the system. These figures essentially show the data paths among the functional units of several computer modules and several memory modules, computer module 1 as exemplary of the other computer modules, being found in FIGS. 2A and 2B. The short (cut-off) leads indicate the presence of communication among these functional units and the computer program control unit of FIG. 2D (see also FIGS. 17A, 17B and 17C).

An input device 10, FIG. 2A, on receiving a request for new work from any vacant computer module will directly transmit a data word to a requesting computer output register, as described later. This request will allow the memory output multiplexer 12 to transmit this data word via one of the output channels of this multiplexer to an instruction buffer register 14 (FIG. 2B) of one of the computer modules. In addition, the memory output multiplexer 12 will accept data words from associative memories 16, 16*a* and 16*m* and transmit this information under the autonomous control of any one of the memory modules to either the instruction buffer 14 or an operand buffer register 18. Note that the memory output multiplexer may also transmit data words simultaneously to operand and instruction buffer registers of other computer modules. The memory output multiplexer 12 as described in detail later in connection with FIGS. 10A and 10B consists of a fixed number of data channels. Each data channel contains one of the M OR circuit (there are M associative memories) and a computer buffer register decode circuit, to be described in detail at a later point herein. The input to the computer decode circuit is the computer buffer register code, and the output of the decode circuit will control the computer buffer register input gates, as to be explained.

These buffer registers 14 and 18 (see FIG. 2B) one for each computer module temporarily hold the next computer instruction and operand until the execution of the present instruction is completed. Thus, the buffer registers are a part of the logic necessary for overlap operation; the overlap operation being the fetching of the next instruction and operand while executing the present instruction.

The operand buffer register 18 temporarily stores the left or right operand of the particular computer module (the meaning of "left" and "right" will be made clear below). The output of this register is gated to either a left operand register 20 or to a right operand register 22 depending on the control information contained in the operand buffer register. The operand buffer register will also indicate (note the line labelled 26) to its computer program control unit 26 (FIG 2D) whether data had been received from the associative memories and the status of this data (as described later).

The instruction buffer register 14 temporarily stores the instruction. One output of the instruction buffer register 14 is gated into an instruction register 28. Another output, the memory module code, is gated into the memory address generator 24. A third output containing information about the data coming into the instruction buffer register is gated (see line labelled 26) to the computer program control unit 26. The memory address generator 24 determines the number identification of the particular memory module in which the next instruction and/or operand is to be stored or is to be found, as the case may be. The M memories in the system are numbered 1 through M.

The memory address generator 24, as described in detail later, consists of an input and an output register, a count-up-one and a count-down-one circuit, a test circuit and proper gating and control circuits. An output of the memory address generator 24 is gated to computer module output multiplexer 30. Another output of the memory address generator consists of control information which is gated to the computer program control unit 26.

The instruction register 28, the left operand register 20, and the right operand register 22, are the principal registers of each computer module. As their names imply, they are used to store the instruction (see FIG. 5A for format) and the left and the right operand associated with the instruction. An output of the instruction register consists of the code field which is gated into an instruction decode unit 32. The complete data word contained in the instruction register may be gated to either the left operand register or the right operand register on lines 34. The subscript portion of the tag filed, described later, contained in the instruction register is gated into a tag generator 36. All, or portions of the data word contained in the instruction register, may be gated to the computer module output multiplexer 30. In addition to the input data coming from the instruction buffer register 14, the instruction register will receive data from an arithmetic unit 38 (FIG 2B) the tag generator 36, and the left operand register 20. The data coming from the arithmetic unit will be the result of an arithmetical operation. The data coming from the tag generator consists of control information which will alter the subscript portion of any tag field. The data coming from the left operand register is the result required under the special IF instruction to be described later.

The left and right operand registers in addition to receiving information from the instruction register 28 and the operand buffer register 14 receive information also from the tag generator. This information will result in changing the subscript portion of the tag fields of these registers. The data fields of the operand registers are gated into the arithmetic unit via lines 828 and 830. Portions or all of the data words contained in the operand registers are gated on lines 40 to the computer module output multiplexer. The instruction decode circuit 32 will decode the code field coming from the instruction register 28. The output of the instruction decode circuit is transmitted to the computer program control unit 26 and the arithmetic unit 38. The instruction decode unit determines the type of operation to be performed. For example, the instruction decode unit will determine whether the instruction is a unary or a binary operation, an addition operation, a multiplication operation, or the like. In executing this function, the instruction decode circuit takes a binary coded input and puts it into a one-out-of-N output code. This one-out-of-N code is then transmitted to the arithmetic unit 38.

The tag generator 36 generates the tag of the next instruction and operand and stores these tags in the instruction register 28 and in either the left operand register 20, or the right operand register 22. The tag generator consists of a subscription register, a rightmost 1 circuit and an indicator bit, the operation of which is to be described later herein. The output of the tag generator results in updating the subscript portion of the tag fields of the left operand register, or the right operand register and the instruction register. In addition, the tag generator sends and receives control signals to and from the computer program control unit 26. These functions are described in detail below.

The arithmetic unit 38 is a conventional unit which performs the required arithmetical and logical operations on the left and right operands, as called for by the instruction. The output of the arithmetic unit may be gated into the instruction register 28. Control information is also transmitted between the arithmetic unit and the computer program control unit. The computer module output multiplexer 30 is responsible for gating the output of any computer module into the proper associative memory via the output channels. The multiplexer, consists of a set of fixed channels, each channel contains one of the N OR circuits (there are N computer modules), a memory adress decode circuit (FIG. 9A) for selecting a desired channel to a memory and the necessary gating logic. Having multiple channels, the multiplexer is capable of transmitting, in parallel, simultaneously, several requests to the associative memories.

A memory control information unit 42 (FIG. 2B) whose operation is discussed in detail later is an encoding circuit which accepts an input from the computer program control unit 26 and sends an output to the computer module output multiplexer 30. This output information contains the program to be executed by the memory, the name of the computer sending the request, the identification of the computer module buffer register that is to receive the requested information from the memory, and the identity of the principal register in the computer module to receive the information retrieved from the memory.

The M associative memories 16, 16*a* and 16*m* have associated therewith respectively memory input queues 44, 44*a* and 44*m*. These memory input queues are first-in, first-out buffer memories, described later, which temporarily hold the storage and retrieval requests for their respective associative memories. These requests are gated into the memory queues from the computer modules by way of the computer module output multiplexer 30. The outputs of the memory input queues consist of data word and control information. These outputs are gated into the resepective associative memory modules on request for new work from the memory. Each queue, as described in detail later, consists of a set of registers whose inputs are controlled by an input ring and whose outputs are controlled by an output ring. An output device 46 (FIG. 2A) is adapted to receive data from the computer modules via the computer module output multiplexer 30 over lines 838. The output device, as stated above, is responsible for taking the data and converting it to proper output media, such as tapes, cards, printed forms, and the like.

The input device 10, as stated above, receives requests for new work from the computer modules via the computer module output multiplexer. The input device consists of units which are capable of transmitting data into the system. These input units may operate on tape, cards, discs, and the like. As has been described earlier, the input device on receiving a request for new work will present data directly to the memory output multiplexer 12 (FIG. 2A).

The above mentioned associative memory modules 16, 16*a* and 16*m* include associate memories of the type that have been described in our United States patent application, Ser. No. 163,096, above noted. In addition, these modules are capable of performing conditional destructive reading therefrom as set forth below. Conditional destructive read out will destructively read any matched word in memory unless it has a special mark. If a word has this special mark, it will be non-destructively read when executing the reading operation, as will be more completely described.

The associative memory module will also contain the proper interface logic necessary to communicate with the memory output multiplexer. A more detailed description of the associative memory will be presented later herein.

The computer program control unit 26 (FIG. 2D) is an encoding, decoding and timing device, one for each computer module, which provides the proper gating signals to the functional units of the system herein. See also FIGS. 17A, 17B and 17C.

The associative memory modules 16, 16*a* and 16*m* of FIG. 2A are identical. Each of these memory modules (FIG. 12) includes an associative memory, as shown in FIG. 8, which corresponds to FIG. 1 of our aforesaid application for United States letters patent, and to which reference is had for a detailed description of the memory structure and operation. So much of the memory will be described in respect to FIGS. 8 and 12 as may be necessary for the instant application.

*Binary tree programming*

Programming of the system makes use of a binary tree structure for relating the various words of a set of instructions. By a binary tree structure is meant a topological arrangement in which the branch points or nodes are formed by at most two branches coming together to form a single branch. The advantage of this structure for the program is that several processors can be simultaneously working down the branches of the tree. In more conventional programming methods, the instructions are given in a set of sequential words, and a single computer proceeds from one word of instruction to its successors. In contrast there to, a binary tree structure is implemented by an associative tag which appears in each word of data or instructions in the memory. This tag when properly interpreted will show where in the tree structure that particular word will fall.

In FIG. 5A is shown the breakdown of the instruction word format into its principal fields (with the control field included). Briefly, the problem number field or portion of this instruction word format comprises a unique identification of each problem that may be in the process of being carried out by the computing system. The status field portion gives certain information about a word, such as whether or not it is ready for computation, whether or not it is an instruction, whether or not it is a constant, etc. The tag portion with its subscripts is the principal field for associative retrieval, although the associative operation will, at times, be applied to one or more of the other fields. The principal part of the tag gives the name of the tree, while the subscript shows where it falls in topological relationship to the rest of the tree. The code field portion defines the type of operation to be performed. The item and subscripts portion is associated with certain codes and defines the location of other words to be referenced. The control field portion, which is shown separated from the other fields of the word by a double line, represents control information that in certain cases will travel with the rest of the word although this control information is not stored in the memories as part of the memory word.

In FIG. 5B is shown the breakdown of a data word format into its fields. Note that this breakdown follows the format of that in FIG. 5A, except that the data may extend over the portion of the word that, in the program word, is used for the two fields code and item. A more complete description of these fields now follows.

*Problem number.*—The problem number (FIGS. 5A and 5B), as stated, is a unique designation for each problem that may be in the computer system at any one time. Sufficient bits of information are provided to accommodate the largest possible problem number that may be required.

*Status.*—The use of the status field is basic to the operation of the system. The various possible status marks are as follows:

I—All instruction format words are given the status I symbol.

C—This status is assigned to data that is to have more than one use. Essentially, it is what determines the non-destructive reading of the data from memory.

R—Data words that are ready for computation are marked by the symbol R. This is the symbol a computer module uses to perform an associative retrieval when it is looking for data. As the data activation symbol, this is an important part of the controlling information.

T—This symbol designates a data format word which is temporarily made available for use in computation. Generally speaking, proceeding down a tree, only those data words having a T symbol may be retrieved for direct use in the computation. Ordinarily, it is read out destructively.

PC—This is the symbol for a program constant and as such will be read in with program instructions. However, in that case it will have the format of the data format word shown in FIG. 5B.

B—This indicates that there is an unconditional branching operation following the completion of the instruction in which the symbol B appears.

It should be noted that these symbols are not mutually exclusive but may occur in various combinations. In particular, the R and the T will occur together, as will the R and the C. Furthermore, the B symbol may occur with the I symbol. It should be further noted that the symbols mentioned will be coded in conventional fashion for convenience in representing the operations to be performed. An appropriate code for this representation requires not more than five bits.

*Tag and subscripts*

Each tree of instructions, as mentioned, is designated by a tag. Since the problem number supplies a unique designation for each problem in the system, a tag designation used in one problem may be reused in another problem. The tag subscript shows the position of a word in the tree structure, as previously stated. For example, in FIG. 6, consider the tag shown as Y011. The name of the tree to which this word belongs is Y and the subscripts 011 indicate that the word is the right branch of a major left branch of the tree. This is explained as follows: reading from the right of the subscripts, the binary 0's appear as blanks until the rightmost 1 is encountered. These 0's are non-significant. Furthermore, the rightmost 1 is also non-significant, but it indicates that 0's and 1's to the left of it are significant. The significant 0's and 1's indicate the direction of the branches by employing a "0" for a left branch, and a "1" for a right branch. To recapitulate, with the tag Y011, assume that the subscript field provides for a total of four subscript bits. In this case, the rightmost subscript bit is a "0" as stored in the binary storage device, but being nonsignificant is shown as a blank in FIG. 6. The third bit, counting from left to right, is a "1" and, since it is the rightmost "1," it is non-significant. Of the remaining two bits, the first bit, counting from left to right, is a "0," indicating that this word belongs to a major left branch. Since the second bit, counting from left to right, is a "1," it indicates that the word belong to a right branch of the major left branch previously mentioned.

It should be noted that the use of the subscripts makes it possible to derive from any given set of subscripts the subscript of the successor word below any given word in the tree structure and also to derive the subscript for that connected adjacent word which, with the given word, will serve as operands for the successor operation.

*Code and item and subscripts*

The code field (FIG. 5A) designates the usual arithmetic operations, such as addition, subtraction, multiplication and division. (Note that an asterisk (see FIG. 4A) is used to indicate the multiplication operation.) Additional designations include the absolute value operation (ABS) and three special designations (D, L and IF). These latter special designations make reference in the item field to other words. Thus, in FIG. 6 the instruction with tag Y001 and code D, has the item A. This means that data whose tag is A is required for activating this instruction. For an example of a code L instruction, see the instruction word whose tag is Y111111 in FIG. 3. The tag Y11011 appears in the item field of this word, indicating that in order to activate the instruction, a data word is required as computed by the instruction whose tag is Y11011.

The code "IF" indicates a conditional branching operation, the condition being determined by the positive or negative nature of the value computed by the right branch instruction preceding the IF instruction. For example, see FIG. 3, where the instruction word with tag Y111 has code IF. If the value of the result produced by the instruction with tag Y1111 is positive, the course of computation will proceed down the tree employing the value of the result computed by the instruction whose tag is Y1101, but if the right operand result is negative, then the course of the computation will be returned as indicated by the dotted lines to go through the loop again, employing the value of the left operand. Note that the dotted line connection is dictated by the fact that the item in the word with the IF code is an X, and the items in the words to which the connection is made are also X.

*Data.*—When a word is a data word, the corresponding code field, the item and the subscript field spaces of an instruction word are, in the data word, combined to supply maximum space for the data, as shown in FIG. 5B. When the data is a numerical value, as it is in the examples under consideration, it consists of an alegbraic sign and the binary representation of the number in conventional form appropriate to the particular arithmetic unit employed.

*Control.*—As mentioned earlier, the control field (not shown in FIG. 6) is not a part of a word when stored in memory but represents control instructions that may be transmitted with the word. For example, when an input device bring a word into the system, the control field will contain the code indicating the memory into which the word is to be stored, and whether it is an instruction word or a program constant, namely status I or PC respectively. In this case, the control field has been pre-computed by a compiling or assembling program. In the case where words are being stored in a memory by a computer module, the control information will carry the instructions that inform the associative memory what operation it is to perform on the transmitted word. In the case where a computer module is interrogating an associative memory for the retrieval of a word, the control information transmitted will inform the memory what it is to do with the interrogating word that is being transmitted; furthermore, the instructions will be used when the associative memory returns the retrieved word to the computer module to route the word to its correct designation. Within the associative memory (FIG. 7), other control information includes a vacancy bit VB which designates whether or not a particular register in memory is vacant; a match indicator bit MI which designates whether or not a given word matches an interrogating word; and a marking bit, as described later, which is used for marking the words acted upon in an associative memory where more than one word is to be retrieved.

*Associative logic and memory background*

An associative memory is a digital storage device in which a record or a block of information is located to be retrieved or operated upon by designating a portion of its contents instead of its location. Associative memories are sometime referred to as content-addressed memories.

In memories of this type, it is unnecessary to remember where, in memory, information has been stored. The desired information is located merely by asking for it on the basis of its content. In FIG. 7 words are represented by the numbered rows of characters. For example, FIG. 7 shows a simplified 8-word, 8-character-per-word memory with alphabetical information, however, in storage in lieu of conventional binary bits. The column of MI blocks represent match indicators and are used for marking information for read-out. The column of blocks marked VB are binary vacancy bit indicators. If they contain a "0," the information in the register is not valid and the register is considered vacant. A "1" in a VB block indicates valid information. Thus, registers 3, 5 and 8 are vacant and available for the storage of new information.

As an example of how information may be read out, suppose it is desired to know all of the words in memory having the word CAT in positions 1 to 7. The word CAT will be put into an interrogation register, as described in pending application, Ser. No. 163,096 in positions 1 to 3 and in one operation the match indicators for words 1 and 7 will be turned on. Subsequent memory cycles will read out each of these words. In writing information into the associative memory, the word is stored in the first vacant register (register 3 in the example of FIG. 7). Other logical features of an associative memory make it possible to—

(1) To substitute portions of a word or words in memory without bringing the words out of memory. In this way, a single instruction can be used to change items in many words in one memory cycle. This feature is called the selective write mode.

(2) To obtain by a single instruction the next higher or the next lower associated word.

(3) To select all data greater than or less than a designated value. The retrieval of a value so designated is accomplished in one memory cycle by a single instruction. When multiple selections have occurred, an additional memory cycle per retrieval is necessary, but the entire retrieval is accomplished by the initial instruction.

(4) To retrieve randomly stored words in an ascending or descending order by a function which is called associative memory with ordered retrieval.

(5) To select all data between designated limits and retrieve one word. This operation requires only two memory cycles, an additional memory cycle per multiple selection will complete the operation.

In FIG. 8, which illustrates an associative memory and control circuit an entry register 48 serves to receive from a computer module, as described later, via entry switches and mask switches either a word which is to be stored in the associative memory system or an interrogating word which is to determine the retrieval of a word, or words, from the associative memory. The register provides means to mask out those bit positions which are not required in making the interrogation. Control lines 50 (indicated by the block) control the function of the entry register. A first word register 52 i.e. "WORD REGISTER 1" shows the breakdown which pertains to all of the other word registers in FIG. 8. The other registers are indicated by the reference numerals 54, 56 and 58. The detailed breakdown shows that each word register contains a vacancy bit position, a marking bit position and a plurality of storage bit positions whose contents can be grouped together to represent numerical or alphabetical characters. Also shown are two range bit positions, i.e. a low bit position, and a high bit position. These latter two bit positions are not pertinent to the present invention.

Associated with the word register 1 is a word 1 control means 60 (indicated by a block); associated with the word register *n*–2 is a word *n*–2 control means 62; associated with the word register *n*–1 is a word *n*–1 control means 64; and associated with the word register *n* is a word *n* control means 66. The word 1 control means has the function of determining when a word is to be read into word register 1 and also the function of determining when a word is to be read out of word register 1. It, in turn, is controlled by a vacancy bit circuit in case of information to be read into the word register, and by a matching circuit in the case of selecting a word to be read out of the register. The overall control of the memory is exercised by a memory control unit 68 which is effectuated by memory control information received from a computer module via the computer module output multiplexer (FIGS. 9A and 9B and 9C) and the control switches indicated in FIG. 8 by line 366. Control indicators 70 are sensed to provide control information for the memory output multiplexer (FIGS. 10A–10B). Control indicators 72 (FIG. 8) also provide information to the memory output multiplexer, specifically giving the information that the memory does not have a match for the interrogating word. Exit indicators 74 (FIG. 8) are sensed to provide the output information to the memory output multiplexer 12 of FIG. 2A (see also "EXIT INDICATORS" FIG. 12).

A select register 76 (FIG. 8) is employed in the operation of selective writing to designate which bit positions are to be employed for the selection of the word registers into which the selective writing is to occur, and further for determining which bit positions of the selected word registers are to be written into. In the above-identified application for patent, the select register has additional functions which are not required in the present application. Associated with the select register 76 are control lines 78 (FIG. 8) which exercise control over and provide timing during the operation of the select register.

A ternary counter 80 and a character select matrix 82 with its control lines 84 have functions required in our United States application for patent, Ser. No. 163,096, but not required in the present system.

As an example of the operation of the associative memory, consider writing a new word into the first vacant register. In this case, the word is brought from a computer module via the computer module output multiplexer 30 of FIG. 2B and the memory input queue 44 of FIG. 2A to the entry register 48 (FIG. 8). Also, appropriate memory control information is brought into memory control 68 via line 366. This information will control the memory to operate upon the vacancy bits of the word registers to locate all the vacant word registers. Circuits within the word control means for these registers will determine the first register that is vacant and cause the entry switches for that register to operate and receive the word from the entry register 48. At this time, the vacancy bit of the entered register is now set to 1 indicating the occupied state of that register.

As a second example, consider the first-in, first-out writing operation. (This operation is sometimes called FIFO.) Here it is desired to store a word at the end of an already existing list of words in the memory, such that a first-in, first-out system is assured. The word to be written into memory is again brought into the entry register with mask information to the mask switches, masking out all of those bits not required for the identification of the name common to the words in the list. Memory control information in the memory control unit 68 identifies the operation to be performed and a comparison is made on the name of the list, locating those word registers which contain matching names in the list. Circuits in the corresponding word controls determine the last such matching word and from that point energize the circuits to determine the first vacant register beyond the last matching register, operating the appropriate word control circuits to store the word in that register.

For a third example, consider the selective writing function which is sometimes referred to as selected field entry. In this case, it is desired to write common information into one or more word registers which have been selected on the basis of a comparison. Control information is brought to the memory control unit 68 and through the control lines 78 to operate the select register 76 to determine which bit positions are to serve for selection purposes and which other bit positions are to receive the information to be stored. The information to be stored is transmitted into the entry register 48, as mentioned earlier. In this case, several word registers may match the interrogation bit positions and their corresponding word controls will then condition the circuits to operate the entry switches of the corresponding word registers to enter the new information in the selected bit positions. It should be noted that this operation is carried out without disturbing the contents of the non-selected positions of the selected word register and, of course, without disturbing the contents of the non-selected word registers.

For a fourth example, consider retrieval of matched words. In this case, the memory control information, in the memory control unit 68, determines that the bit positions in the entry register 48 which are not masked will operate the comparison circuits in the word registers to determine which word registers contain matching words. Matching words in the word registers set up the controls of the corresponding word control circuits to determine which is the first matching word in the memory. This word can then be read out either in the destructive mode or in the non-destructive mode as determined also by the memory control information in the memory control unit. In the case of a destructive read out, the vacancy bit which had been set at 1 is then reset to 0, indicating that the information in the corresponding word register is no longer valid. In the case of a non-destructive read out, the vacancy bit remains set at 1 indicating that the information in the corresponding word register is to remain as valid information. If the vacancy bit remains set at 1, new information coming in to be stored in the memory will not be stored in that particular word register, but if the vacancy bit is set at 0, the particular word register will be available for the storage of new information.

Part of the control information retained with each word register is the marking bit. This is employed when there are multiple matches of an interrogating word. As a word is retrieved, the marking bit can be set to indicate the retrieval of the word. This then permits the retrieval of all of the words that match a given interrogating word by preventing any marked word from being retrieved. At the end of the retrieval of a group of marked words, the marks may then be reset to permit future retrieval from this same group of words.

ASSOCIATION LOGIC FOR HIGHLY PARALLEL SYSTEMS

*Rules for loading and executing binary tree programs in ALPS*

Binary tree programs involve two formats of words, namely, instruction word format and data word format. As described above, the status field of the word is used for distinguishing between these two formats. Instruction words and data words when taken together constitute the data information as distinguished from the control information.

(1) *Instructions.*—The instruction format word will have an I in the status field, and the particular operation that is called for my the instruction will be coded in the code field. In addition to the arithmetic operations, there will be a data actuated operation, code D, a list actuated operation, code L, and a conditional branch operation, code IF. The D, L and IF instructions will have referral names in their item fields.

(2) *Data.*—The data is divided into three classifications, namely:

(a) *Program constants.*—All program constants are marked with a PC in their status fields. Program constants are an integral part of the program tree but they are data words rather than instructions.

(b) *Constants.*—Constants are marked with a C in their status fields. Constants are data words which activate instructions. Constants are usually read from memory in a non-destructive mode. A constant data word may be erased from memory by using the selective write mode, described elsewhere. Upon using the selective write mode, one can set the vacancy bit word of the selected constant data words to indicate vacant registers.

(c) *Temporary data.*—Temporary data will be marked by a T in the status field. Like constants, temporary data words activate instructions. As the name implies, the temporary data words will normally be destructively read from the memory.

There are two major types of operations that a computer module performs, namely, the loading operation and the running operation. As explained elsewhere, a computer module that is free and available to perform work searches for work to do. An input device which has input information to be loaded into the system sets a ready signal that can be interrogated by a computer module. This is the means for activating a loading type of operation. The running operation is activated by ready marks in data words as will be more fully described. The loading and running operation of the system can best be understood by reference to the following rules which govern these operations. These rules define what the computer module is to do with each word depending upon its content.

*Loading operation*

*Rule 1.*—Following a dump or vacant operation (which will be described in later rules) or on first going into operation following a "power off" situation, the vacant computer module enters the loading mode and interrogates the input device to see if it is in the ready state signifying the presence of input words. If the input device is not ready, the computer module changes to the running mode and proceeds under rule 6. If the input device is ready, a word of the loading block of words is taken to the computer module.

If the word received by the computer module is an instruction, as indicated by an I in the status field, or if it is a program constant, as indicated by PC in the status field, the word is to be stored in the proper memory as will be defined by the loading instruction. The proper memory identity has been previously computed during a compiling operation to arrange for the proper distribution of the instructions over the several memories that are available.

*Rule 2.*—If rule 1 does not apply then the word is either a constant, as indicated by a C in the status field, or a temporary data word, as indicated by a T in the status field. The computer module interrogates all memories for words defined by the tag of the loading word but identified by the memory in the item field. Further, only those words are selected which are instructions, as indicated by an I in the status field and with code D in the code field. Any words so retrieved are marked. The computer module then generates a new word using the tag of the code D word with the number from the status C or status T word, carrying forward to the newly generated word the C or T, as the case may be. This new word is then stored back into the same memory from which the code D word was taken. This word is marked with the ready symbol R in the status field and stored first-in, first-out with respect to any other status R words in that same memory. If the word being stored is a status C word, memory is updated by deleting the corresponding old C word, if it exists. Operation under rule 2 is repeated until no further matched words are retrieved.

*Rule 3.*—Further words are loaded by repeating the operations defined in rule 1 or 2, as required, to the end of the loading block.

*Rule 4.*—After the loading of a block is completed, as signalled by the input device, the computer module retains the problem number which identifies the words in the previously loaded block and interrogates, by that problem number, all memories for those status I and code D words that are still unmarked.

Retrieved and marked words are reinterrogated by the tag of the retrieved word for a status C word. The status C word is stored as retrieved except that it will be stored with status T instead of status C. The storing operation will also add the status R mark to the word, and the word will be stored first-in, first-out wtih respect to R. Operation according to rule 4 is repeated until no further match is found.

*Rule 5.*—All marks previously put on under rules 2 and 4 are removed by the associative memory module, the computer module then vacates itself and returns to operation under rule 1.

*Running operation*

*Rule 6.*—The vacant computer module looking for work to do will interrogate an associative memory module for a ready symbol. The retrieval will be of a data word with status R as stored under rule 2 or 4, or as to be subsequently explained under rule 9, 11 or 12. On retrieval of an R word from memory, the word will be deleted from memory by a destructive reading operation, if it is a status T word, but it will be left in memory by a non-destructive reading operation, if it is a status C word. In the latter case, the status R symbol will be deleted. This word enters the instruction register 28 via the instruction buffer register 14, as shown in FIG. 2B.

*Rule 7.*—Tags for the other operand and for the instruction are computed by the tag generator 36 on the basis of the tag of the first operand retrieved under operation of rule 6 or are computed under rule 10.

At this point, the computer module has in its three principal registers either a left operand or a right operand (depending upon whether the status R words was a left operand or a right operand), the tag for the other operand, and the tag for the instruction.

*Rule 8.*—The other operand is retrieved, interrogating by status T or PC, doing a destructive read out in the case of a status T word, but a non-destructive read out in the case of a status PC word. The instruction is retrieved by employing the tag generated under rule 7. The other operand will be stored in the right operand register 22 or in the left operand register 20 via the operand buffer register 18 of FIG. 2B, while the instruction will be stored in the instruction register 28 via the instruction buffer register 14.

*Rule 9.*—If the instruction word calls for a binary operation and no other operand is available under rule 8, the computer module dumps the first operand by storing it back into memory. If the first operand is the left operand, it is provided with a status R and status T, and is stored first-in, first-out with respect to R. If the first operand is the right operand, it is stored in the first vacant register with status T. At this point the computer module vacates itself and looks for new ready designations under rule 1.

*Rule 10.*—If rule 9 does not apply, the instruction code will call for either a unary operation, or a binary operation if the other operand is available. In this case, the operation called for can be performed and will be processed in the arithmetic unit. The result of the operation is transmitted from the arithmetic unit to the instruction register, retaining the tag of the instruction as previously computed under rule 7. The computer module now proceeds down the tree by returning to rule 7.

*Rule 11.*—If the instruction is status B, indicating an unconditional branch, an interrogation is initiated for all words identified by the problem number, the tag from the instruction word is used to interrogate in the item field, and status I, marking each word as it is retrieved. From each retrieved word, a new word is generated using the tag from the retrieved word but the data from the instruction word. These words are stored with status R and status T, first-in, first-out with respect to R. Generation of such words continues under this rule until there are no further matched words, at which point the marks are removed. The computer module continues down the tree by returning to rule 7.

*Rule 12.*—Consider now an IF instruction:

(a) With the right operand positive, continue down the tree employing the data of the left operand. This means that the data in the left operand register 20 is moved into the instruction register 28 just as any result of any arithmetic operation is moved into the instruction register. Then the operation proceeds according to rule 7.

(b) Right operand negative:

(i) Interrogate for Status I, code D words, using the item from the IF word for the interrogation item. Mark each word as retrieved. From each word generate a new word using the tag of the retrieved code D word and the data from the left operand. Store this generated word with status T and status R, storing first-in, first-out with respect to R. Repeat the retrieval and the generation of new words until there is no match.

(ii) Interrogate by problem number for unmarked status I, code D words marking each word as retrieved. From each retrieved word, re-interrogate by using the tag of the retrieved word as the tag for the re-interrogation, also employing status C in the re-interrogation. Change the status C word to status T and status R, and then store that word first-in, first-out with respect to R. Repeat (ii) until no further match is obtained, thus removing the marks put on under rule 12(b)(i) and 12(b)(ii). The computer module then vacates itself and proceeds to look for new work as under rule 1.

*Rule 13.*—If the bottom of the tree is detected by the tag generator 36 while attempting to apply rule 7, the result then in the instruction register 28 is transmitted to the output device if the status is not B. If the status is B, rule 11 is followed. In either case the computer module vacates and returns to rule 1.

EXAMPLE

The following description of the operations is with particular respect to the loading and running rules. For example, consider the problem of computing $Y=|6-\sqrt{K}|$. In this problem, an iterative loop is required for the square root computation, as well as an unconditional branch operation where a computed value is to be employed twice in the computation.

Figure 3:
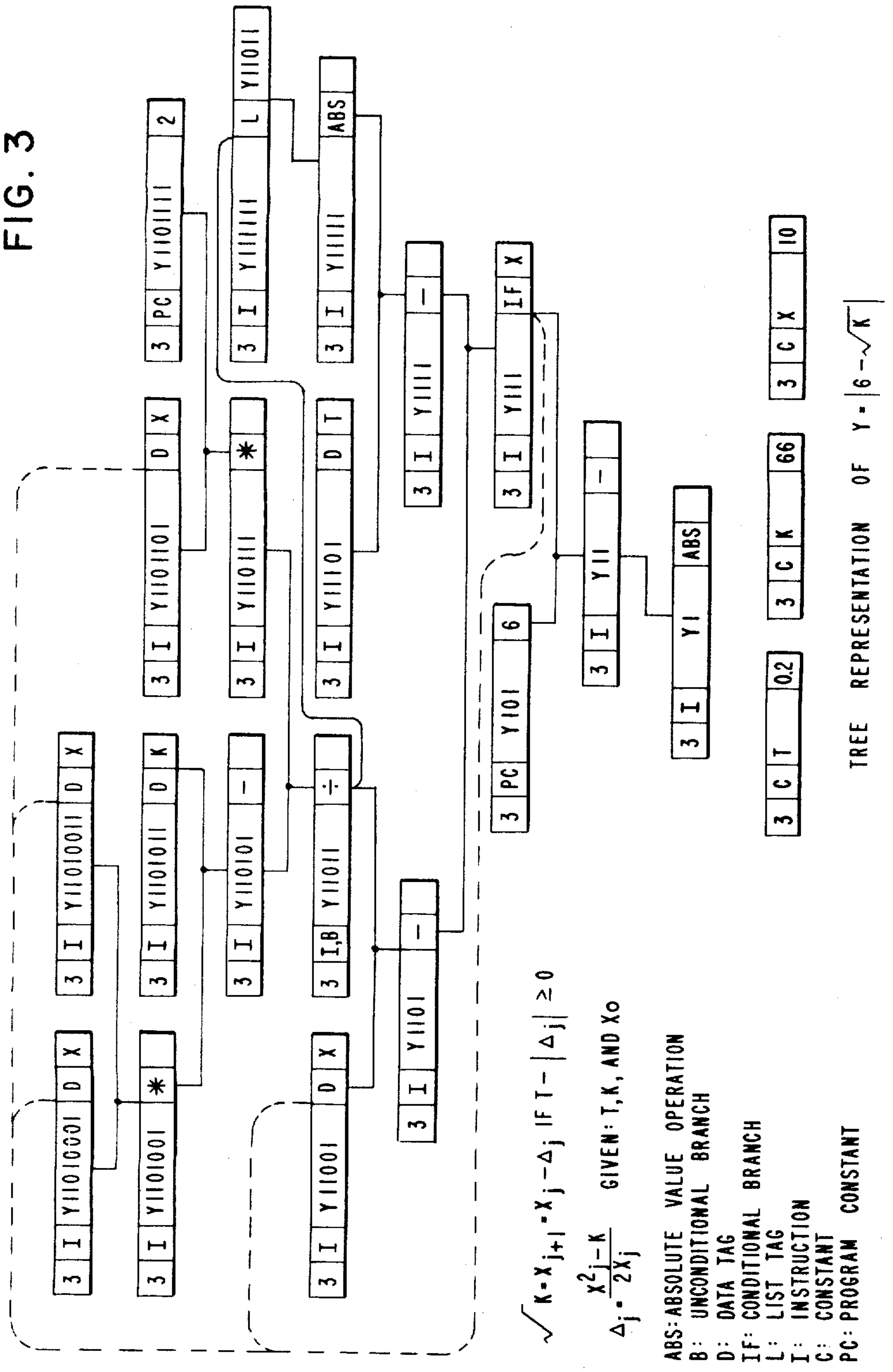
FIG. 3 is a tree representation of the problem $Y=|6-\sqrt{K}|$.

FIG. 3 gives, in tree form, the program of instructions and the input data for this problem. It is assumed that the instructions and data are ready for loading, that the loading procedure will follow, and that the running phase will then come into operation. For the purpose of this description, reference should be made to FIGS. 4A and 4B. These figures comprise a symbolic representation of the associative memories, with successive memory registers filled. Under practical conditions, the words represented in FIGS. 4A and 4B will be distributed throughout the several associative memory modules.

*Loading*

A free computer module finds an input device in ready status. A word is read from the input device to the computer module. For example, this may be the word at the bottom of the tree, i.e., the word whose tag is Y1. Since this word has status I, it will be stored in the proper memory (line 1, FIG. 4A), as required by rule 1; the proper memory having previously been defined for that particular word by the program compiling operation. (The address of the proper associative memory module appears in the memory portion of the control, as described elsewhere.)

After storing the word designated by tag Y1, a second word will be read from the input device. This may be, for example, the word whose tag is Y110101. Again, the status is I, so that this word will be stored in memory (line 2, FIG. 4A). Again, a word is read from the input device. Assume that this is the word with tag Y1101111. This word has status PC and again under rule 1, it will be stored in memory (line 3, FIG. 4A). This same computer module will then proceed to store all of the words shown in the tree. These words are shown at lines 4 through 19, of FIG. 4A.

After the loading of the tree into memory, the data for the problem will become available at the input device. Assume that the computer module then receives the word with tag T. This word has status C so that rule 1 does not apply and the computer module continues its operation under rule 2.

From the word with item T, which has been brought into the computer module instruction register 28, interrogation will retrieve the word whose tag is Y11101 shown at line 11 of FIG. 4A. A new word is generated from these two words under rule 2 and is stored in memory, shown at line 20 of FIG. 4A. Note that this word has status R and status C and hence is a ready word that is available for associative retrieval by any free computer module. Had there been an old status C word in memory with this same tag, it would have been deleted at the time of loading this new word. For simplicity in explanation, no attempt will be made at this point to show the performance of parallel operations. The status R word will be operated on after the loading operation has been completed. Since there is only a single status I word with item field T, this completes the loading operation with respect to the word with item T.

The computer module then receives the word with item K and then retrieves the instruction format word Y1101011, shown at line 16 in FIG. 4A. From these two words, a new word is generated under rule 2, and it is stored in memory as shown at line 21 of FIG. 4A. Again, since there is only one word whose item is K, the next word with item X will be brought from the input device to the computer module. This word will serve to generate in conjunction with the appropriate instruction format words, four new words to be stored in memory, since the value of X is required at four places in the program. First, the instruction word Y11001, shown at line 9 of FIG. 4A, will be retrieved and from it, in conjunction with the data word, a new ready word will be generated as shown at line 22 in FIG. 4A. With the same data word, but now with an instruction word whose tag is Y11010001, shown at line 17 of FIG. 4A, the new ready word will be generated and stored in memory as shown at line 23 of FIG. 4B.

In similar fashion, the ready words, shown at lines 24 and 25 of FIG. 4B, will be generated from this same data format word in conjunction with the instruction format words retrieved from lines 18 and 19 of FIG. 4A.

Note that when these instructions are retrieved from memory, the instructions are marked. Since the loading block has now been completed, rule 4 is followed to find any additional code D words of this same problem which, in this example, is problem No. 3. In this case, all of the D words have been retrieved and marked in conjunction with the loading of the data whose tags were T, K and X, hence no further operation is required under rule 4. At this point, the computer module having completed the loading, interrogates the memories for all code D words, removes the marks as required by rule 5, vacates itself, and proceeds to look for ready work to do.

*Running*

A free computer module looking for work to do will interrogate all memories for any status R word under rule 6. In this case, it is assumed that the ready data word with tag Y11101, shown at line 20 of FIG. 4A, will be retrieved. As it is retrieved, the R status will be deleted in the memory location. However, since it is a constant with status C, the data word itself will be non-destructively read, other than the deletion of the R symbol. This word is transmitted to the instruction register 28 of the computer module and under control of the tag generator 36 appears as the left operand. The tags Y11111 for the right operand and Y1111 for the instruction then appear in the right operand register 22 and in the instruction register 28, respectively. Retrieval of the status I instruction with the tag Y1111, as shown at line 8, FIG. 4A, is completed. However, the attempt to retrieve the status T word for the right operand is unsuccessful. Since the code in this instruction calls for a binary operation, the right operand is also required in order to perform the instruction. Hence, the computer module cannot perform this operation and under rule 9 must dump the first operand which, in this case, is the left operand. The left operand is, therefore, returned to memory where it appears with status R and status T at line 26, FIG. 4B.

This computer module (or any other free computer module, if there is more than one computer module available) will next retrieve the ready data word with tag Y1101011, shown at line 21 of FIG. 4A. From the tag of this word, which is a right operand, there will be computed the left operand tag *Y1101001*, as well as the instruction tag Y110101. The new instruction tag will be used to retrieve the instruction word (tag Y110101) shown at line 2 of FIG. 4A. This instruction calls for the binary operation of subtraction and, therefore, requires a left operand as well as the presently available right operand. Since the attempted retrieval of the status T word with the left operand tag will be unsuccessful at this stage, again, the computer module must dump the right operand which, when dumped, will appear as shown at line 27 of FIG. 4B. Note, that no ready symbol is put on this word since it is a right operand.

Next, a computer module will retrieve the word with tag Y11001 which is shown at line 22 of FIG. 4A. The tags for the right operand and instruction, Y11011 and Y1101, respectively, will be computed from the tag Y11001. As before, no right operand, status T word, will be available. Therefore, the left operand will be dumped with the ready symbol as shown at line 28 of FIG. 4B.

The word with tag Y11010001, which is a left operand, will now be retrieved and from its tag will be computed the tag Y11010011 for the right operand, and the tag Y1101001 for the instruction, as shown at line 15 of FIG. 4A. Again, no status T word will be available for the right operand and since it is required by the multiplication operation of this instruction, the left operand will be dumped and will appear as at line 29 of FIG. 4B.

The computer module next retrieves the ready data word with tag Y11010011, as shown at line 24 of FIG. 4B. This is a right operand with value 10 for its data. From its tag the computer module will find the tag of the left operand Y11010001, as shown at line 29 of FIG. 4B. The left operand, being stored as a status T word, will be read destructively and hence deleted as it is being read out. The instruction with tag Y1101001, as shown at line 15 of FIG. 4A, calls for the operation of multiplication and now with both operands present, the operation can proceed in the computer arithmetic unit 38. The result, 100, will appear in the instruction register 28 with the tag of the instruction. As the operation moves down the tree from this point, the results of the last operation will become the left operand for the next lower level of computation and will appear in the left operand register 20. The tag Y1101011 for the right operand will be generated. This right operand is as shown in line 27 of FIG. 4B, such that the value 66 will be retrieved destructively and stored in the right operand register 22. Furthermore, the tag Y11010101 for the instruction will be computed and the instruction, which is for subtraction as shown at line 2 of FIG. 4A, will be retrieved from memory. The subtraction operation (100—66) will be performed in the arithmetic unit 38 and the result 34 will appear in the instruction register 28.

Moving down the tree, the result 34 will be moved into the left operand register 20 retaining its tag Y110101. The tags Y110111 and Y11011 for the right operand and instruction, respectively, will be computed. The instruction as shown at line 10 of FIG. 4A will be retrieved but no status T data word will be available for the right operand. Hence, the left operand will be dumped as shown in line 30, FIG. 4B. (Note that this word would actually appear in memory in the location previously occupied by the word with tag Y1101011 shown at line 27, since the latter was retrieved destructively. For simplicity of presentation, the word is shown at line 30 instead of attempting to show the altered status at line 27.)

Next, the ready data word Y1101101 will be retrieved. This is a left operand with the result that the right operand tag will be computed as Y1101111. The right operand is a program constant, status PC, and can be retrieved under rule 8. Also, the instruction with tag Y110111 will be retrieved. This calls for the multiplication of 10×2 which produces the result 20 which will now appear in the instruction register 28.

Moving down the tree, the result of 20 will appear in the right operand register 22 with its tag Y110111 and the left operand tag Y110101 will be computed and the status T word, shown at line 30 of FIG. 4B, will be destructively retrieved successfully. The operation required by the instruction with tag Y11011, as shown at line 10 of FIG. 4A, is division; hence the operation of division will now proceed in the arithmetic unit 38. The result of 34÷20, which is 1.7, will now be available in the instruction register 28.

Here it is noted that this instruction has the status B which indicates a branching operation. Therefore, the operation required by rule 11 must be performed before proceeding down the tree. On interrogating in the item field with the tag Y11011, the instruction word with tag Y111111 is retrieved as shown at line 14 in FIG. 4A. From this word a new ready data word is generated employing the value 1.7, derived from the last arithmetic operation. The new ready data word so generated is stored in memory, as shown in line 31, FIG. 4B. Since only one branching operation was called for, the computer module now proceeds down the tree with the value 1.7 now moving to the right operand position, retaining the tag Y11011. The left operand and instruction tags Y11001 and Y1101, respectively, are now generated. The temporary data for the left operand, shown at line 28 in FIG. 4B, is successfully retrieved from memory and the operation of subtraction called for by the instruction shown at line 7, FIG. 4A is performed with the result that the remainder 8.3 is transmitted from the arithmetic unit 38 to the instruction register 28.

Once more upon moving down the tree, this result now appears in the left operand register 20 with tag Y1101, and tags Y1111 and Y111 are computed respectively for the right operand and for the next instruction. The instruction shown at line 6 of FIG. 4A is retrieved and it is noted that the instruction calls for a binary operation requiring both operands. The temporary data word for the right operand is not available with the result that the left operand will be dumped as shown at line 32 in FIG. 4B.

Next, a computer module will pick up the ready data word with tag Y11101 which is shown at line 26 of FIG. 4B. Since this is a status T word, it will be deleted as it is read. Tags Y11111 and Y1111 will be computed for the right operand and for the instruction, respectively. The binary operation instruction, shown at line 8 in FIG-4A, will be retrieved, but no item T data word will be available. Hence, the left operand will be dumped as shown at line 33 of FIG. 4B and the computer module will seek another ready data word. In this case, the word with tag Y111111 will be retrieved and the tag Y111101 for the left operand will be computed. The tag Y11111 for the instruction will also be computed. There will be no left operand available; however, the instruction as shown at line 12 of FIG. 4A is the unary absolute value operation, which does not require a left operand. The operation will, therefore, proceed in the arithmetic unit 38 to produce the result of 1.7 in the instruction register 28, now with tag Y11111.

Moving down the tree the result 1.7 will appear in the right operand register 22 and the left operand tag Y11101 will be computed. Corresponding to this tag, the left operand shown at line 33 of FIG. 4B will be retrieved, and the instruction with tag Y1111, as shown at line 8 of FIG. 4A, will also be retrieved. The operation of subtraction will be performed and the result of .2—1.7, which equals —1.5, will be transmitted from the arithmetic unit 38 to the instruction register 28.

As the operation proceeds down the tree, the result —1.5 will appear in the right operand register 22 with its tag Y1111. The tag Y1101 will be computed for the left operand and its data, as shown at line 32 of FIG. 4B, will be retrieved destructively. The instruction with tag Y111, as shown at line 6 of FIG. 4A, will also be retrieved. This is the IF instruction which operates under rule 12. Since the right operand is negative, rule 12(b) will determine the operation of the instruction.

Upon interrogating for code D, status I words, with item X, four such words are located. From these four words new ready data words with tags Y11001, Y11010001, Y1101001 and Y1101101 will be generated in succession, as shown at lines 34–37, respectively, in FIG. 4B. In each case, the item associated with these words is the value 8.3 which represents an improved value of the square root of 66, where the value 10 was taken as an original estimate. Note further that the IF instruction amounts to a conditional branching operation where in one case the branch leads down the tree but in the present instance, its direction is back in parallel to four different locations. To complete this operation, following rule 12(b)(ii), the computer module will interrogate by problem number for any unmarked status I, code D words. The first such word retrieved will be a word with tag Y11101 as shown at line 11 of FIG. 4A. Reinterrogating with its tag for a status C word, the word as shown at line 20 of FIG. 4A will be retrieved. Changing the status to status T, this word will then be stored as a ready data word first-in, first-out with respect to R, as shown at line 38 of FIG. 4B. In similar fashion, the new ready word with tag Y1101011 will be generated from the words shown at lines 16 and 21 of FIG. 4A, the new word being stored as shown at line 39 of FIG. 4B. At this point, the computer module vacates itself and proceeds to look for new work to do.

A computer module next will find the ready data word with tag Y11001, as shown at line 34 of FIG. 4B. This is a left operand and after computing the tag for the right operand, the attempted retrieval of the right operand corresponding to the computed tag will be unsuccessful. As the operation involved is a binary operation, the left operand will be stored as required by rule 9 and will now appear as shown at line 40 of FIG. 4B. Next, the computer module will retrieve the ready word Y11010001. Since this is a left operand, this tag will now appear in the left operand register with the value 8.3. The tag Y11010011 for the right operand will be computed and the status T word, shown at line 36 of FIG. 4B, will be successfully retrieved giving the value 8.3 for the right operand. The tag for the instruction will also be computed as Y1101001 and this instruction, as shown at line 15 of FIG. 4A, will be retrieved from memory. The multiplication operation called for by the instruction will be performed and the result—68.89—will appear in the instruction register 28. The value 68.89 will move into the left operand register 20 with its tag as the operation proceeds down the tree, and the tag Y1101011 for the right operand will be computed. The status T word, shown at line 39 of FIG. 4B, will be retrieved from memory. The instruction, shown at line 2 of FIG. 4A, with tag Y110101 will also be retrieved from memory. This instruction calls for the operation of subtraction which will be performed in the arithmetic unit to produce the result 2.89 in the instruction register 28.

Moving down the tree, the value 2.89 will appear in the left operand register 20 and the tag Y110111 for the right operand will be generated. There is no status T word corresponding to the right operand tag. The operation called for at this point is the binary operation of division as indicated by the instruction with tag Y11011, as shown at line 10 of FIG. 4A, which will be retrieved from memory. Hence, the left operand will be dumped as a ready data word with value 2.89 and tag. Y110101, as shown at line 41, FIG. 4B.

Next, a computer module will retrieve the ready data word with tag Y1101101, shown at line 37 of FIG. 4B. This will appear as the left operand with the value 8.3. From this tag, tags Y1101111 and Y110111, respectively, will be computed for the right operand and for the instruction. The right operand will be successfully retrieved since it is a status PC word, as shown at line 3 of FIG. 4A. Likewise, the instruction, as shown at line 13 of FIG. 4A, will be retrieved. The multiplication operation called for will be performed in the arithmetic unit 38 and the result—16.6—will appear in the instruction register 28.

Moving down the tree, the value 16.6 will appear as the right operand and from its tag will be derived the respective tags Y110101 and Y11011 for the left operand and the instruction, respectively. The status T word, as shown at line 41 of FIG. 4B, for the left operand with value 2.89 will be successfully retrieved from memory.

The instruction, shown at line 10 of FIG. 4A, also will be retrieved from memory. The operation of division called for by the instruction will be performed in the arithmetic unit 38 where 2.89 divided by 16.6 will produce the result .17. Note here that this instruction is a branching instruction, status B. Hence, before proceeding down the tree, a new ready data word will be generated in accordance with rule 11. This will be stored with value 0.17 and tag Y111111, as shown at line 42 of FIG. 4B.

Once more proceeding down the tree, the value 0.17 will appear in the right operand register 22 while the left operand register 20 with tag Y11001 will contain the value 8.3 as retrieved from memory (line 40, FIG. 4B). The instruction register 28 will contain the tag Y1101 and the operation instruction for subtraction as retrieved from memory, as shown at line 7 of FIG. 4A. The result 8.13 of the subtraction operation will be received from the arithmetic unit 38 and stored in the instruction register 28.

Upon further movement down the tree, the left operand, shown at line 43 of FIG. 4B, will be stored in memory. Since the corresponding right operand will not be available as required by the binary operation, this left operand will be returned to memory. A computer module will next find the ready data word with tag Y11101 and value 0.2, line 38 of FIG. 4B. This word will appear in the left operand register 20 and again the appropriate right operand which is required will not be found. Hence, this left operand is stored in memory as shown at line 44 of FIG. 4B with tag Y11101 and value 0.2.

Next, a free computer module will retrieve the ready data word with tag Y111111 and value 0.17, line 42 of FIG. 4B. This will appear as a right operand and although the corresponding left operand will not be found as a status T word, the instruction, as shown at line 12 of FIG. 4A, with tag Y11111 is retrieved from memory. The instruction calls for the unary operation of finding the absolute value. Hence, the left operand is not required and the arithmetic unit 38 will return the value 0.17 to the instruction register 28.

Tihs value 0.17 will appear in the right operand register 22 with tag Y11111 as the operation again moves down the tree. After computing the left operand tag Y11101, the status T word with value 0.2, as shown at line 44 of FIG. 4B, will be retrieved from memory. The instruction word with tag Y1111, as shown at line 8 of FIG. 4A, requires the subtraction operation; the arithmetic unit 38 will perform the operation called for and will deliver the result 0.03 to the instruction register 28.

As the operation proceeds further down the tree, the instruction with tag Y111, shown at line 6 of FIG. 4A, will be retrieved together with the left operand with tag Y1101 shown at line 43 of FIG. 4B. The instruction with tag Y111 is an IF instruction which will operate under rule 12(a) since the right operand is positive, indicating that the iteration has proceeded to compute a sufficiently accurate value for the square root of 66. Hence, the value 8.13 is transmitted from the left operand register 20, and will now appear in the instruction register 28 with tag Y111 and then will move to the right operand register 22. The tag Y101 for the left operand is computed from the tag Y111. The program constant, status PC, with value 6, as shown at line 5 of FIG. 4A, is retrieved by the generated tag Y111. Also, located will be the instruction with Tag Y11 shown at line 4 of FIG. 4A. This instruction calls for the subtraction of 8.13 from 6, producing a remainder of −2.13.

Finally, moving down the tree, the value −2.13 with tag Y11 will appear in the right operand register 22 and a left operand with tag Y01, item T, will be sought, together with an instruction with tag Y1. This instruction, indicated at line 1 of FIG. 4A, will be retrieved from memory, and since it calls for the unary operation of finding the absolute value, the operation will proceed in the arithmetic unit 38 although no left operand will be retrieved. Hence, the final result is 2.13.

When the computer module attempts to move further down the tree, the tag generator will detect that these results represent the bottom of a tree and hence the result will be transmitted to the output device as called for by rule 13.

*Computer module output multiplexer*

The computer module output multiplexer 30 of FIG. 2B is shown in further detail in FIGS. 9A, 9B and 9C. FIG. 9A shows the data paths for the transmission of data between the computer modules and the memory queues, together with the gates of routing this transmission. FIGS. 9B and 9C, together, show the control logic for operating the data path gates shown in FIG. 9A.

The computer module output multiplexer permits the simultaneous transmission over separate channels of a large amount of data from several different computer modules into several different memory queues without interference. It is assumed that a fixed number of channels are provided in the system and the figures indicate a total of E channels, of which channels 1, 2 and E are exemplified. The number of computer modules employed can vary up to some fixed maximum number. In the drawings, it is assumed that there are N computer modules connected, of which the examples given show computer modules 1, 2 and N. The modularity of the system is such that additional computer modules may be added to the fixed number of channels. The number of associative memories may vary up to some fixed maximum number. In the example, M associative memory modules are indicated while circuits are shown for associative memories 1, 2 and M. In the case of the associative memory modules, the computer module output multiplexer circuits show inputs to the memory queues which will be further described in detail in respect to FIG. 11.

The data paths indicated in FIG. 9A are shown by a single line and by single logical blocks representing a multiplicity of parallel paths and circuits. Each word to be transmitted over these paths consists of many bits of information that are transmitted in parallel. The word includes the several fields shown in FIGS. 5A and 5B, as well as the control information. Here the control information is that particularly required for the proper routing of the entire word and for providing the instructions to the associative memory.

There are two major types of transmission that will be made through the computer module output multiplexer. In one case, words generated in a computer module as the result of carrying out a program will be stored in an associative memory. Hence, the transmission will require control information designating the associative memory into which the word is to be stored and instructions to the associative memory module as to what is to be done with the word. In the second case, a computer requesting a word from an associative memory sends its request from the computer module via the computer module output multiplexer to a selected associative memory. In this case, the control information will designate the requesting computer module, provide instructions to the associative memory module as to the function it is to perform and supply the necessary information for routing the output of the associative memory back to the requesting register in the computer module. This return routed information will be employed in the memory output multiplexer 12 of FIG. 2A, described in additional detail in respect to FIGS. 10A and 10B.

To be described now is the operation of the computer module output multiplexer for the first case; that is, when a computer module is storing information into a memory. Assume that a computer module, module 2 for example, is required to dump the left operand register 20 under rule 9. It will supply to its output register 86 (FIG. 9A), the complete word (format FIG. 5B) from the left operand register 20, including the tag with its subscripts, the data computed at this stage of the computation, and the status T, supplied by the computer program control unit 26 of FIG. 2B, as required by rule 9. Also, the address of the memory module into which the word is to be stored, as supplied by the memory address generator 24 of FIG. 2B. Additional control information will be supplied by the memory control information unit 42 of FIG. 2B. Specifically, this will supply the instruction, store first-in, first-out with respect to R, as required by rule 9. Assume also that this left operand word is to be stored in associative memory module M.

This entire word, including the control information, assembled in the output register 86 (FIG. 9A), will be gated into a buffer register 88 by a signal GATE on line 90, derived from the system clock of FIG. 2A. A signal $CR_2$ on a line 92 is derived from the fact that an output is present in the buffer register 88 indicating that computer module 2 has a request for transmission through the computer module output multiplexer. The signal $CR_2$ is an input to AND circuits 94, 96 and 98 of FIG. 9B.

A signal $\overline{CR_2}$ which is the complement of the signal $CR_2$ will not be present on a line 100 in this instance. The signal $\overline{CR_2}$ feeds AND circuits 102, 104 and 106 in FIG. 9B. Consider two cases—first, assume that computer module 1 also has a request going to the computer module output multiplexer as indicated by the presence of a signal $CR_1$ on a line 108 (FIG. 9A). The signal $CR_1$ is an input to AND circuits 110, 112 and 114 of FIG. 9B. A signal $\overline{CR_1}$ on line 116 which is complementary to the signal $CR_1$ feeds AND circuits 118, 120 and 122. In the present instance, there will be no signal on this line, hence the AND circuit 118 will not be operated and there will be no signal on a line 124. Therefore, the AND circuit 94 cannot operate since it requires inputs on both lines 92 and 124 for its operation. In other words, computer module 1 has taken precedence over computer module 2 in attempting to select channel 1, since the output of the AND circuit 94, if it had been present, would have supplied a signal 12C on a line 126 to operate an AND circuit 128 in FIG. 9A to put the data on channel 1. Since computer module 1 has impressed a signal 11C on a line 130, via AND circuit 110, which was operated in conjunction with the signal GATE on a line 132 supplied from the system clock 412 in FIG. 2A, an OR circuit 134 (FIG. 9B) will be operated to supply a gate pulse to the AND circuit 96 which, in conjunction with the signal $CR_2$ on the line 92, will operate the AND circuit 96 to supply the signal 22C on a line 136. The signal 22C is the control signal for an AND circuit 138 (FIG. 9A) which now operates to place the information from buffer register 88 on lines 140 of channel 2 via OR circuits 142. Thus far, it has been shown that the information from computer module 2 is routed via channel 2 because computer module 1 took preference over computer module 2 in selecting channel 1.

The lines 146 (FIG. 9A) emerging from the OR circuits 142 which carry the memory module address portion of the word, are connected to a memory address decode 2 unit 144. Since the memory address supplied by the computer module from the memory address generator 24 of FIG. 2B, calls for the storage of the information in memory M, the memory address decode 2 unit 144 operating on the information in a conventional fashion, will supply an output signal D2M on a line 148. The information now available on channel 2 should be transmitted to the memory input queue 44M provided that there is a vacancy available in the memory queue to store it. If there is a vacancy in the memory input queue 44M, there will be a signal VACATE QUEUE SIGNAL M on a line 150 (FIG. 9C), which in conjunction with the signal GATE on a line 152 from the system clock 412 of FIG. 2A, will operate an AND circuit 154. If the information on channel 1 is not destined for memory M, there wil be no D1M signal on a line 156 which would be derived in a fashion similar to the signal D2M, and the lack of the signal D1M would, in that event, condition an AND circuit 158 following inversion by an inverter 160. Hence the AND circuit 158 will be operated because of the presence of the signal from the output of the AND circuit 154 mentioned earlier. The output of the AND circuit 158 on a line 162 in conjunction with the signal D2M on line 148 now will operate an AND circuit 164 to supply the signal 2MQ on a line 166.

The signal 2MQ has three functions. In FIG 9A, it will operate AND circuits 168 to route the information present on channel 2 (lines 140) to the memory input queue 44M via OR circuits 170. Also, the signal 2MQ supplies the signal STORE CFM on a line 172 via an OR circuit 174. The manner in which the information is actually stored in the memory queue will be explained in reference to FIG. 11.

The third function of the signal 2MQ will now be explained. When a computer module seeks to transmit a request to a memory module it may be unsuccessful either because it may not be able to find an unusued channel or, even having found a channel for transmission of the information, it may not be able to get into the queue of the required memory module. If the transmission is unsuccessful the computer module will attempt again on the next gate cycle, since its request signal $CR_2$ on the line 92 of FIG. 9A will still be present. But if all conditions are met for a successful transmission of the information, it wil then be required to turn off the $CR_2$ request signal. The signal 2MQ on line 166 (FIG. 9C) is used to initiate this turn "off" operation. Any completed operation on channel 2, in this case, the operation of going to memory input queue 44M will transmit a pulse through the OR circuit 175 to produce the output signal C2 on a line 176 (FIG. 9B) which conditions AND circuits 178, 180 and 182. In the present case, the other input line 136 of the AND circuit 180 will also have a signal thereon, as previously described. Hence, the output of the AND circuit 180 produces the signal CF2 via an OR circuit 184 to reset to its 0 state a flip-flop in the output buffer register 86 of FIG. 9A. On the next cycle, if computer module 2 does not have a new request, the request bit of the buffer register 88 will correspondingly be reset to its 0 state, thus turning "off" the signal $CR_2$. This operation will prevent computer module 2 from seeking to reactivate the same request and it will also signal the computer that a new output request can be moved into the buffer register 88.

In the above example, it has been assumed that computer module 1 also had a request thus tying up the output channel 1 and thereby preventing computer module 2 from transmitting to memory module 1. Now, assume that computer module 1 does not have a request available at the time the signal GATE appears on the line 132 of FIG. 9B. With no request available, there will be a signal $\overline{CR_1}$ on the line 116, which with signal GATE will operate the AND circuit 118 to produce a signal on the line 124. This signal, in conjunction with the signal $CR_2$ on the line 92, will operate the AND circuit 94 thereby producing a signal 12C on the line 126. The signal 12C will operate in a fashion similar to the signal 22C, previously described, to place the information now in the buffer register 88 onto channel 1 instead of channel 2, as was the case in the earlier example. A channel 1 memory address decode unit 186 (FIG. 9A) will supply a signal D1M on line 156 which will serve to initiate the operation of storing the information into the memory input queue 44M through circuits similar to those described in the earlier example.

The operation of the computer module output multiplexer in the second case may now be described; that is, where a computer module is sending a request to memory for a word of information that it wishes to have returned to it. Here, as in the first case, the control portion of the word transmitted not only defines the name of the memory module to which the request is to be routed, but it also supplies the name of the computer module sending the request, as well as the name of the buffer register in the computer module which is to receive the information. Furthermore, in the case where the information is returned to an operand register, it must also supply a designation of whether it is the left operand register 20, or the right operand register 22 of FIG. 2B that is to receive the information. This control information will effect the operation of the memory output multiplexer 12 of FIG. 2A to be subsequently described. Other control information to be supplied must be the instruction to the memory as to what function it must perform. In this case, too, a part of this instruction will define which fields are to be masked out for the memory interrogation operation, this being determined by the computer program control unit 26 of FIG. 2D, in accordance with rules 2, 4, 6, 8, 11, or 12 (b) as the situation may require. This information is assembled by the memory control information unit 42 of FIG. 2B and it is placed into the output register 86. The various type of operations and the assembly of this data will be explained more fully in connection with the computer module outputs, FIG. 16. For the present purposes, consider the example of computer module 2 operating under rule 8 to retrieve a right operand from memory M. In this case, the instruction to the associative memory module coming from the computer program control unit in FIG. 9B will specify destructive read-out with interrogation on the problem number, status, and tag with its subscripts. The computer program control unit 26 will also provide the status T or PC for this interrogation. The tag which appears in the right operand register 22 will also be assembled in the computer module output register 86 of FIG. 9A for transmission for the interrogation. The computer program control unit also supplies the instruction that the code field and the item with its subscripts are to be masked out for the interrogation. The memory address generator 24 will supply the address M of the associative memory module 16M of FIG. 2A to which this request is to be directed. Since the request is coming from computer module 2, a fixed portion of the instruction will carry the information that the result of the interrogation is to be returned to computer module 2. Since it is a right operand that is required, information will also be transmitted to instruct that the return of the information from the memory is to be delivered to the right operand register via operand buffer 18 of FIG. 2B.

The operation of the computer module output multiplexer will proceed in identical fashion to that described above in respect to the first case. An available channel will be selected and, if the memory input queue of memory M is not completely occupied, the request will be delivered to that queue and the output register 86 of FIG. 9A will be released, so that the computer module can proceed with its next request which will be for the instruction required under rule 8. Note, however, that some of the control information of this request must be passed along with the retrieved word to provide for the routing of that word back to the proper computer module right operand register 22 of FIG. 2B.

*Memory output multiplexer*

The memory output multiplexer 12 of FIG. 2A now may be described in detail with respect to FIGS. 10A and 10B. FIG. 10A shows the data paths for the transmission of data from the associative memory modules to the computer modules and the gates for controlling the transmissions. FIG. 10B shows the control logic for controlling the data path gates of FIG. 10A.

The memory output multiplexer permits several associative memories to transmit information simultaneously in parallel over several respective channels to the several computer modules.

As explained earlier in connection with the computer module output multiplexer 30 of FIG. 2B, the output from an associative memory module will follow as the result of a request originated from a computer module. The request information designates the proper associative memory from which the information is to be retrieved and supplies interrogation information to form the basis for the associative memory interrogation. Furthermore, the information supplied by the computer module designates the computer module and the buffer register within that module which is to receive the output from the associative memory module. As an example of the operation of the memory output multiplexer, let it be assumed that a computer module (1) 188 of FIG. 10A has sent a request to an associative memory module (2) 190 of FIG. 10A for a data word to be delivered to the right operand register 22 of FIG. 2B, via an operand buffer register (1) 18 of FIG. 10A. When the associative memory module (2) 190 of FIG. 10A has found the appropriate word for this request, it will be stored in an output register 194 together with the information that it is to be returned to the computer module (1) 188 via operand buffer register (1) 18 (FIG. 10A) to the right operand register 22 of FIG. 2B. With information in the output register 194, a signal GATE on a line 196 (FIG. 10A) originating in the system clock 412 of FIG. 2A, will operate to transfer this information to a buffer register 198 of FIG. 10A. This information will appear on lines 200 to condition AND circuits 202, 204 and 206. Also, a signal MR2 will appear on a line 208 and its complement signal $\overline{MR2}$ on a line 210 of FIG. 10A will be removed. Referring now to FIG. 10B, the signal MR2 on the line 208 feeds AND circuits 212, 214 and 216, the function of these circuits being to determine as available channel.

If it is assumed that associative memory module 1 does not have information in its buffer register 218, there will be a signal $\overline{MR1}$ on a line 220 of FIG. 10A. In FIG. 10B, the signal $\overline{MR1}$ in conjunction with a signal GATE on a line 222 operates and AND circuit 224 to provide a signal on a line 226 which, in conjunction with the signal MR2 on the line 208, operates the AND circuit 212 to produce a signal 12M on a line 228 in FIG. 10B. The signal 12M of the line 228 (FIG. 10A) now operates the AND circuits 202 to place the information now on the lines 200 onto channel lines 230 via OR circuits 232 (FIG. 10A). The lines 230 include the circuits which are to carry the information into computer module 1, as well as some circuits 234 which carry the information as to which computer module and which buffer register within the computer module is to receive the information. The lines 234 also carry this module and buffer information to a computer-buffer register decode 1 unit 236 where conventional decoding circuits will supply an output which, in this case, will be the signal 110P on a line 238. The signal 110P, together with signals on lines 230, will operate AND circuits 240 to transmit information to the operand buffer register 1 via OR circuits 242. Note that part of the control information carried into the operand buffer register will be available to route the rest of the information from the operand buffer register 18 of FIG. 2B to the right operand register 22 of FIG. 2B.

Returning now to FIG. 10B, the signal 12M on the line 228 also serves to turn off the signal MR2 on line 208 of FIG. 10A. This is done through an OR circuit 244 which produces the signal MF2 if any channel selection has been made with respect to the MR2 signal on the line 208. If no channel selection had been made, the information in the buffer register will remain and the MR2 signal will initiate a search for an available channel on each new GATE signal on line 222 (FIG. 10B). However, when the transmission has been initiated on an available channel, as in this case, the signal MF2 will turn off the flip-flop in the output register 194 of FIG. 10A. On the next gate cycle, if the associative memory module 2 does not have a new request, the request bit of the buffer register 198 will correspondingly be turned "off," thus turning off the MR2 signal. This will also make the output register 194 available for a new output from associative memory 2.

Had associative memory 1 required the use of channel 1, a signal 11M on a line 246 (FIG. 10B) would have been generated in a fashion similar to what has been described in respect to the signal 12M on the line 228. Further, in that case the $\overline{\text{MR1}}$ signal would have prevented the AND circuit 212 from generating the signal 12M. However, the signal 11M operating through an OR circuit 248 would then operate the AND circuit 214 to produce the signal 22M on a line 250 to allow transmission of the information from associative memory module 2 on channel 2. The decoding for the computer would then proceed in a fashion similar to that already described, but in this case in a computer buffer register decode unit 252 of FIG. 10A.

If in a different case, the information were to be returned to the instruction buffer register (1) 14 (FIG. 2B), the computer decode buffer register 236 (FIG. 10A) would proceed in similar fashion but would supply a signal 11I on a line 254 instead of the signal 110P on the line 238. This would route the information from lines 230 through AND circuits 256 and OR circuits 258 into instruction buffer register (1) 14 (FIG. 2B).

*Memory input queue*

The memory input queues 44–44M of FIG. 2A will now be described in detail with reference to FIG. 11. The memory input queue, as suggested, provides means for temporarily holding requests for work to be done in an associative memory module. This permits the levelling out of work loads if the problem computation requires several accesses to a particular associative memory module within a short period of time. These requests are buffered into the queue and made available to the associative memory module on a first-come, first-served basis. The queue consists of Q registers of which in FIG. 11 three are shown by way of example, namely, register (1) 260, register (2) 262 and register (2) 264. Associated with each of these registers are input gates 266, 268 and 270, respectively, and output gates 272, 274 and 276, respectively. The data on lines 278 (also shown in FIG. 2A for memory input queue 44M), brings the request information from the computer module output multiplexer in parallel to the input gates. The operation of the input gates is controlled by AND circuits 280, 282 and 284 operated by the signal STORE on line 172, derived from the computer module output multiplexer of FIG. 9C in conjunction with input ring signals on lines 286, 288 or 290. Note that only one of these signals will be present depending upon the current setting of the input ring 292. The signal VACANT QUEUE on line 150 will also be present. This signal is also shown as an input to the computer module output multiplexer (FIG. 9C). It is provided when at least one of the memory input registers 260, 262, 264 is vacant. If a register is vacant, thus providing space to store a work request coming from a computer module, the signal VACANT QUEUE will operate as previously described in connection with FIG. 9C to produce the signal STORE on line 172, thus operating the appropriate one of the AND circuits 280, 282 or 284 which, in turn, operate the corresponding input gates 266, 268 or 270 to enter the data on lines 278 into the corresponding memory input queue registers 260, 262 or 264. The signal STORE also passes through a delay unit 294 to step the input ring 292 to its next position. (Note that following a setting to operate on register Q, the ring returns to operate on register 1.)

One of the bits in the memory input queue registers is the vacancy bit shown as V.B. in registers 260, 262 and 264. When this bit is set to 0 there will be a signal $V.B.=0$ on the corresponding one of lines 296, 298 or 300. This signal indicates that the corresponding register is vacant and available for storing in new request. These signals are combined in an OR circuit 302 to produce the signal VACANT QUEUE on the line 150, as previously mentioned. When a new word is stored in a vacant register, the vacancy bit is set to 1 by the storing of the control request bit which originates in the computer module sending the request. From each vacancy bit position, the signal $V.B.=1$ on lines 304, 306 and 308 produces the signal MORE WORK on a line 310 via an OR circuit 312, which signal is employed by the memory program control unit of the associative memory module, which has been described in connection with FIG. 8 and which will be further described in respect to FIG. 12.

An output ring 314 is set to produce a signal on only one of lines 316, 318 or 320 to identify the next memory input queue register from which a memory request is to be read. The signal READ on a line 322 will be generated by the memory program control unit of the associative memory module (FIG. 8) when the associative memory has completed operation on a preceding request. The signal READ in conjunction with one of the output ring signals on lines 316, 318 or 320 will operate corresponding AND circuit 324, 326 or 328, thus operating the corresponding output gates 272, 274 or 276. Hence the data stored in the appropriate memory input queue register will be transmitted via OR circuits 330 to provide on lines 332 a new request to the associative memory module. The signal READ on the line 322 after the operation of a delay unit 334 will step the output ring 314 to the position corresponding to the next memory input queue register. (Note again that following the operation of register Q, the ring steps to operate on register 1, as stated.)

The signals generated by the AND circuits 324, 326 and 328 as well as operating the corresponding output circuits are employed also to set the vacancy bit to 0, operating over lines 336, 338 and 340. This, then permits the now vacated register to be re-employed for storing a new memory request.

*Associative memory module*

The operation of the associative memory modules 16, 16$a$ and 16$m$ of FIG. 2A will now be described in detail in connection with FIG. 12.

The principal element in the associative memory module is an associative memory 342 which is described in detail in connection with FIG. 8. The remainder of the associative memory module includes controls for gating signals and data from the memory input queue 44$m$ of FIG. 2A into the appropriate registers of the associative memory. The data word portion coming from the memory input queue, indicated on a line 344, is carried directly to a series of entry switches 346 of FIG. 8. The control field coming from the input queue on a line 348 (FIG. 12) is separated as to its function and those bits which determine the program are carried on lines 350 into a program decode unit 352 of a memory program control unit 354. Those bits which carry the computer module address are carried via lines 356 to a computer address register 358.

Having fulfilled a preceding request, a new operation of the memory program will be initiated by the presence of the signal MORE WORK on line 310, described in connection with FIG. 11. The signal READ on the line 322 will be sent to the memory input queue and this will result in the data word and control field being brought into the associative memory module. The program bits will be decoded in the program decode unit 352 to produce, with proper timing signals, selected 1's which will be transmited over the lines 344 for setting the appropriate entry switches of FIG. 8; over lines 360 for setting appropriate select switches 362 of FIG. 8; and over lines 364 for setting appropriate control switches 366 of FIG. 8. The memory program control circuits also set the appropriate positions of the mask register 366 and they, in turn, provide corresponding signals on lines 368 to set mask switches 370 of FIG. 8.

A memory output register 372 (also shown in FIG. 10A) is the register in which is assembled a data word with the appropriate control information for transmission via the buffer register 418 and the memory output multiplexer to the proper computer module. If the memory output register is still occupied with information from the preceding request, the signal OUTPUT REGISTER VACANT will be absent from line 374 (FIG. 12) which feeds into the memory program control unit. The absence of this signal will prevent the memory program control unit from delivering a word from the associative memory 342 to the memory output register. When the preceding request has been delivered from the memory output register, the signal MFM on a line 376 originating in the memory output multiplexer (FIG. 10B), will reset the request bit thus placing the signal OUTPUT REGISTER VACANT on the line 374, initiating the output portion of the memory program control cycle if the access from the associative memory is complete. At this point, the signal GATE SENSE AMPLIFIER on line 378 will transmit the settings of the exit indicators 74 of FIG. 8 via lines 380 and sense amplifiers 382 to the data word portion 384 of the memory output register. Also, the memory program control unit will supply a signal GATE CONTROL INFORMATION on a line 386 to AND circuits 388 and 390. The AND circuit 388 will gate the computer module address stored in the computer module address register 358 into the computer address portion 392 of the memory output register, while the AND circuit 390 will gate the fixed memory address of this associative memory module as set on the fixed memory address switches via a line 394 into the memory address portion 396 of the memory output register. The signal GATE SENSE AMPLIFIER on the line 378 also will gate sense amplifiers 398 for transmission of the information in the control indicators 70 of FIG. 8 from associative memory 342 on lines 400 into a match indicator portion 402 of the memory output register. The match indicator 402 will indicate whetther no match exists in the associative memory in response to the memory request, whether precisely one match exists in memory in response to the request, or in the absence of either of these signals, whether a plurality of matches exist in memory in response to the request. The memory program control will also provide the signal SET REQUEST BIT on a line 404 which then will be employed by the memory output multiplexer in initiating its operation, as described in connection with FIGS. 10A and 10B.

If the data word is a constant, as indicated by a signal STATUS C on line 406, the memory program control must provide for the re-entry of the data word into memory. In this case, there will be a signal GATE TO ENTRY SWITCHES on a line 408 which will operate AND circuits 410 to provide signals to set the entry switches 346 via lines 344.

As timed by the signal GATE on the line 196, originating from a system clock 412 of FIG. 2A, AND circuits 414 will operate to transmit the entire set of information, including the control and the data word portions from the memory output register 372, via lines 416 to a buffer register 418 in FIG. 10A.

*Memory address generator*

The memory address generator 24 of FIG. 2B will now be described in detail in connection with FIG. 13. The memory address generator is adapted to determine the name of the memory in which the next instruction or operand will be found.

New instructions coming in from the input device have with them an assignment to an associative memory module previously generated as part of the input program. This assignment is made with two purposes in mind. First, that instructions will be evenly divided over the number of associative memory modules in the system, and, second, that closely related words in the binary tree will appear in different memory modules so that they may be retrieved simultaneously, thus reducing overall access time. In order to achieve this purpose, a simple distribution rule is employed. Under this rule, coming down a tree from a left branch to the successor instruction, the memory address is increased by 1; coming down the tree from the right branch the memory address of the successor instruction is decreased by 1. For example, if a left operand has been stored in memory 1, the successor instruction will be found in memory 2 and hence the right operand will be found in memory 3 assuming that there are at least three memories in the system. If it is assumed that the M memories in the system are numbered 1, 2, 3 . . . through M, then provision must be made for the case where the rule itself may carry into an address greater than M, or less than 1. Hence, when memory addresses are being computed by adding 1, a test is made to see whether the value M is exceeded by the next address. If an attempt is made to add the value 1 to the value M, the address 1 will be substituted and the operation will proceed cyclically. When the operation is initiated from the address of a right operand, the memory address of the successor instruction will be found by subtracting 1, and then the left operand memory address will be found by subtracting 1 from the instruction memory address. In this case, a test must also be made to see if the address under consideration is 1. Instead of subtracting 1, if this is the case, the address M will be supplied and the operation will proceed in cyclical fashion.

There are four principal portions of the memory address generator (FIG. 13), namely, a memory address input register 420, a memory address output register 422, a count-up-1 or count-down-1 unit 424, and a test for address equal (1) or (M) unit 426. Besides these four principal portions, there are four sources for fixed addresses, namely, a memory (1) indicator 428, a memory (M) indicator 430, an input device address source 432 and an output device address source 434. Further, there are various AND and OR circuits which will be enumerated as the operation of the generator will be described.

During the loading stage, an instruction is brought from the input device 10 of FIG. 2A via the memory output multiplexer and it is placed into the instruction buffer register 14. The memory address of the associative memory module into which this instruction is to be loaded, will be supplied as part of the function of the input device. From the instruction buffer register 14 of FIG. 2B, the memory address will be brought into the memory address input register 420 by lines 436 of FIG. 13. From here the address can be moved to a memory address output register 422 via AND circuits 438 and OR circuits 440. The operation of AND circuits 438 is controlled by the signal GATE ADDRESS TO OUTPUT REGISTER on a line 442 derived from the computer program control 26 of FIG. 2B. From the memory address output register 422, the address will be transmitted via AND circuits 444 and lines 446 to the computer module output register shown in the computer module output multiplexer (FIG. 9A). These AND circuits 444 are the means for taking the memory address from the output register 422, in all cases. They are controlled by the signal GATE ADDRESS TO COMPUTER MODULE OUTPUT MULTIPLEXER on a line 448 derived from computer program control 26.

When the tag generator 36 (FIG. 2B) operates to determine tags for an instruction in the instruction register and for the left operand or the right operand in their respective registers, the computer program control unit will receive a signal identifying the data word already in the computer module as either a left operand or a right operand. (This operation of the tag generator is described later in detail with respect to FIGS. 14 and 15.) The memory address of this operand will be available in the memory address input register 420, as determined at the time of sending out the preceding request.

The memory address of the successor instruction word is computed by adding a 1 or by subtracting a 1 from the memory address of the operand in the count-up-1 or count-down-1 circuits 424, as controlled by the signal COUNT UP on a line 450 or by the signal COUNT DOWN on a line 452, derived from the computer program control unit, depending on whether the operand is a left operand or a right operand. This result may be transmitted via AND circuits 454 and the OR circuits 440 to the memory address output register 422. The operation of the AND circuits 454 is controlled by the signal GATE COUNTER on a line 456, derived from the computer program control unit 26.

If a given memory address in the input register 420 is either equal to 1, or equal to M, the signal MEMORY ADDRESS=(1) on a line 458 or the signal MEMORY ADDRESS=(M) on a line 460 is transmitted to the computer program control unit where these signals alter the operation of that unit. If the address is equal to M when a count up would otherwise be required, the address 1 is substituted by transmitting a 1 over lines 462 as controlled by AND circuits 464 in conjunction with the signal GATE 1 on a line 466, this signal GATE 1 being derived from the computer program control unit. The address is transmitted to the memory address output register 422 by the AND circuits 464 via the OR circuits 440 for transmission to the computer module output multiplexer, as previously stated. In case the memory address in the input register 420 is a 1 when a count down would otherwise be required, the address M is transmitted via lines 468 and AND circuits 470, as controlled by the signal GATE M on a line 472 via OR circuits 440 to the memory address output register 422.

If an input device address is required under the operation of rule 1 or an output device address is required under operation of rule 13, the computer program control will supply either the signal GATE INPUT DEVICE ADDRESS on a line 474 or the signal GATE OUTPUT DEVICE ADDRESS on a line 476 to control AND circuits 478 or 480, to transmit the fixed input device address from the unit 432, or the fixed output device address from the unit 434 via the OR circuits 440 to the memory address output register 422.

The address as derived and stored in the memory address output register 422 can be returned via AND circuits 482 to the memory address input register 420. This operation will be controlled by the signal GATE ADDRESS TO INPUT REGISTER on a line 484 derived from the computer program control unit. This operation is required, for example, when computing the memory address of the right operand when the memory address of the left operand is available to start with. In this case, the count-up-1 operation will first be performed to provide the memory address of the instruction which will be stored in the memory address output register 422. The memory address will be delivered to the computer module output multiplexer, as previously described, and it also will be returned to the input register where an additional 1 can be added thereto by the count-up-1 circuits 424 for deriving the memory address of the right operand. The inverse operation is performed when it is necessary to derive a left operand from a right operand, in this case, the count-down-1 circuits would be employed.

*Tag generator*

The tag generator 36, as shown in FIG. 2B, can be described in detail, particularly in reference to FIGS. 14 and 15. The tag generator is adapted to generate the tags of the next instruction and operand, as required by rule 7 of the previously described loading and running routine. Recall that in going down the binary tree program, the tag of the succeeding instruction and operand must be computed since these tags are used for identifying and retrieving their associated words. To obtain the tag for the succeeding instruction and operand, the bit position containing the rightmost 1 of the subscript portion of the tag of the present instruction is first located. Then the tag of the succeeding instruction is generated by taking the tag of the present instruction and setting the rightmost 1 bit position to a 0, and the position immediately to its left, to a 1. Similarly, to obtain the tag of the next left or right operand, the bit position immediately to the left of the rightmost 1 bit position is set as a 0 or a 1, respectively. This procedure is outlined in the flow diagram of FIG. 14. The circuits required to execute the operations enumerated in the flow diagram are shown in FIG. 15. They consist of a subscript register 486, a rightmost 1 circuit 488, and a left or right operand indicator bit register 490. FIG. 15 also shows the tag generator input controls going into the subscript portions of a left operand register 492, a right operand register 494 and an instruction register 496. It should be noted that only the input lines for updating the subscripts are shown in this figure.

The subscript register 486 consists of S bits. In the figure are shown four such bits: bit 1 498, bit S–2 500, bit S–1 502 and bit S 504. The bits are numbered from left to right. The inputs to the subscript register of the tag generator, although not shown in the figure, come from the instruction register 28, shown in FIG. 2B. A subscript will be gated from the instruction register into the subscript register during the execution or rule 7. Output lines 506, 508, 510, 512, 514, 516, 518 and 520 of the subscript register comprise the inputs to the rightmost 1 circuit. In addition, the zero output lines 506, 510, 514 and 518 feed into the indicator bit input circuitry.

The rightmost 1 circuit 488 is a priority circuit that is used to locate, starting from the right, the first subscript bit that is set to the 1 state. The signal GENERATE NEW TAGS coming in on a line 522 from the computer module program control unit 26 shown in FIG. 2B, will propagate from the right, starting at the rightmost subscript bit until it comes to the first bit position in the 1 state. At this bit position, the signal will be directed into the indicator bit input circuits and into the right or left operand registers and the instruction register.

For example, assume that the subscript bits 1, S–2, S–1 and S are all set to 0110. This will result in a signal being applied to the subscript output lines 506, 512, 516 and 518. Now the signal GENERATE NEW TAGS coming in on the line 522 will first propagate through an AND circuit 524 onto a line 526, going into bit position S–1. At bit position S–1, the signal GENERATE NEW TAGS will pass through an AND circuit 528 onto a line 530, since bit position S–1 is in the 1 state. The signal on the line 530 indicates that this bit position contains the rightmost 1. Note that if the subscript register had contained all 0's, the signal GENERATE NEW TAGS would have propagated through the AND circuits 524, 532, 534 and 536 to indicate an error, since it is not possible for the subscript to contain all 0's. Furthermore, note that if the subscript register had contained a 1 in bit position 1 and 0's in all other bit positions, the signal GENERATE NEW TAGS would have propagated through the AND circuits 524, 532, 534 and 538 to indicate the end of the tree program. The signal END OF TREE PROGRAM is sent to the computer program control unit 26 (FIG. 2D) to indicate that the instruction presently being executed is the last instruction of the program.

The signals on output lines 540, 530 and 542 coming from the rightmost 1 circuit indicate which bit position of the subscript register contains the rightmost 1. These output signals are fed into the set indicator bit input circuits consisting of an OR circuit 544 and AND circuits 546, 548 and 550. The set indicator bit input circuits function to sample the state of the bit position immediately to the left of the rightmost 1 position. This bit position, if set to a 0, indicates that the tag of the present instruction is a left operand. If this bit position were in the 1 state, however, it would indicate the tag of this instruction to be a right operand. For example, assume that bit position S–1 were the bit position containing the rightmost 1, then the signal GENERATE NEW TAGS would appear as previously described on line 530. If the bit position immediately to the left of bit position S–1, that is to say, bit position S–2, is in the 0 state, then a signal appearing both on the lines 510 and 530 will cause the AND circuit 548 to propagate a signal through an OR circuit 544 and set the indicator bit to indicate a left operand. The indicator bit circuit 490 was previously set to the clear state by a signal CLEAR on the line 552 coming in from the computer program control unit 26, shown in FIG. 2B.

The output of the indicator bit circuit indicates whether the present word will become a left or a right operand, and hence whether the operation is moving down the tree from a left branch or from a right branch. This information is sent via the output lines 554 and 556 to the computer program control unit 26, either as the signal LEFT OPERAND, or as the signal RIGHT OPERAND, as the case may be.

The rightmost 1 circuit output lines 540, 530 and 532 also feed into the instruction register 496, the right operand register 494 and the left operand register 492. These output lines set the subscript portion of the tag field of these registers to indicate their correct tags. That is to say, the instruction register will contain the tag of the next instruction, and either the left or right operand register will contain the tag of the next operand depending on whether the operation is proceeding down the tree from the left or the right, respectively. For example, assume that bit position S–1 is the rightmost 1 bit position, and that the signal appearing on the rightmost 1 circuit output line 530 will set the S–1 bit position 558 of the instruction register to the 0 state. This signal will also set the S–2 bit position 560 of the instruction register to the 1 state, the S-2 bit position 562 of the operand register to the 1 state and the S–2 bit position 564 of the left operand register to the 0 state.

It should be noted that although the circuits indicate a change *in the* state of all three registers, only two of these registers are, in fact, changed, since the third register was previously set to the state required by the input signal. Note that it was necessary to change at most two bits of each register since the tag of the current instruction had previously been gated into all registers.

*Computer module outputs*

The assembly of information from various sources within the computer module for preparing a request to be transmitted via the computer module output register 86, for example in FIG. 9A, through the computer module output multiplexer to the memory input queue 44*a* of FIG. 2A, will now be described in detail with reference to FIG. 16 which illustrates further details of the left and right operand registers 20 and 22 and the instruction register 28.

In this figure, the assembled output is indicated as output 566 available for transmission on lines 568. These lines are also shown in FIG. 9A where they enter the output register 86. The output lines are divided into two major portions, namely, a control portion 572 and a data word portion 574 having the formats of FIGS. 5A and 5B. The control portion 572 is sub-divided into four fields with inputs shown to them by appropriate lines. The two inputs to the field for request bit R.B. 576 are 1 and 0 lines. The request bit is turned on i.e., the requested bit is set to the 1 state by the signal from the memory control information unit 42 (FIG. 2B) on a line 580 and it is turned off i.e. set to the 0 state by the signal CF2 on the line 578. The generation of this latter signal was explained in connection with FIG. 9B. Lines 582 (FIG. 16), also coming from the memory control information unit, carry the program code Prog. 584 which comprises the instruction to the associative memory module (FIG. 12) as to the function the latter is to perform. Lines 586, also from the memory control information unit, supply the chosen computer address 588 which identifies this computer module (in this case taken to be, for example, computer module 2). Lines 446 from the memory address generator (FIG. 13) supply the memory address 590.

For the data word 574, multi-control OR circuits are indicated by the number of lines coming into each subfield (see the description below of FIGS. 17A–17C). There are three input circuits indicated by brackets 592, 594 and 596 which supply information into the entire data word; that is, into all of the sub-fields. First, the information represented by the bracket 592 is provided via lines 598 from the right operand register 22 via AND circuits 600 controlled by the signal GATE DATA WORD on a line 602 as described later, derived from the computer program control unit (FIGS. 17A–17C).

If the entire data word 574 is to come from the left operand register 20, as indicated by bracket 594, connections are provided via lines 604 through AND circuits 606, as controlled by the signal GATE DATA WORD on line 608, derived from computer program control unit as described presently. Finally, if the data word 574 is to come from instruction register 28, as indicated by bracket 596, transmission will be over lines 610 via AND circuits 612 as controlled by the signal GATE DATA WORD INTO 30 on a line 614 derived from computer program control FIG. 17B.

It is now possible to consider the gating of data into the individual sub-fields of the data word. First, consider the problem identifier 616 which can be supplied to the assembled output via a line 618 and AND circuits 620 from the problem portion 622 of the instruction register 28. The AND circuits 620 are controlled by the signal GATE PROBLEM INTO 30 on a line 624 (see also FIG. 17B). Note that the problem portion 616 of the assembled output 566 requires 4-way OR circuits for these inputs, where one of the inputs is indicated by lines 618 and the other three inputs are indicated by the brackets 592, 594 and 596.

The status portion 626 of the data word in the assembled output 566 (FIG. 16) requires 7-way OR circuits as indicated by the four lines 628, 630, 632 and 634 and the three brackets 592, 594 and 596. The status can be transmitted to the assembled output from the status portion 636 of the instruction register 28 via AND circuits 638 and lines 630. AND circuits 638 are controlled by the signal GATE STATUS INTO 30 on a line 640 (see also FIG. 17B). The fixed input I642 can be supplied to the status portion 626 of the data word via lines 628 as controlled by AND circuits 644. The status portion may be derived from the computer program control signals GATE I & L (FIG. 17B), GATE I & D, or GATE I, any one of which will originate the I status. Hence, a 3-way OR circuit 646 is provided for the control of the AND circuit 644, the inputs to the OR circuits 646 being the above-noted signals GATE I & L on a line 648; the signal GATE I & D on a line 650; and the signal GATE I on a line 652, which are derived, as stated, from the computer program control unit.

The status T654 can be transmitted to the status portion 626 of the data word from a fixed input 654 through AND circuit 656, as controlled by the signal GATE T on a line 658 derived from the computer program control unit. In similar fashion, the status C can be transmitted from a fixed source circuit 660 on a line 664 through AND circuit 662 controlled by the signal GATE C on a line 664, also derived from computer program control unit (FIG. 17B).

Next, consider the tag portion 666 of the data word 574. Here 6-way OR circuits are required as indicated by three lines 668, 670 and 672 in conjunction with the brackets 592, 594 and 596. The tag portion 674 of the contents of the left operand register 20 can be transmitted via AND circuits 676 and lines 668 to the tag portion 666 of the data word. In this case, the AND circuits 676 are controlled by the signal GATE TAG on lines 678. If the tag portion 666 of the output data word 574 is to be transmitted from the tag portion 680 of the instruction register 28, the transmission will occur over lines 670, through AND circuits 682, controlled by the signal GATE TAG INTO 30 on line 684. Finally, with respect to the tag portion 666, if it is to be transmitted from the tag portion 686 of right operand register 22, transmission will occur on line 672 through AND circuits 688 controlled by the signal GATE TAG INTO 30 on line 690 derived from the computer program control unit (FIG. 17A).

Next, consider the data portion 692 of the data word, noting that with an instruction format of FIG. 5A this portion is further sub-divided into the code portion 694 and the item portion 696. First, consider the operation in which the data portion is treated in its entirety. If the data portion 698 of the left operand register 20 is to be transmitted to the data portion 692, the transmission will occur on lines 700 through AND circuits 702, controlled by the signal GATE DATA on a line 704 derived from the computer program control unit. Similarly, the data portion 692 of the assembled output may be transmitted from the data portion 706 of the instruction register 28 via lines 708 and AND circuits 710 controlled by the signal GATE DATA INTO 30 on a line 712 derived from computer program control unit.

Now consider the code sub-portion 694. This may be transmitted from a fixed source, L714 or a fixed source D716 over line 718 or lines 720, respectively, through AND circuits 722, or AND circuits 724, respectively, as controlled by the signal GATE I & L on line 648, or the signal GATE I & D on line 650, respectively.

The item portion 696 of the assembled output data word can be transmitted from the tag portion 680 of the instruction register 28 via AND circuits 726 and line 728. The AND circuits 726 are controlled by the signal GATE TAG INTO ITEM OF 30 on a line 730. The rearrangement whereby a tag field becomes an item field is required by rules 2 and 11.

Note that 7-way OR circuits are required for the code portion 694, as indicated by the entering lines 700, 708, 718, 720 and the brackets 592, 594 and 596. Also note that 6-way OR circuits are required for the item portion 696 as indicated by the entering lines 700, 708 and 728 and the brackets 592, 594 and 596.

*Computer program control*

Figure 2D:
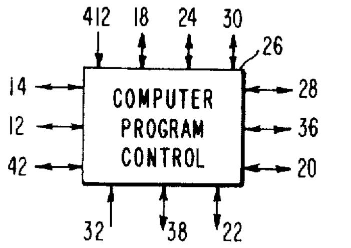

The computer program control unit 26 of FIG. 2D which supplies the control signals described just above will now be further discussed in connection with FIGS. 17A, 17B and 17C. These figures comprise a diagrammatic representation of the computer program control unit in terms of input signals at the left coming to it from other sections of the computer module and in terms of the output signals at the right generated by the computer program control unit for transmission to other parts of the system for the control of their operation in the proper sequential manner. With each input signal is shown the reference number of the unit of FIG. 2A or FIG. 2B in which the signal originated, the name of the signal and those rules (within the block) under which the signal is required. Likewise, the output signals at the right show what rules control their generation, the name of the signal and the reference number for the unit of FIG. 2B to which the signal is transmitted.

The sequential generation of the output signals is governed by conventional stepping rings operating under control of the input signals and having their outputs also selected under control of the input signals for generating the output signals. The basic timing is supplied from the system clock 412 (FIG. 2A) for assuring a properly timed relationship between the computer module and its output via the computer module output multiplexer and, on the other hand, between the computer and its input via the memory output multiplexer. In addition to the ring stepping circuits, the computer program control unit also contains indicators which define the operating mode of the system. One indicator determines whether the computer module is in the loading mode, hence that it will be operating under one of the rules 1 through 5, or that it is in the running mode and hence, that it will be operating under one of rules 6 through 13. The loading mode will be indicated when the system is first turned on and following any vacate or dump operation, such as provided by rules 5, 9, 12(b)(ii) or 13. If the input device does not have data to be read into the system under rule 1, the computer mode is changed into the running mode under rule 6.

By way of an operating example, consider that a dump operation has just been initiated thus restoring the computer module to the loading mode. Under rule 1, a request is first issued to see if the input device has information to be transmitted to a computer module. The request cannot be transmitted until the preceding request, in this case the dump request, has been fulfilled. Hence the signal REQUEST TRANSMITTED (FIG. 17B, at the left) from the computer module output multiplexer 30 will be required to initiate the operation. The signals generated include the signal GATE INPUT DEVICE ADDRESS (FIG. 17A) which is transmitted to the memory address generator 24 and the signal GATE ADDRESS INTO 30 which also goes to the memory address generator 24 as indicated in FIG. 17A. These two signals combine to provide the memory address portion 590 (FIG. 16) which, in this case, represents the address of the input device.

Also, the computer program control will supply the signal INTERROGATE INPUT DEVICE FOR READY WORK (FIG. 17C) to the memory control information unit 42 of FIG. 2B for encoding into the program portion 584 (FIG. 16), the signal being transmitted over lines 582 from the memory control information unit 42. The signal GATE COMPUTER MODULE NAME, INSTRUCTION BUFFER REGISTER CODE, AND REQUEST BIT (FIG. 17C) going to the memory control information unit 42 of FIG. 2B will encode the computer address 588 and the request bit 576 of FIG. 16. This completes the control portion 572 of the output to be transmitted as a request. No data word portion 574 information is required for a request going to an input device. When this request can be stored in the output register, a waiting mode indicator is set to show that the computer module is awaiting the fulfillment of its request.

When data is returned from the input device, it will be routed by the memory output multiplexer 12 of FIG. 2A, to the computer instruction buffer register 14 of FIG. 2B. The presence of data in this register will be signified by the signal INSTRUCTION BUFFER REGISTER OCCUPIED (FIG. 17A) coming to the computer program control unit from the instruction buffer register 14 of FIG. 2B. This signal in conjunction with the waiting mode indicator previously mentioned will reinitiate operation of the computer program control under rule 1. If the signal ASSOCIATIVE MEMORY MATCH INDICTATOR=0 (FIG. 17A, at the left) is present it signifies that no information has been received from the input device in response to the previously initiated request. In this case, the computer program control mode indicator will be set to the running mode and operation will proceed under rule 6. If, on the other hand, the signal ASSOCIATIVE MEMORY MATCH INDICATOR=1 is present, valid information will be available in the instruction buffer register and operation will continue under rule 1. Next, the data word is moved from the instruction buffer register 14 of FIG. 2B, to the instruction register 28, as controlled by the signal GATE DATA WORD INTO 28 (FIG. 17A). At this point, the presence of the signal STATUS I OR PC (at the left of FIG. 17B) will condition the computer program control to generate a new request to be transmitted to its output register 566.

The memory address portion 590 of FIG. 16 will be supplied from the memory address generator (FIG. 14) through the successive operation of the signal GATE ADDRESS INTO OUTPUT REGISTER followed by the signal GATE ADDRESS INTO 30. The data word portion 574 of the output register in this case will come from the instruction register 28 through the operation of the signal GATE DATA WORD INTO 30. The program portion 584 (FIG. 16) will be encoded in the memory control information unit 42 of FIG. 2B under control of the signal STORE IN FIRST VACANT REGISTER (FIG. 17B). Finally, the request bit portion 576 will be provided by the memory control information unit 42 under control of signal GATE COMPUTER MODULE NAME AND REQUEST BIT (note that this signal will also provide the computer address 588, which, for this particular request, need not be considered).

*Running mode example*

An example of the operation of the entire system with the computer module in the running mode may now be considered with reference to the computer program shown in FIG. 6. This program involves the very simple problem of computing $Y=AB+CX$. The tree-structured program indicates the two multiplications and the addition of the equation as follows: The principal left branch consists of the triple of instruction words whose tags are Y001, Y01 and Y011 (it is understood that 0's to the right of the rightmost 1 appear in the figure only as blank spaces. It is also assumed that there are four bits in the tag subscript field hence, for this example, S is chosen equal to 4 in FIG. 15). The instruction for this triple of words is given in the word tag Y01 where the operation code for multiplication appears as an asterisk (*). The word with tag Y001 indicates that the data whose tag is A is required for the left operand and the word with tag Y011 indicates that data whose tag is B is required for the right operand. Similarly, for the right branch, data with tag C is required as indicated by the word with tag Y101 to be multiplied (as indicated by the word with tag Y11) by the data whose tag is X as indicated by the word with tag Y111. The results of these two operations, that is, the left branch with tag Y01 and the right branch with tag Y11 will next be added together as indicated by the word with tag Y1. This operation will be performed at the next stage going down the tree. Also shown in FIG. 6 are four data inputs with tags A, B, C and X having the values 1.2, 2.3, 3.4 and 6.7, respectively.

It will be assumed that the computer system is embodied in the following configuration: There are two computer modules designated computer module 1 and computer module 2; hence, for the present example N is chosen to be equal to 2 (see FIG. 9A). There are three associative memory modules, namely, associative memory module 1, associative memory module 2 and associative memory module 3; hence, for this example M is chosen to equal 3 (see FIG. 10A). There are three registers in each of the memory input queues; hence, for this example, Q is chosen equal to 3 (see FIG. 11). There are three channels connecting the computer module output to the memory input queue. Hence, for this example, E is chosen equal to 3 (see FIG. 9A). Similarly, there are three channels connecting the output from the associative memory modules to the computer modules through the memory output multiplexer. Hence, for this example, C is chosen equal to 3 (see FIG. 10A).

The operation of the computer system will be described for the bottom triple of the tree program, shown in FIG. 6; that is, for the words with tags Y01, Y11 and Y1. It is assumed that the loading operation, as described earlier with respect to rules 1 through 5, has been completed and that computer module 1 is performing the operation called for by the instruction with tag Y01.

While this operation of multiplication is being performed, the tags for the next level of operation on the tree program are being computed by the tag generator 36 of FIG. 2B and as particularly shown in FIG. 15. The subscript portion 01 of the tag is gated from the instruction register 28 of FIG. 2B via lines 734 (FIG. 2B) to the tag generator 36 appearing in the subscript register 486 of FIG. 15. In this case, the subscript bit position 498 will store a 0, the subscript bit position 500 will store a 1 and the subscript bit positions 502 and 504 will both store 0's. Also, the subscript portion of the tag is transmitted from the instruction register 28 of FIG. 2B via lines 34 to the left operand register 20 and the right operand register 22, in which they will be stored respectively, in the subscript sub-portion of the tag portion 674 (FIG. 16) of the left operand register and the subscript sub-portion of the tag portion 686 of the right operand register shown in FIG. 16. The transmission of the subscripts is controlled by the signal GATE SUBSCRIPTS INTO 36, 22 AND 20 from the computer program control unit 26 of FIG. 2B shown in detail in FIGS. 17A–17C.

At this point, the operation of the tag generator (FIG. 15) is initiated by the signal CLEAR INDICATOR BIT on the line 552 and by the signal GENERATE NEW TAGS on the line 522, both coming from the computer program control unit (FIG. 17B).

The signal GENERATE NEW TAGS coming into the rightmost 1 circuit 488 seeks out the bit position containing the rightmost 1. In the example, bit position 2 500 (FIG. 15) contains the rightmost 1. Hence, the signal GENERATE NEW TAGS will pass through the AND circuits 524, 532 and 736 and will appear on the output line 540. Note that the output line 540 is shown as a broken line, but for this example, the output line 540 will be considered as a continuous line. The signal on the output line 540 indicates that bit position 2 contains the rightmost 1. The signal now goes into the input circuitry associated with the set indicator bit unit 490 and into the input circuitry associated with the instruction register 496, the right operand register 494 and the left operand register 492. Referring to the AND circuit of the input circuitry for the indicator bit, it will be seen that a signal will pass through this AND circuit 546 because bit position 1 is in the 0 state. The signal passing through the AND circuit 546 then goes through the OR circuit 544 and sets the indicator bit to the 1 state, indicating that the tag of this instruction will represent a left operand. The output signal appearing on the line 540 also goes into the subscript portion of the tag field of the instruction register 496. This output signal sets the first bit position to the 1 state, and the second bit position to the 0 state. Hence, the tag appearing in the instruction register will now read Y1000. The output signal on the line 540 will also go into the right operand register 494 setting bit position 1 to the 1 state. Hence, the tag will now read Y1100. Finally, the output signal appearing on the line 540 will go into the left operand register 492 setting the first bit position to the 0 state. Hence, the tag appearing in the left operand register will now read Y0100.

Note that the tag letter Y was still in the left operand register and the right operand register as a result of the previous operation and that the operation just described, therefore, alters only the subscript portion of the tag.

The indicator bit supplies the signal LEFT OPERAND on the line 556 to the computer program control unit (FIG. 17B). The function of this signal is to inform the computer program control unit that, in this case, the operation on the program will proceed down the tree from the left branch. In other words, that the result of the current operation will appear as a left operand at the next level of computation.

Now consider the operation of the memory address generator. At the present stage, the program is in the process of generating a request which is to go to memory to seek the instruction with tag Y1 (FIG. 6). Part of the information required for this request will be the address of the memory in which that instruction will be found. Referring now to the memory address generator (FIG. 13), the memory address of the instruction with tag Y01 is currently available from the preceding operation in the memory address input register 420, which, at this point, contains the address 3. Since 3 is equal to M, by definition, in this example, there will be an output signal on line 460 providing the signal MEMORY ADDRESS=(M) which is transmitted to the computer program control unit. Since the signal LEFT OPERAND on the line 556 of FIG. 15 is also available to the computer program control unit (FIG. 17B), the signal GATE 1 is generated by the computer program control unit and transmitted on the line 466 to the AND circuit 464 of FIG. 13 to transmit the address 1 from the fixed source 428 via the OR circuits 440 to the memory address output register 422. It should be noted that ordinarily the signal LEFT OPERAND would have required the count-up-one operation in the memory address generator, but but what has happened in this example is that the address already was for memory 3. Since memory 3 is the highest numbered memory in the system, the next address proceeds in cyclical fashion, as above explained, to the lowest numbered memory, that is, memory module 1 of which the address now stands in the output register 422.

At this stage, there is now available the updated tag in the instruction register, the updated memory address in the memory output register 422 of FIG. 13, and the problem number also in the instruction register. Hence, assembly of a request word which will be sent to the proper associative memory module to retrieve the instruction word with tag Y1 may now proceed. This assembly will be described now in connection with FIG. 16.

First considering the data word portion 574 of the output unit 566, the problem number will be transmitted from the problem portion 622 of the instruction register 28 by the operation of the AND circuit 620 controlled by the signal GATE PROBLEM INTO 30 on the line 624, derived from computer program control unit (FIG. 17). In the example, this will be problem No. 2. Since the request being prepared is for an instruction, the status required will be the status I, which will be gated from the fixed I source 642 as controlled by the AND circuit 644 (FIG. 16) through the operation of the signal GATE I from the computer program control unit on line 652 through the OR circuit 646. The status I thus will be stored in the status portion 626 of the assembled output 566 via the lines 628. The updated tag will be transmitted from the tag portion 680 of instruction register 28, through the AND circuit 682 and the lines 670 into the tag portion 666 of the data word 574. This operation is controlled by the signal GATE TAG INTO 30 on line 684. The data portion 692 of the data word 574 is not required for this memory request.

Next consider the control portion 572 of the assembled output unit 566. The memory address portion 590 will be transmitted on the lines 446 from the memory address output register 422 of FIG. 13 by the operation of AND circuit 444 controlled by the signal GATE ADDRESS TO COMPUTER MODULE OUTPUT MULTIPLEXER on the line 448 (FIG. 13) derived from the computer program control unit. Note that at the time the AND circuit 444 of FIG. 13 is operated, the AND circuit 482 also is operated to take this same memory address which, in this case, is the address 1, back to the memory address input register 420. The latter operation is controlled by the signal GATE ADDRESS INTO INPUT REGISTER on the line 484 derived from the computer program control unit (FIG. 17A). The memory address is returned to the memory address input register in preparation for generating the memory address of the right operand which will be considered subsequently.

Next, the program portion 584 of the control 572 (FIG. 16) is transmitted over lines 582 from the memory control information unit 42 of FIG. 2B. The memory control information unit has encoded the program code as required by the signal INTERROGATE BY PROBLEM, STATUS, TAG & RETRIEVE NON-DESTRUCTIVELY which is derived from the computer program control unit (FIG. 17C). Finally, the signal GATE COMPUTER MODULE NAME, INSTRUCTION BUFFER REGISTER AND REQUEST BIT, originating in the computer program control unit will be encoded in the memory control information unit 42 of FIG. 2B to provide the computer address portion 588 of FIG. 16 and the request bit portion 576 on lines 586 and 580, respectively.

At this point the assembled output register 566 of computer module 1 will contain the following information: The request bit 576 will be set to the 1 state, the program portion 584 will contain the program code for the operation of the associative memory module, the computer address portion 588 will contain the computer module 2 address in its first sub-portion and will also contain the I code indicating the instruction buffer register in its second sub-portion. The memory address portion will contain the address 1 of associative memory module 1 where the instruction word is to be found. In the data word portion 574, the problem portion 616 will contain problem No. 2, the status portion 626 will contain the status I and the tag portion 666 will contain the tag Y1000.

The assembled memory request word will next be moved through the computer module 1 buffer register 740 (FIG. 9A) via a channel selected by the computer module output multiplexer into the memory input queue for associative memory module 1 to retrieve the required instruction which will be transmitted through the memory output multiplexer to the instruction buffer register 14 (FIG. 2B) of computer module 1.

Referring now to FIG. 9A, the above-mentioned assembled output information will appear in the output register 738 of computer module 1 and from there it will be transmitted to the buffer register 740 under control of the signal GATE on the line 90 from the system clock 412 of FIG. 2A. The information now appearing in the buffer register 740 supplies the request signal $CR_1$ on the line 108, also shown in FIG. 9B, where it conditions AND circuits 110, 112 and 114. (Note that AND circuits 112 and 114 are not required in the case of computer module 1 but are supplied as part of the computer module to maintain modularity; in other words, the AND circuits 112 and 114 would be required if this computer module were placed later in the set of computer modules with a different number.)

The signal GATE on line 132 of FIG. 9B supplied by the system clock 412 (FIG. 2A), in conjunction with the signal $CR_1$ on the line 108, will operate the AND circuit 110 to generate the signal 11C on the line 130. Referring now to FIG. 9A, the signal 11C will operate AND circuits 742 thus placing the information now in the buffer register 740 onto channel 1, lines 744, via OR circuits 746. The memory address portion of the memory request information will appear on lines 748 going to the memory address decode unit 1 186. Since the memory address used in this example is for associative memory module 1, the memory address decode unit 1 will provide a signal D11 on the line 750. At this point, the signal is present for routing the request to the proper memory. However, it must still be determined whether or not there is a vacant register in the memory input queue (FIG. 11) for associative memory module 1.

Assuming that all prior requests have been serviced by associative memory module 1, the vacant queue signal 1 will be present on the line 752 (FIG. 9C). This signal is derived from the memory input queue (FIG. 11) for memory input queue 1 in a fashion similar to that previously described in connection with vacant queue signal M shown on the line 150 in FIGS. 11 and 9C. Returning now to FIG. 9C, the AND circuit 754 will be operated by the signal VACANT QUEUE SIGNAL 1 in conjunction with the signal GATE on the line 152, producing the signal on line 756. This signal in conjunction with the signal D11 on the line 750 will operate the AND circuit 758 to produce the signal 11Q on line 760. The signal 11Q will operate AND circuits 762 (FIG. 9A) to store the memory request available from lines 744 via OR circuits 764 into the memory input queue (FIG. 11).

Refer now to the memory input queue (FIG. 11) and assume as before mentioned that there are no prior memory requests remaining to be served by associative memory module 1. Further, assume that the input ring 292 is in the state where the AND circuit 280 for input gate 1 on line 266 is conditioned via line 286. The signal STORE CF1 on the line 766 (FIG. 9C) derived from previously described signal 11Q, via the OR circuit 768 will be available for operating the AND circuit 280 in FIG. 11, here given the general name STORE and shown as being transmitted over the line 172. Hence, the input gate 266 will operate to bring the data information on line 278 into memory input queue register 260.

Note also that the signal 11Q on the line 760 (FIG. 9C) is transmitted through the OR circuit 770 to provide the signal C1 on the line 772. The signal C1 in conjunction with previously described signal 11C on the line 130 (FIG. 9B) operates the AND circuit 772 (FIG. 9B) to produce the signal CF1 on the line 774 via the OR circuit 776. The signal CF1 represents the fact that the memory request has been successfully transmitted from computer module 1 to memory input queue 1 and, therefore, that the computer module 1 output register 738 of FIG. 9A can be made available for handling a new request. Hence, the signal CF1 is brought into the computer module 1 output register, as shown both in FIGS. 9A and 16. (Note that in FIG. 16 the example there given employed the signal CF2 on line 578.) The CF1 signal will reset the request bit unit thus permitting the computer module to generate a new memory request as controlled by the computer program control unit (FIG. 17B) by means of the signal REQUEST TRANSMITTED.

Return now to the memory input queue (FIG. 11). The loading of the request bit of the memory request word has changed the status of the vacancy bit in the memory input queue register 1 260 to the 1 state, hence the register produces the signal $V.B.=1$ on the line 304 which produces the signal MORE WORK on the line 310, signifying to the associative memory module (FIG. 12) that it should proceed with fulfilling a request. Since the memory program control has completed all previous requests, it will be in a position to proceed with this current request and hence it will put out the signal READ on the line 322 to the memory input queue (FIG. 11). The signal READ will operate the AND circuit 324 in conjunction with the output ring 314 which, at this time, is set to impress a signal on line 316 corresponding to memory input queue register 1 260. The output of the AND circuit 324 will operate the circuits of the output gate 1 272 to transmit the memory request via the OR circuits 330 to the data-out lines 332. Furthermore, the output of the AND circuit 324 will be transmitted on line 336 to set the vacancy bit in the memory input queue register 1 260 to the 0 state, thus making this register available for storing a new memory request.

By referring to the associative memory module, FIG. 12, it can be seen that the data word portion of the request will be transmitted via the lines 344 to set the entry switches in the associative memory 342. Recall that the pertinent information of the data word portion, in case of this example, includes the problem No. 2, the status I, and the tag Y1000.

The program portion of the control information will be transmitted via the lines 350 (FIG. 12) to the problem decode unit 352 of the memory program control unit 354. The computer address portion of the control information will be transmitted via the lines 356 to the computer module control register 358. For this memory request, the memory program control unit will supply signals on the lines 360 to set all of the select switches 362 (FIG. 8) in the associative memory 342 to the entry-exit-no-sort status, as indicated in FIG. 2H4 of our previously noted application for United States Letters Patent. Since the program portion of the control calls for interrogation by the associative memory on the problem, status, and tag portions, but not on the data portion of the data word, the mask register 366 in the memory program control unit will be set to the mask state for the data portion of the data word, thus supplying signals on lines 368 to set the mask switches in the corresponding positions. The memory program control unit will also supply signals on lines 364 to set the control switches of the associative memory 342 in FIG. 12 to perform an exit operation.

The foregoing operations will set the entry register 48 of FIG. 8 corresponding to the problem, status, and tag portions of the data word, which, in this case, will call for problem No. 2, status I, and tag Y1000. The mask switches 370 controlled from the mask register 366 of FIG. 12 will be set to the mask position for the data portion of the data word. The select switches 362 will set all positions of the select register 76 to the entry-exit-no-sort status, as mentioned above. Under operation of these controls, the associative memory module 1 will locate the instruction word with tag Y1000 and read it out to the exit indicator 74. Also, the associative memory will supply in the control indicators 70 the state of the match indicator, which, in this case, will be 1 showing that there is but a single matching word for the present interrogation. Referring again to associative memory module (FIG. 12), the exit indicators connected through the lines 380 are detected by the sense amplifiers 382 to make available the data word to the memory output register 372. Since the preceding memory request has been completed prior to this operation, the signal OUTPUT REGISTER VACANT on the line 374 will operate the memory program control to produce the signal GATE SENSE AMPLIFIERS on the line 378, thus storing the output from the associative memory 342 into the memory output register 372 (FIG. 12). Also, the signal GATE SENSE AMPLIFIERS on the line 378 will transmit the control indicator output on line 400 through the sense amplifier 398 to the match indicator portion of the control information in the memory output register.

The memory program control unit also supplies the signal GATE CONTROL INFORMATION which will operate to transmit the computer module address from the computer module address register 358 through the AND circuits 388 to the computer address portion of the memory output register. This same signal GATE CONTROL INFORMATION will also operate the AND circuits 390 to transmit the fixed memory address identifying, in this case, associative memory module 1 to the memory address portion 396 of the memory output register. Finally, the memory program control will supply the signal SET REQUEST BIT on the line 404 to the request bit portion 778 of the memory output register.

At this point, the memory output register 372 (FIG. 12) contains the following information: The request bit unit 778 is set to the 1 state, indicating the presence of an output in the memory output register. The match indicator 402 is set to the 1 state, indicating that a single matching word was found in the associative memory for this interrogation. The computer address portion 392 is set to the 1 state in its first sub-portion, indicating that computer module 1 is to receive this information. The second sub-portion of the computer address is set to the I state, indicating that computer module 1 is to receive this current information into its instruction buffer register. The third sub-portion of the computer address is not pertinent for this operation.

The memory address portion 396 is set to the 1 state to indicate that the information is being delivered from associative memory module 1. The problem portion 780 is set to the 2 state to indicate that the program is part of problem No. 2. The status portion 782 is set to the I state to indicate that this word is an instruction. The tag portion 784 is set to Y1000 state, identifying this instruction as the bottom instruction of the tree in FIG. 6. The code porion 786 of FIG. 12 is set to the operation plus (+) indicating that addition is to be performed under control of this instruction. The item field 788 is blank for this instruction.

The word now assembled in the memory output register will next be transmitted via the associative memory module 1 buffer register through the memory output multiplexer over a selected channel to computer module 1 where it will be stored in instruction buffer register 14 (FIG. 2B).

Now refer to the memory output multiplexer of FIG. 10A in which is shown the output register 790 for associative memory module 1. The assembled word is next gated from the output register to buffer register 218 by the operation of the signal GATE on the line 196 derived from the system clock 412 of FIG. 2A. From the buffer register, the signal MR1 on the line 792 is present in correspondence to the 1 bit in the request bit portion of the buffer register. Correspondingly, there will be no signal $\overline{MR1}$ on the line 220. The output of the register is available on the lines 794 which are connected as inputs to the AND circuits 796, 798 and 800.

By reference to the memory output multiplexer control logic (FIG. 10B), it will be seen that signal MR1 on the line 792 will operate the AND circuit 802 in conjunction with the signal GATE on the line 222 derived from the system clock. (Note that the AND circuits 804, 806 serve no function in the case of associative memory module 1. However, they are supplied as a part of the modular block and would be used if this particular memory were physically assembled as a higher numbered memory; that is, one shown farther to the right along the channels represented in FIGS. 10A and 10*B*.) The output of the AND circuit 802 on the line 246 is the signal 11M which also appears in FIG. 10A as the controlling input to the AND circuits 796. This signal then is what places the information now in the buffer register 218 of associative memory module 1 onto the lines 230 of channel 1, via OR circuits 232.

The computer address portion of the information is next employed in the computer buffer register decode 1 unit 236 via the lines 234 to determine which computer module and which buffer register in that computer module is to be employed to receive the information. In this case, the decode signal will appear as the signal 11I on the line 254 (FIG. 10A) going to the AND circuits 256 which operate to take the information from channel lines 230 via the OR circuits 258 for delivery to the lines 808 leading into the instruction buffer register 14 in computer module 188, shown in FIG. 2B. The presence of this information in the instruction buffer register supplies the signal INSTRUCTION BUFFER REGISTER OCCUPIED to the computer program control unit (FIG. 17A). At this point, it is assumed that the computer module is still working on the preceding instruction, hence the computer program control will not proceed with any operation based on this signal.

Also, while the computer module arithmetic unit 38 of FIG. 2B is working on the preceding multiplication operation, that is, the operation called for by the instruction with tag Y0100, the computer module prepares a memory request for the next operand which will be required and which, in this case, is a request for the right operand whose tag is Y1100. The tag Y1100 is in the tag portion 686 of the right operand register 22, as previously described in connection with FIG. 16. The transmission of the prior request, that is the request for the instruction word Y1000, through the computer module output multiplexer 30 of FIG. 2B produced the signal REQUEST TRANSMITTED which initiates the action of the computer program control unit (FIG. 17B) to assemble now a new request, in this case a request for the right operand.

Part of the information required for the new request will be the address of the memory in which the right operand is to be found. The memory address 1 appears in the memory address output register 422 of the memory address generator (FIG. 13) and in the memory address input register 420, as a result of the previous operation. Since the prior result dealt with a left operand, the signal LEFT OPERAND will be available from the tag generator 36 of FIG. 2B to the computer program control unit for use in the succeeding operation. This signal will cause the computer program control unit (FIG. 17A) to transmit the signal COUNT UP on line 450 to the count-up-1 circuits 424 of FIG. 13. From these circuits, the output 2 will be gated to the memory address output register 422 via the OR circuits 440 and the AND circuits 454 under the control of the signal GATE COUNTER on the line 456 from the computer program control (FIG. 17A).

It is now possible to assemble the new memory request in the computer module output register 566 of FIG. 16. The request bit portion 576 and the computer address portion 588 are transmitted from the memory control information unit 42 derived from the computer program control unit (FIG. 17C) by reason of the signal GATE COMPUTER MODULE NAME, OPERAND BUFFER REGISTER CODE, THE RIGHT OPERAND REGISTER CODE AND REQUEST BIT. The program portion 584 of the memory request will be transmitted on the lines 582 from the memory control information unit 42 as derived from the computer program control unit (FIG. 17C) by the signal INTERROGATE BY PROBLEM, STATUS, TAG AND RETRIEVE DESTRUCTIVELY. The memory address portion 590 will be transmitted from the memory address output register 422 of FIG. 13 as controlled by the AND circuits 444 which are operated by the signal GATE ADDRESS INTO 30 on line 448. The problem portion 616 of the word in FIG. 16 will be supplied from the problem portion of the instruction register 28 via the AND circuits 620 controlled by the signal GATE PROBLEM INTO 30 on line 624 derived from the computer program unit (FIG. 17B). The status portion 626 will be transmitted from the fixed T source 654 via the AND circuits 656 controlled by the signal GATE T on the line 658 derived from the computer control unit (FIG. 17B). The tag portion 666 of the output word 566 in FIG. 16 will be derived from the tag portion 686 of the right operand register 22 via the lines 672 and the AND circuits 688 controlled by the signal GATE TAG INTO 30 on line 690 derived from the computer control unit (FIG. 17A). The data portion of FIG. 16 is not required for this memory request.

To recapitulate, the following information has been assembled in the output register 566 of FIG. 16. The request bit 576 is set to the 1 state indicating that a new request is available to the computer module output multiplexer (FIG. 9A) for transmission to an associative memory module. The program portion 584 of FIG. 16 is set to the code for the operation to be performed by the associative memory module which, in this case, is the operation of interrogation by the problem number, the status, and the tag, and then retrieving the matching word destructively. The computer address portion 588 of FIG. 16 has three sub-portions in its field. The first sub-portion is set to the 1 state to indicate that the information secured from the associative memory module is to be returned to computer module 1; the second sub-portion is set to indicate that the information is to be returned to the operand buffer register 18 of computer module 1, as shown in FIGS. 10A and 2B; and the third sub-portion of the computer address is set to the "right" state to indicate that the information is to be delivered from the operand buffer register 18 to the right operand register 22 of FIG. 2B.

The memory address portion 590 of FIG. 16 is set to the 2 state indicating that this request is to be directed to the associative memory module 2. The problem portion 616 is set to the 2 state indicating that this is a request concerned with problem number 2. The status portion 626 is set to the T state indicating that the search in the associative memory is to be for a data word in T status. The tag portion 666 is set to the Y1100, (Y11, see FIG. 6). which is the tag for the right operand. As mentioned earlier, the data portion 692 is irrelevant at this point.

The operation of the computer module output multiplexer (FIG. 9A) with respect to this new request will be similar to that dealt with earlier except that this request will be routed to associative memory module 2 in accordance with the memory address portion of the control information, whereas associative memory module 1 was the destination of the earlier request. This operation will be brought about by deriving the signal 12Q on the line 810 in a fashion similar to that previously described in respect to the signal 11Q on the line 760 (FIG. 9A).

The operation of the memory input queue (FIG. 11) will also be similar to that previously described in connection with the earlier memory request, except that in this case the memory input queue will be the queue of associative memory module 2. The operation of the associative memory module will be similar to that for the earlier request except that the instruction provides for the destructive reading of the information from memory since this is a temporary data word, whereas the earlier request concerned an instruction word which was to be retained permanently in memory.

These operations will result in transmission of the following control and data word information to the memory output register 372 of FIG. 12 to set its several sections accordingly. In the memory output register 372 the request bit portion 778 will be set to the 1 state to indicate that the request has been fulfilled. The match indicator portion 402 will be set to the 1 state to indicate that there was a single word in this associative memory module which matched the requirements set up by the request. The computer address portion 392 will be set to the 1 state in the first subportion to indicate that the information is to be delivered to computer module 1. The second sub-portion will be set to the 0 state to indicate that the information is to be delivered to the operand buffer register of computer module 1, and the third sub-portion will be set to the "right" state to indicate that the information is to be delivered to the right operand register. The memory address portion 396 will be set to the 2 state to indicate that this information is being derived from associative memory module 2. The problem portion 780 will be set to the 2 state to indicate that this information is concerned with problem number 2. The status portion 782 will be set to the T state to indicate that the word being returned is a status T data word. The tag portion 784 will be set to the Y1100 (Y11, see FIG. 6) state to indicate that this information is set for the word with that tag. The data portion 812 will be set to the value 22.78. (This value (22.78) is the result of the multiplication of 3.4×6.7 which was called for by the instruction with tag Y1100, and which, it is assumed, has been completed by another computer module and stored under the operation of rule 9, prior to the operation presently being described.)

The information now assembled in the memory output register is transmitted through the memory output multiplexer (FIGS. 10A and 10B) in a fashion similar to that for the earlier request, except that the signal output of the computer buffer register decode 1 unit 236 of FIG. 10A will be the signal 110P on the line 238 to store this information in the operand buffer register 1 18 via the OR circuits 242 and the AND circuits 240. Note that if channel 1 has been selected for transmission of information, in this case the previously described instruction request coming from associative memory module 1, then channel 1 will not be available for the transmission of the present request. Instead of operating under the signal 12M on line 228, there will now be available the signal 22M on line 250 which operates the AND circuits 204 to place the information on the lines 814 of channel 2 by way of the OR circuits 816. In this case, the decoding of the computer address will take place in the computer buffer register decode 2 252 to provide the signal 210P on the line 818 operating the AND circuits 820, thus taking the information from lines 814 to operand buffer register 1 18 via the OR circuits 242. The storing of the information in the operand buffer register 18 of FIG. 2B produces the signal OPERAND BUFFER REGISTER OCCUPIED which goes to the computer program control unit 26 (FIG. 17A).

At this time, new information is available in both the instruction buffer register 14 and in the operand buffer register 18 (FIG. 2B). In particular, the instruction buffer register 14 will contain the request bit set to the 1 state to indicate that a fulfilled request is now available at the instruction buffer register and it will also have its match indicator set to the 1 state indicating that a valid word was retrieved from memory as a result of the request. The computer address portion and the memory address portion are no longer pertinent. The data word portion will contain the problem number 2 identifying this information as belonging to problem number 2, the status portion is set to I indicating that this is an instruction, the tag portion is set to Y1000 (Y1, see FIG. 6) defining this instruction word as the bottom of the tree of FIG. 6. The instruction buffer will also contain the code +, indicating that the operation of addition is to be performed under control of the instruction word. A blank will appear in the item field since the item is not pertinent to this instruction.

The following information will be available in the operand buffer register 18 of FIG. 2B: The request bit will be set to the 1 state to indicate that a fulfilled request is now in the operand buffer register, and the match indicator bit will be set to the 1 state to indicate that a valid word was retrieved in response to the request. The first and second sub-portions of the computer address are no longer pertinent since they have served their purpose of routing the information to the proper computer module, and to the proper operand buffer register. However, the third subportion of the computer address is still pertinent in that it supplies the information in this case that the operand is a right operand and hence at the next stage of the operation this information is to be transmitted from the operand buffer register 18 to the right operand register 22. The memory address is not pertinent for this operation.

In the data word portion of the operand buffer register, the problem number will be set to the 2 state to indicate that this information pertains to problem number 2, the status portion will be set to the T status to indicate that this information constitutes a data word of status T, the tag portion will be set to the state Y1100 indicating that this information refers to the last right operand operation in the instruction tree of FIG. 6, and the data portion will be set to the value 22.78, representing the result of the computation of the principal right branch of the instruction tree.

It should be recalled that the fulfillment of the two requests described above were overlapped at least to some extent with the operation of the arithmetic unit 38 in performing the preceding multiplication operation. Next, the preceding result, which will become the left operand, will be combined with the right operand presently available in the operand buffer register. The operation will be performed under control of the instruction presently available in the instruction buffer register 14. In order to accomplish this, these words will be transmitted respectively from the operand buffer register 18 and from the instruction buffer register 14 into the right operand register 22 and into the instruction register 28.

When the arithmetic unit 38 completes the multiplication operation called for by the instruction with tag Y0100 (Y01, see FIG. 6), it will have the results 2.76 available. The signal OPERATION COMPLETE will be generated by the arithmetic unit and it will be transmitted to the computer program control unit (FIG. 17B). The computer program control will send the signal GATE DATA INTO 28 to the arithmetic unit 38 of FIG. 2B, which will cause this result to be transmitted over line 732 to the data portion 706 (FIG. 16) of the instruction register 28. Since the instruction in the instruction register did not call for a branching operation, the signal STATUS B INSTRUCTION will not be given to the computer program control (FIG. 17B). Hence the computer program control can proceed to move down the tree. To do this, the first operation is to transmit the data word from the instruction register 28 of FIG. 2B into both the left operand register 20 and the right operand register 22 by means of the signal GATE DATA WORD INTO 20 AND 22 originating in the computer program control unit.

Next, the computer program control unit finding that it has the next instruction available in the instruction buffer register 14 of FIG. 2B, as indicated by the signal INSTRUCTION BUFFER REGISTER OCCUPIED and that it has the next operand available in the operand buffer register 18, as indicated by the signal OPERAND BUFFER REGISTER OCCUPIED and the signal ASSOCIATIVE MEMORY MATCH INDICATOR=1, can proceed to transmit the data word from the instruction buffer register 14 over lines 822 to the instruction register 28, and from the right operand buffer register 18 over lines 824 to the right operand register 22. The operand is delivered to the right operand register 22 by the operand buffer register 18, as required by the signal RIGHT OPERAND which is transmitted to the computer program control unit (FIG. 17A).

At this point, the three principal registers of the computer module will have the following information: The left operand register 20 will have the problem number 2, the status I (which is no longer pertinent), the tag Y0100, and the data 2.76. The right operand register 22 will have the information problem number 2, status T (which is also no longer pertinent), the tag Y1100, and the data 22.78. The instruction register 28 will have the problem number 2, the status I, the tag Y1000 (Y1, in FIG. 6), the code + and a blank item field since this instruction does not require an item. Hence there is assembled in the three principal registers the respective operands and the instruction for performing the operation called for at the bottom of the tree in FIG. 6.

The computer program control unit (FIG. 17B) transmits the signal GATE CODE INTO 32 to the instruction register 28 of FIG. 2B. This signal transmits the code for the operation of addition from the code portion of instruction register 28 to the instruction decode unit 32 via lines 826 which supply the control signal to cause the arithmetic unit 38 to perform the operation of addition when the two operands are received. The transmission of the operation information from the instruction decode unit 32 to the arithmetic unit 38 is controlled by the signal GATE OPERATION INTO 38 which is derived from the computer program control unit (FIG. 17B). Also, the computer program control unit transmits the signal GATE DATA INTO 38 to the left operand register 20 of FIG. 2B, causing that register to transmit its data over the lines 828 to the arithmetic unit 28. In the case of the present example, this number is 2.76. Likewise, the computer program control unit (FIG. 17A) produces the signal GATE DATA INTO 38 which is transmitted to the right operand register 22 to cause its data to be transmitted to the arithmetic unit 38 which is transmitted to the right operand register 22 to cause its data to be transmitted to the arthmetic unit 38 on lines 830. In this case, the value transmitted is 22.78. The arithmetic unit 38 will now proceed to execute the operation called for by the instruction, which, in this case, is the operation of addition.

While the arithmetic unit is proceeding on this operation, the generation of new tags and preparation of new memory requests will ordinarily proceed. First, the tag subscript is transmitted from the instruction register 28 over the lines 34 to the left operand register 20 and to the right operand register 22, and over the lines 724 to the tag generator 36 under the control of the signal GATE SUBSCRIPT INTO 20, 22 and 36 which is derived from the computer program control unit (FIG. 17B). The tag generator would ordinarily proceed to generate new tags, as previously described. However, in the present case, the subscript is 1000 and the fact that the rightmost 1 is in the leftmost position of the subscript field produces the signal END OF TREE PROGRAM on the line 832 (FIG. 15). This signal will be generated as follows: The signal GENERATE NEW TAGS derived from the computer program control unit (FIG. 17B) on the line 522, will produce a signal on the line 526 as the output of the AND circuit 524 which is operated in conjunction with the 0 in the forth bit position of the subscript. Since there is also a 0 in the third bit position of the subscript, there will be a signal on line 514, which, in conjunction with the signal on the line 526, will operate the AND circuit 532 to produce an output signal on the line 834. Since there is also a 0 in the second position of the subscript register, there will be a signal on the line 510 which, in conjunction with the signal on the line 834, will operate the AND circuit 534 to produce a signal on the line 836. Now, however, there is a 1 in the first position of the subscript so that there will be a signal on the line 508 which, in conjunction with the signal on the line 836, will operate the AND circuit 538 thus producing the signal END OF TREE PROGRAM on the line 832. The signal END OF TREE PROGRAM goes to the computer program control unit where it initiates the operation under rule 13, delivering the result of the present computation to the output device 46 over the lines 838 (FIG. 2A).

From the foregoing description it can be seen that a highly parallel computer and data processing system has been provided in which the many concurrent operations are substantially self-executing. Furthermore, it can be appreciated that the modular nature of the system contributes a high degree of flexibility in that computer and memory modules may be added at will without requiring major changes either in the existing installation or in its control program. Furthermore, it can be seen that the system's reliability is not only greatly enhanced, but that the simultaneous performance of many different operations also provides a very high degree of system utilization.

Throughout the specification, the terms "word" and "data" are sometimes used in a technically limited sense. When these terms are used in the claims, however, they are attributed their broader and more general meaning.

While the novel features of the invention have been illustrated and described in connection with a specific embodiment of the invention, it is believed that the embodiment will enable others skilled in the art to apply the principles of the invention in forms departing from the exemplary embodiment herein, and such departures are contemplated by the claims.

What is claimed is:

1. In a computer system, a plurality of computer modules, a plurality of memory modules each having data input and data output connections, data transmission lines respectively between said data input and data output connections and said computer modules, means under autonomous control of said memory modules for selecting one of said transmission lines for transmitting data to a selected computer module, and means under autonomous control of said computer modules for selecting one each of said transmission lines for transmitting data to a plurality of selected memory modules simultaneously.

2. In a computer system, a plurality of computer modules, a plurality of associative memory modules wherein data is identified by accompanying tags each having data input and data output connections, data transmission lines respectively between said data input and data output connections and said computer modules, means under autonomous control of said memory modules for selecting one of said transmission lines for transmitting data to a selected computer module, means in each of said computer modules for generating a memory unit address and for transmitting such memory unit address to means for selecting a particular memory module together with a data request, and data activated means in said associative memory modules and under autonomous control thereof for selecting one each of said transmission lines for transmitting data simultaneously to each respective computer module which transmitted to said associative memory module its data request and unit address.

3. In a computer system, a plurality of computer modules, a plurality of associative memory modules said pluralities operable simultaneously in respective pairs of computer and memory modules, each having data input and data output connections, data transmission lines respectively between said data input and data output connections and said computer modules, means under autonomous control of said memory modules for selecting one of said transmission lines for transmitting data to a selected computer module, means under autonomous control of said computer modules for selecting one of said transmission lines for transmitting data to a selected memory module, and data activated means in said memory modules for selecting for transmission to a selected computer module a data word solely on the basis of its content.

4. In a computer system, a plurality of memory modules each having data input and output connections, a plurality of computer modules, said pluralities operable simultaneously in respective pairs of computer and memory modules, data transmission line respectively between said data input and data output connections and said computer modules, means in each of said computer modules for manifesting the fact that said computer modules are conditioned to operate on new work, means under autonomous control of each of said computer modules and responsive to said manifesting means operative to select one of said transmission lines to establish communication with one of said memory modules.

5. In a computer system, a plurality of computer modules, a plurality of memory modules each having data input and data output connections, said pluralities operable simultaneously in respective pairs of computer and memory modules, data transmission lines respectively between said data input and data output connections and said computer modules, memory data activated means under autonomous control of said memory modules for selecting one of said transmission lines for transmitting data to a selected computer module, means in said computer modules manifesting the fact that they are conditioned to operate on new work, and means responsive to said manifestation and under autonomous control of said computer modules for selecting one of said transmission lines for transmitting data to a selected memory module.

6. In a computer system, a plurality of computer modules, a plurality of memory modules each having data input and data output connections, said pluralities operable simultaneously in respective pairs of computer and memory modules, data transmission lines respectively between said data input and data output connections and said computer modules, means in said computer modules manifesting the fact that they are conditioned to operate on new work, means responsive to such manifestation and under autonomous control of the computer modules producing such manifestation for selecting one of said transmission lines for transmitting to a memory module a request for data together with the address of such computer module, data activated means under autonomous control of said memory modules for selecting therefrom data, and means under control of a computer module address for selecting one of said transmission lines for transmitting data to the computer module requesting the same.

7. In a computer system, a plurality of computer modules, a plurality of memory modules each having data input and data output connections, data transmission lines respectively between said data input and data output connections and said computer modules, means under autonomous control of each of said memory modules for concurrently selecting different ones of said transmission lines for transmitting data to respective selected computer modules, and means under autonomous control of each of said computer modules for concurrently selecting different ones of said data transmission lines for transmitting data to a selected memory module.

8. In a computer system, a plurality of computer modules, a plurality of associative memory modules adapted for retrieval of data therein solely on the basis of data content, each said memory modules having data input and data output connections, data transmission lines between said data input and data output connections and said computer modules, data activated means under autonomous control of each of said memory modules for concurrently selecting different ones of said data transmission lines for transmitting data to selected computer modules, and means under autonomous control of each of said computer modules for concurrently selecting different ones of said data transmission lines for transmitting data to selected memory modules.

9. In a computer system, a plurality of computer modules, a plurality of associative memory modules adapted for retrieval of data therein solely on the basis of data content, each said memory modules having data input and data output connections, data transmission lines respectively between said data input and data output connections and said computer modules, means under autonomous control of each of said computer modules for concurrently selecting different ones of said data transmission lines for transmitting a data request interrogation to selected memory modules, and means under autonomous control of an interrogated memory module for selecting a data transmission line for transmitting requested data to an interrogating computer module.

10. In a computer system, a computer module, a plurality of associative memory modules adapted for retrieval of data therein solely on the basis of data content, each said memory module having data input and data output connections, data transmission lines respectively between said data input and data output connections and said computer module, means under autonomous control of said computer module for concurrently selecting different ones of said data transmission lines for transmitting a data request interrogation to a selected memory module, means computing the identification of a selected memory module, and means under autonomous control of a selected memory module for selecting a data transmission line for transmitting requested data to said computer module.

11. In a computer system, a plurality of computer modules, a plurality of associative memory modules adapted for retrieval of data therein solely on the basis of data content, each said memory modules having data input and data output connections, data transmission lines respectively between said data input and data output connections and said computer modules, means under autonomous control of each of said computer modules for concurrently selecting different ones of said data transmission lines for transmitting data request interrogations to selected memory modules, means for transmitting a data request together with the address of the interrogating computer module on a selected transmission line, and means under autonomous control of an interrogated memory module and in response to a computer module address transmitted thereto for selecting a data transmission line for transmitting requested data to the interrogating computer module.

12. In a computer system, an information storage device storing items of data and instructions, a computer having access connections with said storage device, means for entering said instructions and data into said storage device in association with an identifying tag for each such item, means for transmitting items together with their identifying tags to said computer, means in said computer for autonomously processing an identifying tag associated with an item and generate therefrom an identifying tag of a successor item required by said computer, tag comparison means in said storage device for comparing item-identifying tags therein with an identifying tag generated in said computer, and means responsive to a tag comparison operation in said storage device adapted to transmit to said computer information having a tag corresponding to the tag generated by said computer.

13. In a computer system, an associative information storage device adapted for retrieval of information therefrom solely on the basis of its content, a computer having access connections with said data storage device, means for entering instruction items and data items into said data storage device each in association with an identifying tag for each item, means for transmitting data items and instruction items together with their identifying tags to said computer, means in said computer for autonomously processing an identifying tag associated with an item and generate therefrom identifying tags of a successor data item required by said computer and a successor instruction item, tag comparison means in said storage device for comparing item-identifying tags therein with an identifying tag generated in said computer, and means responsive to a tag comparison operation in said storage device adapted to transmit to said computer items having tags corresponding to the tags generated by said computer.

14. In a computer system, a plurality of data storage devices each comprising an independently accessible memory unit having a distinctive address, means for storing data in said storage devices in predetermined order, a computer module, means for transmitting data from said data storage devices to said computer module, a memory unit address generator in said computer module adapted to indicate the address of the last previous data storage device transmitting data to said computer, means for testing end addresses of said memory units, means for checking for a left operand or a right operand and means controlled by said checking means for incrementing or decrementing a memory unit address in said memory address generator to obtain a new memory unit address, selective access means between each of said data storage means and said computer, signal means in said memory address generator for manifesting a new memory unit address, and means under control of said signal means for activating an access means corresponding to the generated memory address.

15. In a computer system, a plurality of data storage devices each comprising an independently accessible memory unit having a distinctive address, means for storing data in said storage devices in predetermined order, a plurality of computer modules, means for concurrently transmitting data respectively from said data storage devices to said computer modules, a memory unit address generator in said computer modules adapted to indicate the address of the last previous data storage unit transmitting data to said computer modules, means for incrementing or decrementing a memory unit address in said memory address generator to obtain a new memory unit address, selective access means between each of said data storage means and said computer modules, signal means in said memory address generator for manifesting a new memory unit address, means under control of said signal means for activating an access means corresponding to the generated memory unit address, means in said respective computer modules manifesting the address of each thereof, and means for transmitting to a data storage device whose unit address has been generated a data request together with the address of the computer module transmitting such request.

16. In a computer system, a plurality of data storage devices each comprising an independently accessible memory unit having a distinctive address, means for storing data in said storage devices in predetermined order, a plurality of computer modules, connections between said data storage devices and said computer modules for concurrently transmitting data from said data storage devices to said computer modules, a memory unit address generator in said computer modules adapted to indicate the address of the last previous data storage unit transmitting data to said computer modules, means for incrementing or decrementing a memory unit address in said memory unit address generator to obtain a new memory unit address, selective access means between each of said data storage means and said computer modules, signal means in said memory address generator for manifesting a new memory unit address, means under control of said signal means for activating an access means corresponding to the generated memory unit address, means in said computer modules manifesting the address of each thereof, means for transmitting to a data storage device whose address has been generated a data request together with the address of the computer module transmitting such request, and means in said data storage devices under control of the address of a requesting computer for conditioning said connections for transmitting data from said data storage devices to said requesting computer.

17. In a computer system, a plurality of computer modules each having a distinctive address, a plurality of data storage modules, selectable access connections between each of said computer modules and each of said data storage modules whereby any computer module may concurrently interrogate any one of said data storage modules by delivery thereto at random of a data request together with the address of the computer modules making such request, common selectable data transmission lines connecting said data storage modules and said computer modules for transmission of data concurrently from said data storage modules to said computer modules, and computer module address activated means under autonomous control of a computer interrogated data storage module for selecting a data transmission line between an interrogated data storage module and an interrogating computer module.

18. In a computer system, a plurality of computer modules each having a distinctive address, a plurality of data storage modules, selectable access connections between each of said computer modules and each of said storage modules whereby any computer module may concurrently interrogate any one of said data storage modules by delivery thereto of a data request together with the address of the computer module making such request, means under the autonomous control of any one computer module for activating said access connections to transmit data from said computer module to said data storage modules, common selectable data transmission lines connecting said data storage modules and said computer modules for transmission of data concurrently from said data storage modules to said computer modules, and computer module address activated means under autonomous control of a computer interrogated data storage module for selecting a data transmission line between an interrogated data storage module and an interrogating computer module.

19. In a computer system, a plurality of computer modules each having a distinctive address, a plurality of associative data storage modules adapted to the retrieval of data therefrom solely on the basis of data content, selectable access connection between each of said computer modules and each of said data storage modules whereby any computer module may concurrently interrogate any one of said data storage modules by delivery thereto, at at random, of a data request together with the address of the computer module making such request, common selectable data transmission lines connecting said data storage modules and said computer modules for concurrent transmission of data from said data storage modules to said computer modules, means for selecting data for transmission from an interrogated data storage module by examination of data content, computer module address activated means under autonomous control of a computer interrogated data storage module for selecting a data transmission line between an interrogated data storage module and an interrogating computer module, and data activated means for conditioning selected data transmission lines for the transmission of data to an interrogating computer.

20. In a computing system, a plurality of computer modules, programming means including storage means for storing words and an individual identifying tag in association therewith, first means adapted to randomly produce from the tag of a first word the identification tags of a plurality of successor words, and second means adapted to initiate operation concurrently by a plurality of computer modules to perform operations involving said sussessor words.

21. The computer system of claim 20, wherein the first means includes a tag generator having means for storing therein the tag of a first word, and means for randomly modifying said tag in said tag generator into a tag for successor words in said memory modules.

22. The computer system of claim 20, wherein certain successor words are stored in an associative memory together with a ready bit manifestation, and means in said computer modules responsive to said ready bit manifestation for effecting retrieval from memory of said successor words.

23. In a computing system, a plurality of computer modules, programming means including storage means for storing words of data and of program instructions and an individual instruction identifying tag in association with said respective words, first means adapted to determine from the tag of a first word, the identifying tags of a plurality of successor words, of second means adapted to initiate operation concurrently by a plurality of computer modules to perform the operation called for in the successor words of program instructions, means in said storage means for locating words stored therein by comparison of the tags thereof with the tags determined by said first means, and means under control of said second means for transmitting to said computer modules words located by said comparison.

24. In a computing system, a computer module, programming means including associative storage means for storing words of data and of program instructions and an individual instruction identifying tag in association with said respective words, first means in said computer module adapted to determine from the tag of a first word the identification tags of a plurality of successor words, and second means in said associative storage means adapted to initiate operation of said computer module to perform the operation called for in the successor tag identified words of program instructions.

25. In a computing system, a computer module, programming means including associative storage means for storing words of data and of program instructions and an individual instruction identifying tag in association with said respective words, data transmission connections between said computer module and said associative storage means, first means in said computer module adapted to determine from the tag of a first word the identification tags of a plurality of successor tag identified words, second means in said associative storage means adapted to initiate operation of said computer module to perform the operation called for in the successor words of program instructions, means in said associative storage means for locating words stored therein by comparison of the tags thereof with the tags determined by said first means, and means under control of said second means for transmitting to said computer module words located in said associative storage means by said comparison.

26. In a computer system, a plurality of computer modules, storage means for storing words of program instruction and data together with respective identifying tags in association therewith, programming means, first means adapted to determine from a first tag identified word, identifying tags for a plurality of successor words in said storage means, and second means adapted to initiate operation concurrently by a plurality of computers to perform the operations called for in the successor words of program instructions.

27. In a computer system, a plurality of computer modules, associative storage means for storing words of program instruction and data respectively together with respective identifying tags in association therewith, programming means, means adapted to determine from tag identified words, identifying tags for a plurality of successor instruction words and a plurality of data words in said storage means, means under control of said determining means for locating in said associative storage means said plurality of successor words therein corresponding to the identifying tags determined by said determining means, means for transmitting to a selected one of said computer modules the successor words so located, and second means adapted to initiate concurrent operation by a plurality of computers to perform the operations called for in the successor words of program instructions.

28. In a computer system, a plurality of computer modules, associative storage means for storing words of program instruction and data, respectively together with respective identifying tags in association therewith, programming means, first means adapted to determine from a first tag identified word, identifying tags for a plurality of successor program words and data words in said storage means, means under control of said determining means for locating in said associative storage means pluralities of successor words therein corresponding to the identifying data determined by said determining means, and second means adapted to initiate concurrent operation by a plurality of computers to perform the operations called for in the successor program words.

29. The computer system of claim 28, wherein the first means includes a tag generator, and means for storing the tag of said first word of program instruction.

30. The computer system of claim 28, wherein said second means includes a ready bit manifestation stored with successor words in said associative storage means whereby a computer module is enabled to locate a successor word in said associative storage means.

31. The computer system of claim 26, wherein said first means includes a tag generator having means therein for storing the tag of said first word, and including means for modifying said tag into a tag for successor words.

32. The computer system of claim 26, wherein said storage means comprises an associative memory wherein successor words are stored together with a ready bit manifestation, and means in said computer modules responsive to said ready bit manifestation for effecting retrieval from memory of said successor words.

33. The computer system of claim 26, wherein said storage means comprises an associative memory wherein successor words are stored together with a ready bit manifestation, means in said computer modules responsive to said ready bit manifestation for effecting retrieval from memory of said successor words, said memory including means for marking words therein for non-destructive readout, and means operating in response to said last-named means for immediately restoring to memory any read-out words so marked.

34. In a computer system, a plurality of computer modules, programming means, storage means for storing a plurality of tagged words of data and program instructions, and means in said computer modules adapted to determine from a first tag of a word, the identity of a plurality of tags of successor words.

35. In a computer system, a plurality of computer modules, programming means, storage means for storing a plurality of words of data and program instructions in association with tag means for identifying such words, and means in said computer modules adapted to determine from said tag identifying means for a first word, the tag identities of a plurality of successor words.

36. In a computer system, a plurality of computer modules, programming means, a plurality of associative storage means for storing a plurality of words of program instructions, said associative storage means being adapted for concurrent read-out on the basis of respective comparisons on the contents of each such word, and means in said computer modules adapted to determine from a first item, the identity of a plurality of successor items.

37. In a computer system, a plurality of computer modules, programming means, a plurality of storage means for storing a plurality of words of program instructions in association with tags for identifying such respective words of program instructions, means in said computer modules adapted to generate from the identifying tag of a first item, the identifying tags of a plurality of successor items, and means in said storage means for simultaneously comparing the identifying tags therein with respective generated tags, whereby words with corresponding tags are selected for retrieval.

References Cited

UNITED STATES PATENTS

| | | | |
|---|---|---|---|
| 2,914,248 | 11/1959 | Ross et al. | 340—172.5 |
| 2,969,522 | 1/1961 | Crosby | 340—172.5 |
| 2,969,525 | 1/1961 | Hill | 340—172.5 |
| 3,108,256 | 10/1963 | Buchholz et al. | 340—172.5 |
| 3,108,257 | 10/1963 | Buchholz | 340—172.5 |
| 3,121,217 | 2/1964 | Seeber et al. | 340—172.5 |
| 3,156,897 | 11/1964 | Bahnsen et al. | 340—172.5 |
| 3,199,082 | 8/1965 | Haibt | 340—172.5 |
| 3,200,380 | 8/1965 | MacDonald et al. | 340—172.5 |
| 3,202,969 | 8/1965 | Dunwell et al. | 340—172.5 |
| 3,229,260 | 1/1966 | Falkoff | 340—172.5 |
| 3,242,467 | 3/1966 | Lamy | 340—172.5 |

ROBERT C. BAILEY, *Primary Examiner.*

PAUL J. HENON, *Examiner.*

W. M. BECKER, *Assistant Examiner.*